(12) United States Patent
Olsen et al.

(10) Patent No.: US 10,269,262 B2
(45) Date of Patent: Apr. 23, 2019

(54) SYSTEM AND METHOD FOR TEACHING PRE-KEYBOARDING AND KEYBOARDING

(71) Applicant: HANDWRITING WITHOUT TEARS, Cabin John, MD (US)

(72) Inventors: Janice Z. Olsen, Cabin John, MD (US); Emily Knapton, Cabin John, MD (US); Eric Olsen, Cabin John, MD (US); Robert Walnock, Cabin John, MD (US); Hank Isaac, Cabin John, MD (US); Ralph Sklarew, Cabin John, MD (US)

( * ) Notice: Subject to any disclaimer, the term of this patent is extended or adjusted under 35 U.S.C. 154(b) by 425 days.

(21) Appl. No.: 14/797,704

(22) Filed: Jul. 13, 2015

(65) Prior Publication Data

US 2016/0012745 A1  Jan. 14, 2016

Related U.S. Application Data

(60) Provisional application No. 62/023,560, filed on Jul. 11, 2014.

(51) Int. Cl.
   *G09B 13/00* (2006.01)
   *G09B 13/04* (2006.01)

(52) U.S. Cl.
   CPC .................. *G09B 13/04* (2013.01)

(58) Field of Classification Search
   USPC .......................... 434/169, 227–232
   See application file for complete search history.

(56) References Cited

U.S. PATENT DOCUMENTS

| | | |
|---|---|---|
| 207,559 A | 8/1878 | Sholes |
| 2,040,248 A | 5/1936 | Dvorak et al. |

(Continued)

FOREIGN PATENT DOCUMENTS

| | | |
|---|---|---|
| DE | 19604660 | 8/1997 |
| WO | 2005065034 | 7/2005 |

OTHER PUBLICATIONS

International Search Report dated Oct. 14, 2015, in International Application No. PCT/US2015/040135.

(Continued)

*Primary Examiner* — Kurt Fernstrom
(74) *Attorney, Agent, or Firm* — Hogan Lovells US LLP

(57) ABSTRACT

The present invention is directed to systems and related methods of teaching pre-keyboarding and keyboarding on a QWERTY-style keyboard wherein a color-coded row-based metaphorical and visual cuing system is used in a curriculum to make foundational keyboarding skills easy-to-teach and easy-to-learn, including: unilateral hand/finger skills, Home Row hand/finger positions, relational position of symbol location, and the essential keystroke spectrum of Home Row positioning-based finger movements of the left and right hand. The invention provides a dynamic virtual keyboard with colored rows which hexfurcates the QWERTY layout into left- and right-handed row sections, independently toggling the visibility of each in a developmental order to teach keyboarding skills in incremental steps rather than all at once. The invention further provides a dynamic cursor that uses visual indicators that mirror the visual cuing system to reinforce instruction with the dynamic virtual keyboard and aid keyboarding accuracy.

25 Claims, 77 Drawing Sheets

(56) References Cited

U.S. PATENT DOCUMENTS

| | | | | |
|---|---|---|---|---|
| 4,690,644 | A * | 9/1987 | Flanders | G09B 11/08 |
| | | | | 434/158 |
| 6,915,488 | B2 * | 7/2005 | Omori | G10H 1/0008 |
| | | | | 434/227 |
| 2002/0018983 | A1 * | 2/2002 | Dixon | G09B 13/02 |
| | | | | 434/227 |
| 2012/0227006 | A1 | 9/2012 | Amm | |
| 2013/0157235 | A1 * | 6/2013 | Ellsworth, Jr. | G09B 13/04 |
| | | | | 434/227 |
| 2014/0193786 | A1 * | 7/2014 | Ivanov | G09B 13/00 |
| | | | | 434/227 |

OTHER PUBLICATIONS

Lockyer Video Productions: "Dryft—Fastest way for touch typing on screens," Sep. 8, 2013, XP054976123, retrieved from the Internet: URL:https://www.youtube.com/watch?v=9EAi5Hxoovo [retrieved on Oct. 7, 2015] the whole document.

* cited by examiner

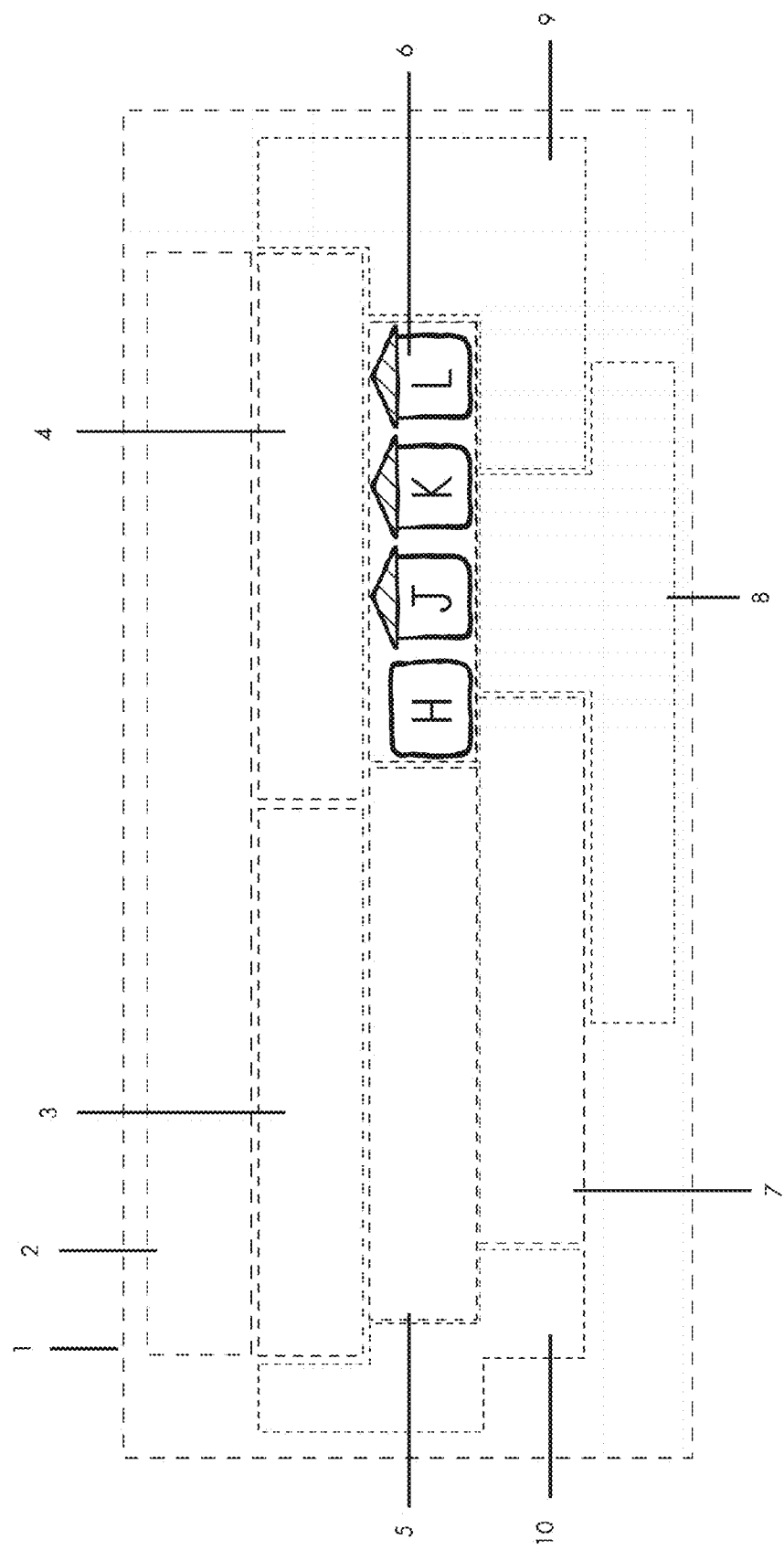

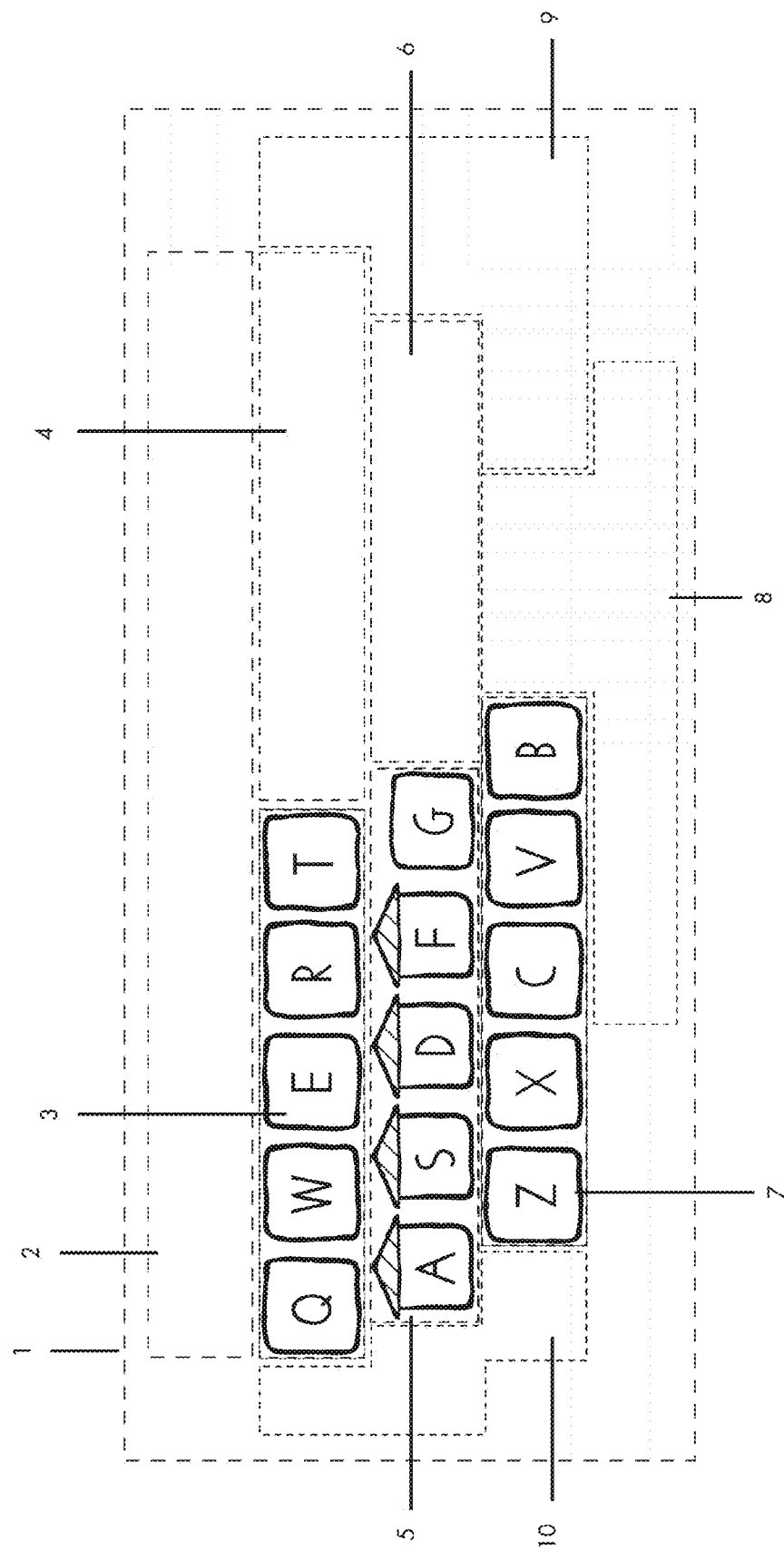

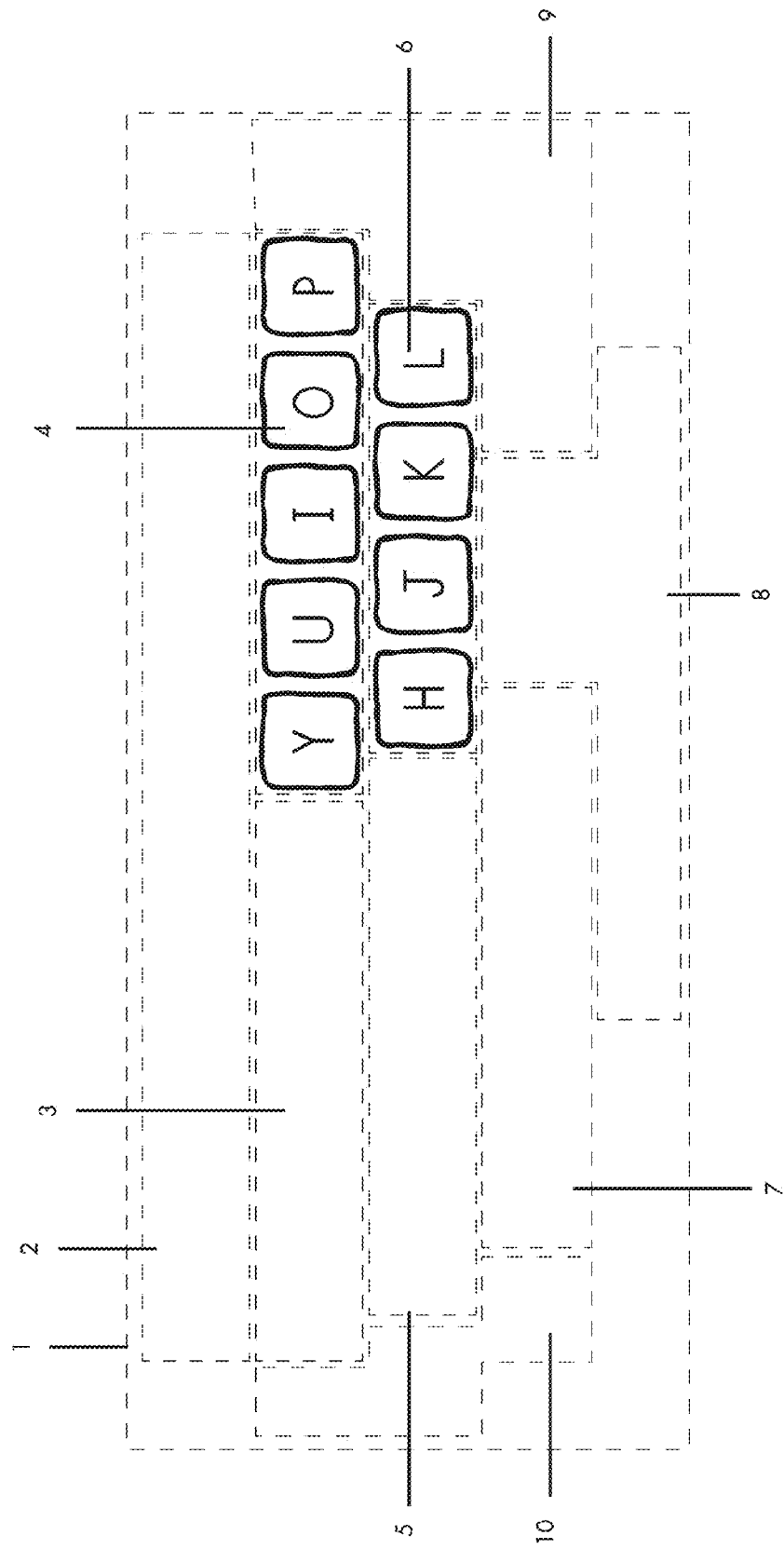

FIG. 16

| | Cue to Type | Typed Correctly | Typed Incorrectly |
|---|---|---|---|
| Stage 1: Colored Key | n e a t | n e a t | n e a t |
| Stage 2: Colored Letter Box | neat | neat | neat |
| Stage 3: Colored Line — Vertical | neat | neat | neat |
| Horizontal | neat | neat | neat |
| Stage 4: Black & White Line — Vertical | neat | neat | neat |
| Horizontal | neat | neat | neat |

FIG. 21
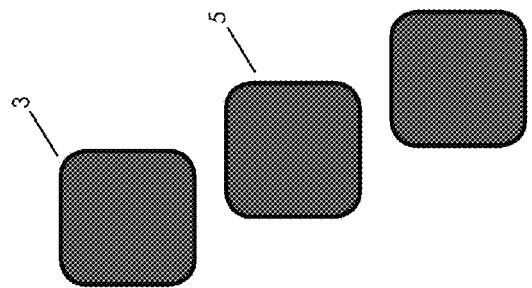
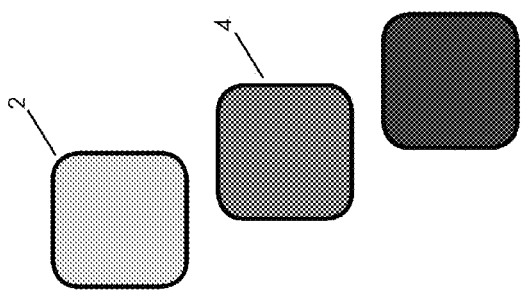
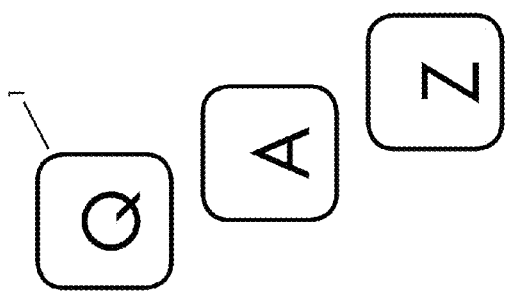

FIG. 23

| Row | SKAM | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Number | 1 | `/~ | 1/! | 2/@ | 3/# | 4/$ | 5/% | 6/^ | 7/& | 8/* | 9/( | 0/) | -/_ | =/+ | delete |
| Top | 2 | Tab | q/Q | w/W | e/E | r/R | t/T | y/Y | u/U | i/I | o/O | p/P | [/{ | ]/} | \|  |
| Home | 3 | Caps lock | a/A | s/S | d/D | f/F | g/G | h/H | j/J | k/K | l/L | ;/: | '/" | return | |
| Bottom | 4 | Shift | z/Z | x/X | c/C | v/V | b/B | n/N | m/M | ,/< | ./> | //? | shift | | |
| Space Bar | 5 | Space bar | | | | | | | | | | | | | |

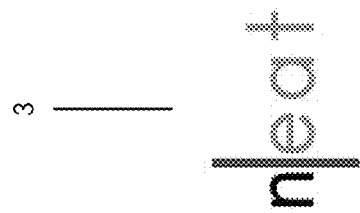
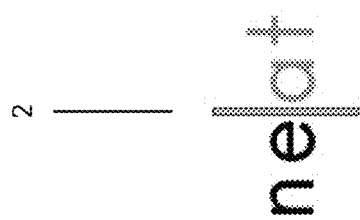
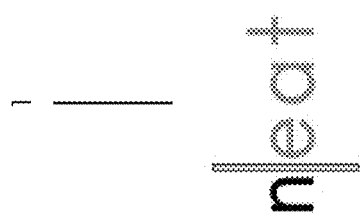
FIG. 27
Stage 3- vertical

FIG. 34
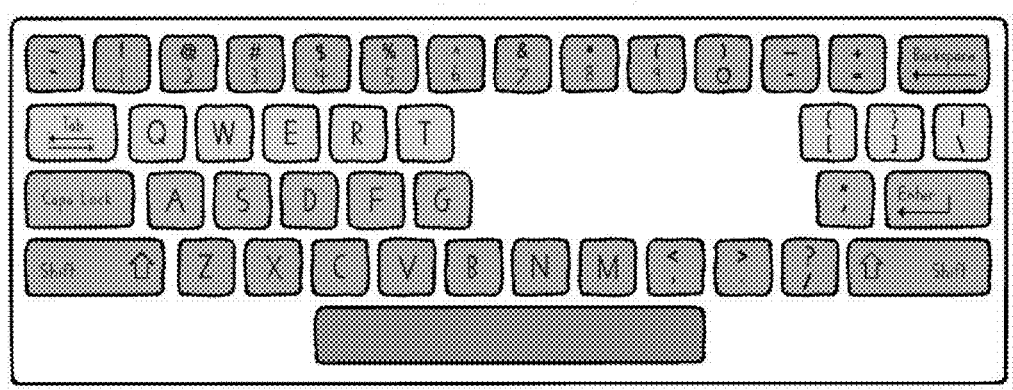
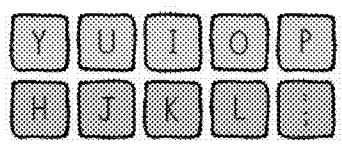

FIG. 35
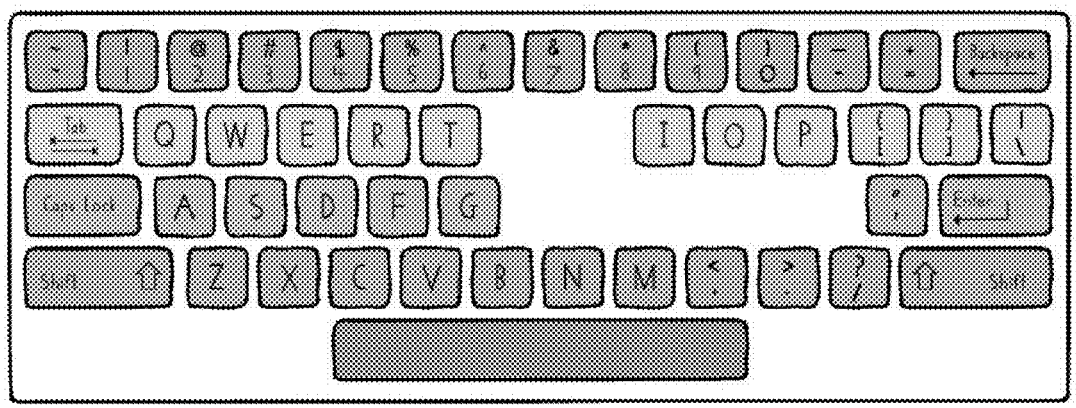
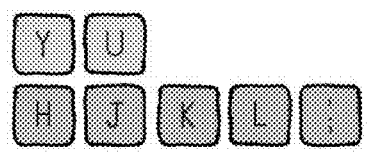

FIG. 36
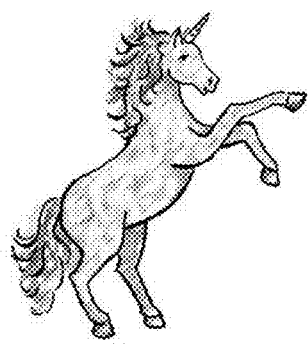
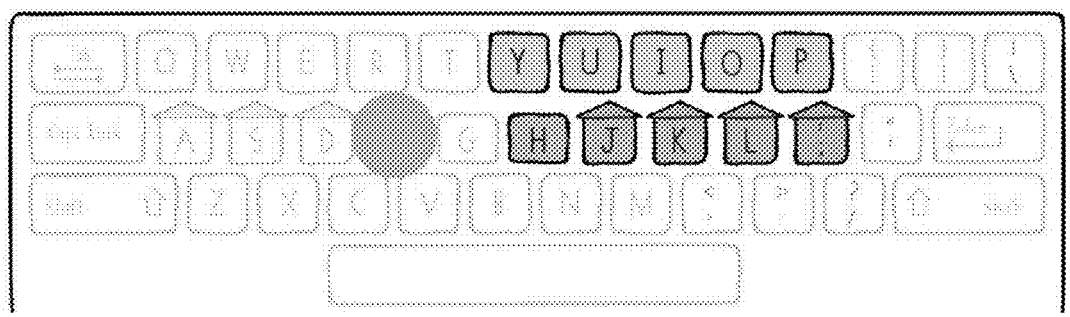

FIG. 43
Type every i.
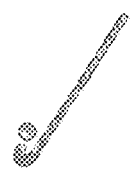 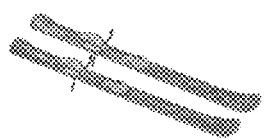 
field hockey        skis         unicycle
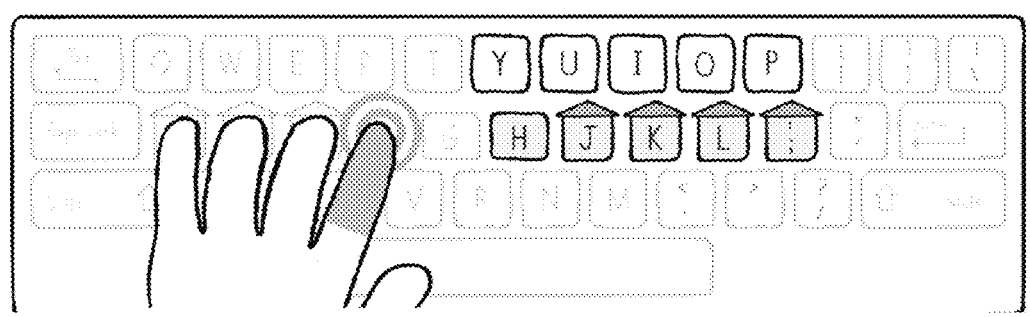

FIG. 44
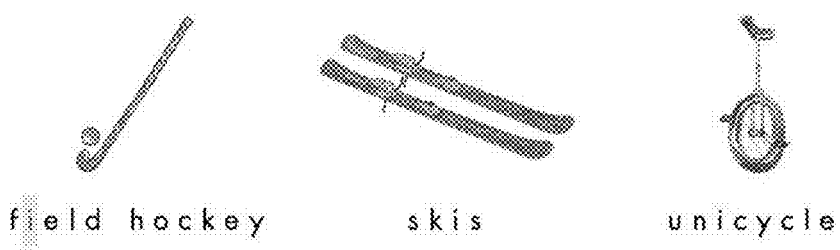
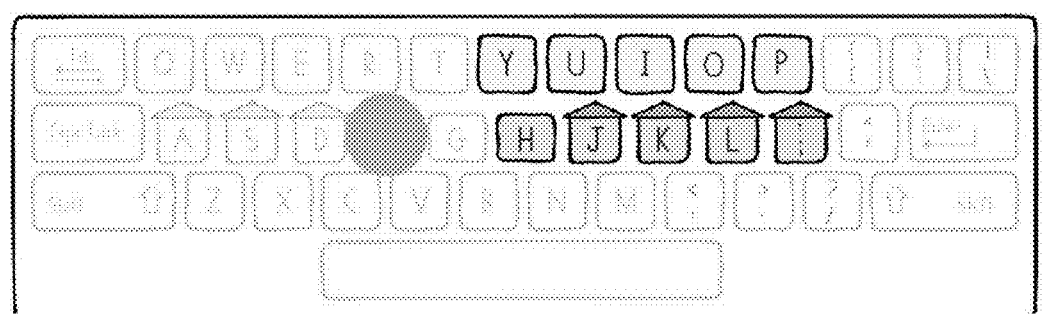

FIG. 46
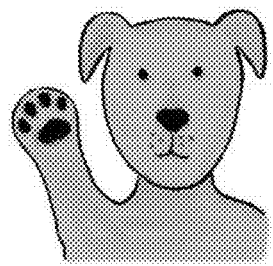
one paw
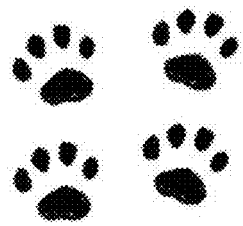
four paws
Type the phrases.
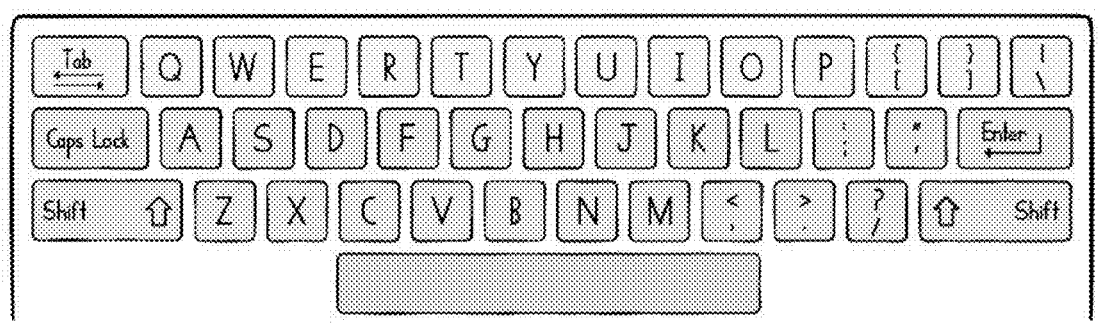

FIG. 48
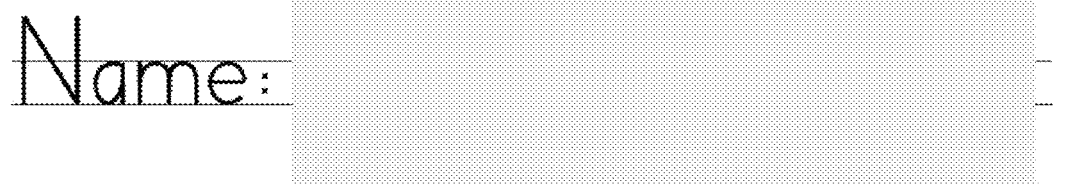
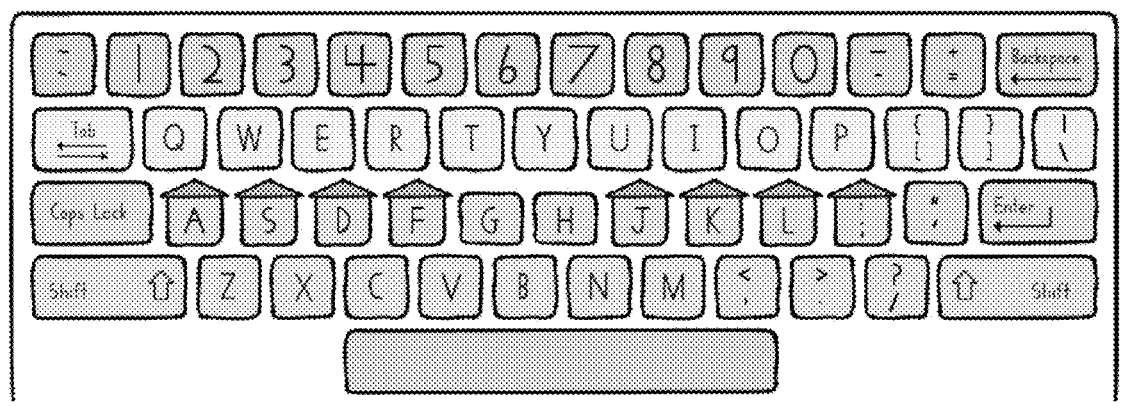

FIG. 51
track      __umpet
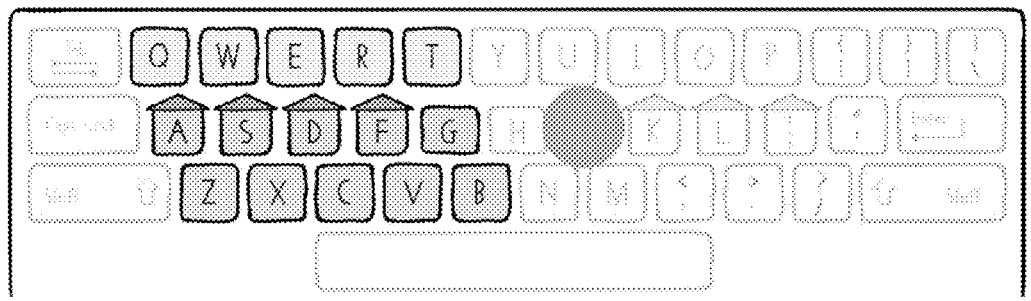

FIG. 52
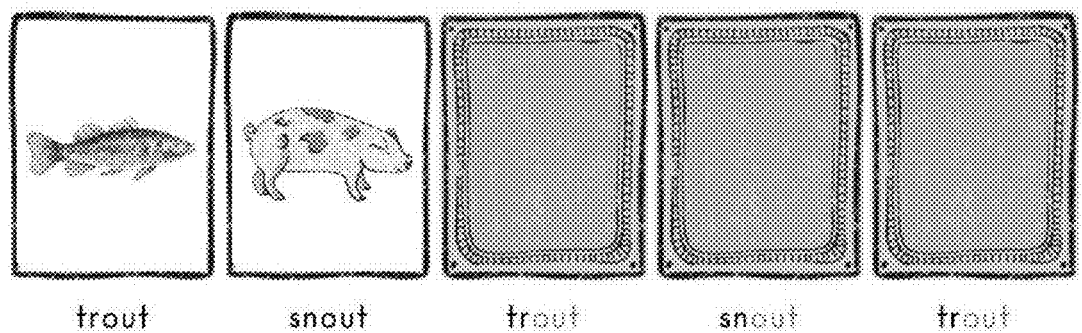
trout    snout    trout    snout    trout
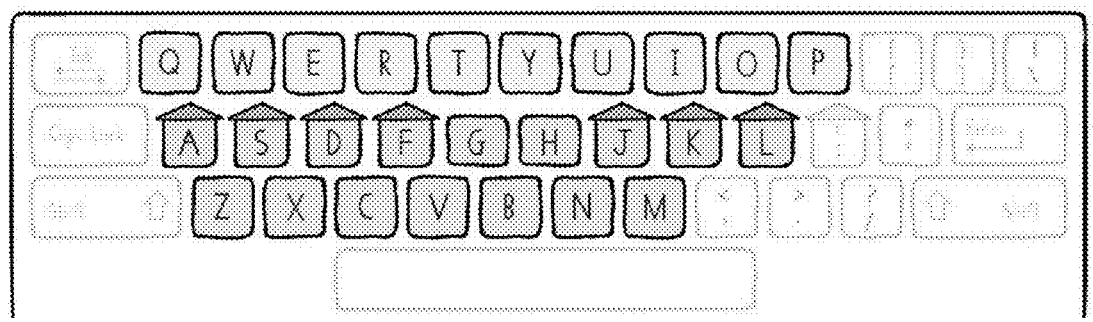

SYSTEM AND METHOD FOR TEACHING PRE-KEYBOARDING AND KEYBOARDING

CROSS-REFERENCE TO RELATED APPLICATIONS

This application claims the benefit of U.S. Provisional Application No. 62/023,560, filed Jul. 11, 2014, the entirety of which is herein incorporated by reference.

FIELD OF THE INVENTION

The invention generally relates to a system and method of teaching pre-keyboarding and keyboarding on a QWERTY-style keyboard to develop a keyboarder's fluency, accuracy, and speed in keyboarding using proper QWERTY keyboarding form. More particularly, the inventions disclosed herein relate to a game-based curriculum that utilizes a dynamic row-based metaphorical and visual cuing system that uses a coding scheme of visual indicators and is comprised of a dynamic virtual keyboard, a context-sensitive dynamic cursor, and a row-based teaching order. The inventions provide developmental instruction for foundational keyboarding skills, including: unilateral hand and finger skills, Home Row hand and finger positions, learning the relational position of symbol location, hand-key association, finger-key association, and learning the essential keystroke spectrum for Home Row positioning-based finger movements of the left and right hand.

BACKGROUND OF THE INVENTION

Various systems and methods of teaching pre-keyboarding and keyboarding to children are known in the prior art. To date, no such system or method has developed an effective, easy-to-teach and easy-to-learn keyboarding teaching system (KTS) or keyboarding teaching methodology (KTM) that is fun, intuitive, and that simplifies how the foundational skills of pre-keyboarding and keyboarding are imparted to children. In particular, the approach of virtually every instructional curriculum for touch typing or keyboarding in the prior art whose KTM visually partitions the keyboard's rectilinear layout of keys into a plurality of key groupings uniformly do so by partitioning the keyboard's layout of keys into a set of columns, not rows.

For an example of column-based KTMs and KTSs in the prior art, see FIGS. 54-56. Each figure shows an exemplary column-based KTM or KTS that used a visual indicator such as color to visual chunk the spatial organization of the QWERTY layout into a multi-column plurality of keys. For example, FIG. 54 shows a QWERTY layout with multiple columns, including a red column 1 that includes the 1, Q, A, and Z keys, a yellow column 2 that includes the 3, E, D, and C keys, a green column 3 that includes the 4, 5, R, T, F, G, V, and B keys, and a purple column 4 that includes the 8, I, and L keys.

Further, the column-based KTMs and KTSs in the prior art do not emphasize the teaching of pre-keyboarding skills prior to keyboarding skills to provide the technology foundation skills necessary for students to succeed. This pedagogical sequence in keyboarding curricula, of providing pre-keyboarding instruction prior to keyboarding instruction, is paramount to effective developmental learning.

Although the KTMs and KTSs in the prior art do teach the spatial organization of the layout of keys on a keyboard, they do so by displaying the entire keyboard layout as a fixed, non-modifiable, non-adaptable object for the entire duration of an activity or curriculum, irrespective of developmental considerations in visual perception processing that may correlate with a student's age or grade level. In this regard, these KTMs and KTSs do not provide meaningful instructional logic that simplifies the visual and structural complexity of the keyboard layout, by for example re-representing the layout as a modifiable, adaptable object and applying organizational laws and principles of Gestalt psychology to inform how the keyboard layout renders in an activity or curriculum.

The spatio-functional layout of a keyboard is a rectangular matrix of spatially organized, interactive, pressable and releasable rectilinear keys, capable of interactively communicating with a computing device. The commercialization of touch-sensitive screen technologies in the $21^{st}$ century has created a relatively novel keyboard layout in the form of a non-physical virtual keyboard, an alternative to the traditional physical keyboard. A physical keyboard is generally connected by a physical cable, a wireless communication technology, or built in to the hardware of a personal desktop computer or laptop. Alternatively, a virtual keyboard is displayed on a computer screen and is generated by a software program that runs on a personal desktop computer, a laptop, or a touch-sensitive screen device such as an iPad® or tablet. Generally, in the context of touch-sensitive screen devices, the virtual keyboard may be provided by the operating system of the device or may alternatively be provided by a software program that suppresses the operating system's virtual keyboard. On a touch-sensitive device, the virtual keyboard can functionally replace the physical keyboard, enabling the user to press an area on the touch-sensitive screen that corresponds to a virtual key generated by the software, thereby functionally emulating the operability of a physical key on a physical keyboard. Generally, physical and virtual keyboards share the spatio-functional layout of QWERTY key configuration, and perform the same function of enabling a user to connect to and interactively communicate with a computing device by entering data.

The functional and spatial organization of keys and symbols on today's most dominant keyboard layout—the QWERTY keyboard layout—is derived from a $19^{th}$ century mechanical typewriter design, originally invented by Charles Latham Sholes in the 1872 and patented in U.S. Pat. No. 207,559. Sholes' QWERTY keyboard layout is a grid-like spatial organization of rectilinear keys displaying symbols on a substantially rectangular-shaped typewriter interface. The layout inherits its descriptor "QWERTY" from the horizontally- and left-aligned juxtaposition of the Q, W, E, R, T, and Y keys on the keyboard layout's first alphabetic row of keys. In the $21^{st}$ century, Sholes' QWERTY keyboard layout may be implemented in either a physical keyboard or a virtual keyboard. At the time of its invention, the QWERTY typewriter layout provided a revolutionary user interface design solution to the then pervasive mechanical problem of typewriter jamming caused by the spatial proximity of the mechanical metal keys and hammers of commonly typed symbols in English-medium written production in pre-QWERTY typewriter layouts. In pre-QWERTY keyboard layouts, commonly typed symbols in typewriter designs were set on spatially proximate keys. As the typing proficiency of typists increased as the market penetration of typewriting technology spread, so too did the frequency of mechanical jamming of the typewriter's keys and hammers during typing due to their spatially proximity in the mechanical design. Sholes redesigned the layout of symbols displayed on keys to reduce the frequency of jamming by reconfiguring the relational position of symbols and keys on the user interface. Sholes' modified design retained the physical spatial organization of mechanical keys and hammers in the typewriter but reconfigured the symbol-key association. This re-design created spatial distance between commonly typed symbols which also created spatial distance within the typewriter's mechanical design between the corresponding mechanical keys and hammers that corresponded with those commonly typed symbols. Sholes' QWERTY layout resolved the 19$^{th}$ century problem of mechanical typewriter jamming, but by distancing commonly typed symbols, the design also slowed down the typing speed of typists. Since its invention in the 19$^{th}$ century, Sholes' QWERTY keyboard layout has endured into today's digital and de facto post-typewriter age, evident by the adoption of the QWERTY layout in non-mechanical electronic physical and virtual keyboards of modern personal computing devices. Today, the QWERTY keyboard layout predominates, and is learned and used by hundreds of millions of keyboarders. The QWERTY keyboard layout has remained dominant despite numerous attempts since the 1870s to replace Sholes' QWERTY layout with a new, spatio-functional layout that re-configures symbol-key association within the keyboard's rectangular shape. The most notable of such attempts was the DVORAK simplified keyboard layout invented by Dr. August Dvorak in the 1930s, patented in U.S. Pat. No. 2,040,248 and which was based on "the frequency of usage of letters in the English language."

Since the 19$^{th}$ century, Sholes' QWERTY layout has inexorably become a fundamental design assumption of keyboard interfaces of all personal computing devices. The permeating reach of technology, the Internet, and personal computing devices in the everyday human affairs of modern society's digital era approaches omnipresence. By consequence, the need to teach, learn, and use Sholes' QWERTY layout which dominates keyboard designs of personal computing devices has also gradually matured into a foundational skill that students must acquire in primary education. In the educational settings from public school classrooms to private homes, the increasingly central role of technology in instruction continues to inform how educators teach and children learn. The learning needs of children require educators to identify fun, effective pedagogic and methodological approaches to meaningfully impart the foundational skills of pre-keyboarding and keyboarding. In this regard, the challenge to develop a KTS or KTM that makes pre-keyboarding skills and keyboarding skills easy-to-learn and easy-to-teach has been enduring and remains inadequately met by the prior art.

The primary objective of all KTMs and KTSs is to make the development of QWERTY keyboarding form and skills easy-to-teach and easy-to-learn while optimizing the keyboarder's fluency, accuracy, and speed. Eventually, if the KTM is effective, the keyboarder keyboards with fluency, accuracy, and speed, maintaining proper QWERTY keyboarding form from muscle memory. The keyboarder's gaze and attention during keyboarding engages with the computer screen vertically above the keyboard rather than being preoccupied with spatially determining the relational position of symbols and keys on the keyboard beneath it and the three-dimensional finger movements required to press those keys. While the neuro-motor process of symbol location and finger movement may be distinct at first, through practice and instruction over the curriculum of a KTM or KTS, these two processes merged into one.

A keyboarder has proper QWERTY keyboarding form when the keyboarder places the fingers of their left and right hands on the Home Row, the keyboarder's gaze is fixed on the computer screen above the physical keyboard, and the keyboarder iteratively uses one finger of one hand to press one key at one time to render one symbol on the computer screen. With practice, the keyboarder learns to press keys with the most proximate finger vis-à-vis the Home Row hand and finger positions. As the keyboarder presses keys, generally, the keyboarder's Home Row hand positions are stationary while the keyboarder's individual fingers alternate between a stationary position and dynamic movements within the essential keystroke spectrum in order to press and release keys iteratively, ad infinitum, until the keyboard is done keyboarding. Additionally, the keyboarder has good posture and the keyboarder's forearms are not parallel, but rather splayed outward.

The normative, fixed nature of QWERTY keyboard geometry and hand anatomy produces a predetermined spectrum of three-dimensional hand/finger movements. Accordingly, since the spectrum of hand/finger movement is fixed, all KTMs and KTSs teach four common cognitive and motoric elements that are foundational keyboarding skills: (a) unilateral hand and finger skills (b) Home Row Hand and Finger Positions; (c) Relational Position of Symbol Location in the Symbol-Key Association Matrix (SKAM) (d) Home Row Positioning-Based Keystroke Spectrum of Essential Finger Movements. KTMs and KTSs generally teach these four skills but may diverge in their approach to do so.

FIG. 3 displays a full QWERTY layout. The set of keys in a QWERTY keyboard layout maybe categorized into five key groupings: (1) Alphabetic Keys (2) Numeric Keys (3) the Space Bar (4) Punctuation Keys (5) Action Keys. The Alphabetic Keys include twenty-six keys each of which display one of the following array of symbols: {A, B, C, D, E, F, G, H, I, J, K, L, M, N, O, P, Q, R, S, T, U, V, W, X, Y, Z}. The Numeric Keys include ten keys, each of which display one of the following array of symbols: {0, 1, 2, 3, 4, 5, 6, 7, 8, 9}. The Punctuation Keys include five keys, each of which display one of the following array of symbols: {period/more than, comma/less than, semicolon/colon, forward slash/question mark, 1/exclamation point}. The Action Keys include six keys, each of which display one of the following array of symbols: {enter/return, backspace, left shift, right shift, left tab}.

The essential keystroke spectrum of Home Row positioning-based finger movements that develop proper finger-key association habits of keyboarders comprises forty-six unique keystrokes: twenty-six keystrokes for Alphabetic Keys {A-Z}; ten keystrokes for Numeric Keys {0-9}; one key stroke for the Space Bar; four keystrokes for Punctuation Keys {period/greater than, semicolon/colon, comma/less than, forward slash/question mark, exclamation point (which shares the keystroke of the 1 key)}; five keystrokes for Action Keys {enter/return, backspace, left shift, right shift, left tab}.

Within this forty-six stroke essential keystroke spectrum for Home Row positioning-based finger movements, left hand finger-key association consists of the following finger-key associations in the Alphabetic Key grouping: the pinky finger presses the Q key on the Top Row, the A key on the Home Row, and the Z key on the Bottom Row; the ring finger presses the W key on the Top Row, the S key on the Home Row, and the X key on the Bottom Row; the middle finger presses the E key on the Top Row, the D key on the Home Row, and the C key on the Bottom Row; the index finger presses the R and T keys on the Top Row, the F and G keys on the Home Row, and the V and B keys on the Bottom Row.

Right hand finger-key association consists of the following finger-key associations in the Alphabetic Key grouping: the index finger presses the Y and U keys on the Top Row, the H and J keys on the Home Row, and the N and M keys on the Bottom Row.

Left hand finger-key association consists of the following finger-key associations in the Numeric Key grouping: the pinky finger presses the 1 key, the ring finger presses the 2 key, the middle finger presses the 3 key, the index finger presses the 4 and 5 keys.

Right hand finger-key association consists of the following finger-key associations in the Numeric Key grouping: the pointer finger presses the 6 and 7 keys, the middle finger presses the 8 key, the ring finger presses the 9 key, and the pinky finger presses the 0 key. In the Action Key grouping, since the backspace key and enter/return keys are spatially located on the right hand side of the QWERTY keyboard layout, the pinky finger presses these keys; since the tab key and shift key may be located on either the left or right hand sides of the QWERTY keyboard layout, the pinky finger of either the left or right hand may press these keys.

Right hand finger-key association consists of the following finger-key associations in the Punctuation Key grouping: the ring finger presses the period/more than key, the middle finger presses the comma/less than key, the pinky finger presses the semicolon/colon key, the pinky finger presses the forward slash/question mark key.

Left hand finger-key association consists of the following finger-key associations in the Punctuation Key grouping: the pinky finger presses the 1/exclamation point key. For the space bar, the thumb of either the left or right hand presses this key.

Children find keyboarding challenging is that learning how to keyboard requires a child to re-conceptualize their working understanding and prior knowledge of the array of symbols in the alphabet spatially. Prior to learning the QWERTY keyboard layout, as a generally matter, a child's only exposure to memorizing a set of numerical or alphabetical symbols is within the framework of sequential, non-spatial, one-dimensional ordering, numerical in the case of numbers and alphabetic in the case of letters. This framework to conceptualize and memorize a multi-symbol array—like numbers (0 to 9) or the alphabet (A to Z)—does not require a child to learn spatial relational relationships between those symbols. Whether taught by a row-based or column-based KTM or KTS, the QWERTY keyboard layout, a multidimensional spatial configuration of relationally positioned keys displaying symbols requires this learning. The teaching and learning of the spatial relational position of symbol location or finger movements to reach those symbols in rectangular shaped grid, like a physical or virtual keyboard, is new and difficult for a child. Learning the spatial organization of symbols on the QWERTY keyboard requires that child to translate their understanding of a sequential, non-spatial, one-dimensionally ordered array of symbols to a spatial, multidimensional ordering of symbols with relational positions.

The Home Row contains the keys displaying the symbols A, S, D, F, G, H, J, K, L, and semicolon/colon and is vertically centered in the spatial organization of the QWERTY keyboard, with two rows above it (the Number Row, Top Row) and two beneath it (the Bottom Row, Spacebar Row). For example, the Home Row is the green row in FIG. 3. A student's hands are in the Home Row Position when the pinky, ring, middle, and pointer finger of the left hand are respectively positioned on the "A," "S," "D," and "F" keys and the pointer, middle, ring, and pinky fingers of the right hand are respectively positioned on the "J," "K," "L," and ":/;" keys. Once the left and right hands are in the Home Row Position, this hand positioning structures the keystroke spectrum of essential finger movements of the left and right hand. Although virtually all KTMs and KTSs teach this singular keystroke spectrum of physiologically identical Home Row-positioning based finger movements, their approach to teaching the relational position of symbol location on the QWERTY layout's visual perceptual field and their approach to provide clues to cue those finger movements from the Home Row Position differ, diverge, and vary in effectiveness and simplicity.

The Symbol-Key Association Matrix (SKAM) represents the structure and spatial organization of symbol-key pairings in the QWERTY keyboard layout. See FIG. 23 for a visual illustration of the SKAM. Every KTM and KTS developed for the QWERTY keyboard layout teaches the SKAM in different ways. The SKAM includes five vertically-aligned rows: the Number Row, the Top Row, the Home Row, the Bottom Row, the Space Bar Row; the Number Row is above the Top Row; the Top Row is above the Home Row; the Home Row is above the Bottom Row; the Bottom Row is above the Space Bar Row. From left to right, the Number Row contains fourteen keys which respectively display the following fourteen symbols: {tilda/left quote, 1/!, 3/#, 4/$, 5/%, 6/A, 7/&, 8/*, 9/(, 0/), minus/underscore, equal/plus, backspace}. From left to right, the Top Row contains fourteen keys which respectively display the following fourteen symbols: {tab, Q, W, E, R, T, Y, U, I, O, P, open bracket/open brace, close bracket/close brace, backslash/bar}. From left to right, the Home Row contains thirteen keys which respectively display the following thirteen symbols: {caps lock, A, S, D, F, G, H, J, K, L, semicolon/colon, right quote mark/double quote mark, enter/return}. From left to right, the Bottom Row contains twelve keys which respectively display the following twelve symbols: {left shift, Z, X, C, V, B, N, M, comma/less than, period/more than, forward slash/question mark, right shift}. The Space Bar Row contains one key that displays no symbol. For each key in the Number Row, Top Row, Home Row, and Bottom Row, if the key is pressed after either the left shift key or right shift key in the Bottom Row has been pressed, then the glyph to the right of the "/" is rendered on the computer screen; alternatively, if the key is pressed with both the left shift key and right shift key in the released state, the glyph to the left of the "/" is rendered on the computer screen.

Today, many traditional systems and teaching methods known in the prior art fail to effectively teach foundational pre-keyboarding skills that develop: fine motor skill development for the finger and hand positioning and movements required for keyboarding; unilateral hand and finger skills which teach students to learn to use their hands and fingers separately; or the structural and spatial organization of the QWERTY keyboard. Prior commercially available teaching methods for keyboarding, mainly column-based approaches, can be overwhelming to students of any age, let alone children. Column-based approaches use a finger/color association scheme in their approach to use color to partition the keyboard into groupings of keys, assigning a finger to a color and then associating that finger with a set of keys rendered in that color on the keyboard. This builds finger-key association and finds expression in color-coded columns. However, such column-based approaches make keyboarding hard-to-teach and hard-to-learn because they manufacture complexity by creating a multiplicity of color-coded key groupings, and cluttering the spatial organization of the QWERTY keyboard by requiring children to learn up to nine or ten color-coded key groupings of columns. Although the plurality of columns is numerically less than the plurality of keys, the number of columns is still too great for any keyboarder to reasonable remember. More, column-based approaches may also replicate color-to-column associations for the fingers of the left and right hand, so that one color maps to at least two columns on the QWERTY keyboard, a first column of which is assigned to one finger of one hand, and a second column of which is assigned to the same finger of the other hand. This use of color-to-column mapping schemes can generate right-left confusion in keyboarding at early developmental learning stages where the color-to-column association may still be competing with the alphabetic character-to-key association in the child's mind. As such, in column-based keyboarding teaching methodologies, since each column contains at least three keys positioned vertically in the QWERTY keyboard layout, one color may map to two columns in the finger/color association scheme, which gives a child only a ⅙ chance of typing the right key by relying on color as a clue to correct keyboarding.

SUMMARY OF THE INVENTION

A row-based philosophy pervades the KTMs and KTSs disclosed by the present invention because in contradistinction to the column-based approaches disclosed by the prior art, a row-based approach to making pre-keyboarding and keyboarding skills easy-to-teach and easy-to-learn is simpler and more effective. Fundamentally, the act of keyboarding is pressing keys after locating keys displaying symbols on the QWERTY layout. With a keyboarder's hands correctly placed on the Home Row, approximately ninety percent of Home Row positioning-based keystrokes require vertical finger movement up or down from the Home Row. Row-based and column-based approaches to KTM and KTS diverge fundamentally in how the aforementioned common four foundational skills are taught and learned. The visual chunking effect of a row-based approach uses color effectively to indicate movement. It guides the finger up or down through a change in color on the vertical axis for the finger that must move. It also simplifies the keyboard by creating only three groups or chunks of keys, if we consider only the alphabetic keys of the QWERTY layout. The row-based approach also makes teaching the Home Row—a foundational keyboarding skill—easy because all Home Row keys are displayed in one visual indicator, such as a color as in FIG. 1, or a line pattern as in FIG. 13.

In contrast, a column-based approach does not facilitate finger movement up or down from the Home Row because there is no change in color for the finger that must move. With a keyboarder's hands on the Home Row, since human anatomy physiologically restricts the human finger to only move up or down from the Home Row, color-coding the vertical range of movement with one color is unhelpful and can not function as a visual clue to cue such movement. The use of color also creates unnecessary complexity, often drowning the keyboard in as many as ten columns of color. For example, see FIGS. 54-56.

This approach to visual chunking also complicates how a column-based approach teaches the Home Row whose keys may be in ten different colors. For example in FIGS. 54-56, the Home Row keys—including A, S, D, F, G, H, J, K and L—are not visually chunked in one color but have two or more colors, visually creating two or more groups which manufactures visual complexity of the Home Row and creates visual figure-ground confusion for the student.

Accordingly, the present invention utilizes a color-coded row-based KTM and KTS which results in simplifying the teaching and learning of the following keyboarding skills: (1) unilateral hand and finger skills (2) Home Row hand and finger positions (3) the relational position of symbol location in the SKAM (4) Home Row positioning-based keystroke spectrum of essential finger movements of the left and right hand. The color-coded row-based approach of the present invention, whose visual chunking effects creates a smaller plurality of relational objects than a row-based approach, limits its color-coding scheme to a reasonably memorizable, manageable array of rows that simplifies the teaching and learning of keyboarding skills. This Gestalt-oriented approach to visual chunking of the QWERTY layout also de-clutters the visual perceptual field of the QWERTY layout and avoids the manufactured visual complexity of and figure-ground confusion caused by the column-based color-coding schemes that may introduce up to ten colors in a keyboarders perceptual field of vision in any given column-based KTM.

System and methods according to the present invention use software-implemented digital tools in a keyboarding curriculum to teach foundational keyboarding skills, including: (1) unilateral hand and finger skills (2) Home Row hand positions (3) the relational position of symbol location in the SKAM (4) Home Row positioning-based keystroke spectrum of essential finger movements of the left and right hand. The method teaches these skills by preferably including a row-based metaphorical and visual cuing system. Additionally, this row-based metaphorical and visual cuing system may also include some or all of the following components: a visual coding scheme, a dynamic virtual keyboard, a context-sensitive dynamic cursor, an activity space displayed on a screen, activities that develop unilateral hand and finger skills, and a curriculum that organizes a plurality of activities in the activity space in a grade-appropriate, developmental sequence and row-based progression.

The dynamic row-based approach of the present invention uses a visual coding scheme to meaningfully cue keystrokes and simplify the visual perceptual field of the QWERTY layout by visually chunking the spatially organized plurality of keys into a small set of manageable and reasonably memorizable units. Students engage with a visual coding scheme in interactive activities and gradually learn symbol location and keystrokes on the QWERTY layout through indirect memorization, since keystrokes and the relational position of symbols are cued in the present invention, rather than directly memorized by drills and repetition. This approach optimizes a student's visual-partial working memory as that student actively uses the visual coding scheme as a map of the QWERTY layout to learn where keys displaying specific symbols are located on the keyboard and learn which hand and finger they should use to press each key. The visual row-based approach cues those keystrokes with the map-like visual coding scheme of the present invention, enabling students to learn them through indirect memorization achieved through a curriculum of reinforcing instruction and dynamic content.

Further, methods of the present invention teach the QWERTY layout developmentally, by exposing students to individual row sections at a time rather than teaching the entire QWERTY layout all at once in a non-developmental manner.

Systems and methods of the invention can use a desktop or laptop computer having a display screen and a physical keyboard. Alternatively, a tablet with a touch-sensitive display screen such as an iPad® can also be used. In addition, a separate physical keyboard can be connected to the tablet. In either case, the screen will display an activity space and a virtual keyboard or dynamic virtual keyboard. The activity space provides various lessons in the curriculum.

Systems and methods utilize a virtual keyboard that is shown on the display screen. The virtual keyboard has a coding scheme that utilizes unique visual indicators to visually chunk the virtual keys of the virtual keyboard into one column of uniquely identifiable virtual rows. Systems and methods may also utilize a dynamic virtual keyboard with a coding scheme instead of a virtual keyboard. The dynamic virtual keyboard's coding scheme also utilizes unique visual indicators to visually chunk the virtual keys of the virtual keyboard into one column of uniquely identifiable virtual rows. In addition, the dynamic virtual keyboard partitions its virtual rows into row sections and independently toggles their visibility between a visible state and hidden state, and rendering as visible only those row sections taught by the interactive activity in a particular sequence.

An adaptable QWERTY layout may be used to show students keys and symbols that are developmentally-appropriate within a curriculum. The virtual keyboard and dynamic virtual keyboard may selectively omit specific symbols from specific rows of the QWERTY layout, or alter the shape of specific virtual keys, so that the QWERTY layout is adapted to the set of symbol locations and finger movements taught by a particular interactive activity. While specific symbols may be omitted and key shapes may be modified, the adaptable QWERTY layout substantially retains the overall structure and spatial organization of the normal-standard QWERTY layout.

For example, a system for teaching a student keyboarding may provide a computing device with a physical keyboard and a display screen. The display screen may have an activity space in which a student engages an interactive activity that displays a target symbol. The interactive activity may employ a cueing system to prompt the student to press a physical key displaying the target symbol on the physical keyboard. A component of the cuing system, a virtual keyboard that employs a coding scheme of visual indicators to visually chunk the virtual keys into one column of uniquely identifiable virtual rows may be employed to assist the student in identifying the relational position of the physical key displaying the target symbol and learning the proper hand and finger to use to press the physical key. In the system, each visual indicator uniquely identifies one virtual row, and every virtual key in each virtual row is additionally marked by a unique symbol.

For example, a system for teaching a student keyboarding may provide a computing device with a touch-sensitive display screen. The touch-sensitive display screen may have a virtual keyboard and an activity space. A student may engage an interactive activity that displays a target symbol in the activity space. The interactive activity may also employ a cueing system to prompt the student to press a virtual key displaying the target symbol on the virtual keyboard. A component of the cuing system, the virtual keyboard may employ a coding scheme of visual indicators to visually chunk the virtual keys into one column of uniquely identifiable virtual rows. The cuing system assists the student in identifying the relational position of the virtual key displaying the target symbol and learning the proper hand and finger to use to press the virtual key. In the system, each visual indicator uniquely identifies one virtual row, and every virtual key in each virtual row is additionally marked by a unique symbol.

A component of the cuing system, a dynamic virtual keyboard that employs a coding scheme of visual indicators to visually chunk the virtual keys into one column of uniquely identifiable virtual rows may be employed to assist the student in identifying the relational position of the corresponding physical key displaying the target symbol and learning the proper hand and finger to use to press the physical key. Each virtual row of the dynamic virtual keyboard may be partitioned into a left and a right portion that each has a visibility attribute that can be independently toggled between a visible state and a hidden state. When one or more rows are toggled to the visible state, the remaining rows are toggled to the hidden state. In the system, each visual indicator uniquely identifies one virtual row, every virtual key in each virtual row is additionally marked by a unique symbol, and only the portions of the virtual rows that are visible are taught at a particular time.

Also part of the cuing system, a dynamic cursor in the activity space displays a visual clue that may be manipulated among three states: (1) before the student presses a physical key, the visual clue matches the visual indicator of the virtual key displaying the target symbol; (2) after a student presses a physical key, the visual cue indicates the student pressed the incorrect key, and does not advance to a next target symbol; (3) after a student presses a physical key, the visual cue indicates the student pressed the correct key and advances to a next target symbol.

Another system for teaching a student keyboarding may display selected Home Row keys in a design that resembles a house to ease a student's visual discrimination of the Home Row keys from the other keys on the keyboard.

A method for teaching a student keyboarding may provide a computing device having a physical keyboard and a display screen with an activity space, an interactive activity showing a target symbol in the activity space, and a virtual keyboard with virtual keys that each have a depression attribute that the interactive activity can toggle between a pressed state and a released state. In this method, the interactive activity prompts a student to use a one finger of a first hand to press a physical key displaying the target symbol which toggles the depression attribute of a corresponding virtual key displaying said target symbol to the pressed stated. The interactive activity then requires the student to then hold down that physical key for the duration of the interactive activity, and halts the interactive activity if the student releases the physical key, only permitting the resumption of the interactive activity when the student re-presses the physical key to re-toggle said depression attribute to the pressed state. While the student presses this physical key down, the interactive activity prompts the student to use one or more fingers of a second hand to press physical keys. This method can be employed on a computing device having a touch-sensitive display screen.

BRIEF DESCRIPTION OF THE DRAWING FIGURES

FIG. 14B is a plan view of a row-based dynamic virtual keyboard that displays a right row section of the Home Row and shows remaining keys toggled in the hidden state.

FIG. 14K is a plan view of a row-based dynamic virtual keyboard that displays the left row sections of the Top Row and Home Row and Bottom Row and shows remaining keys toggled in the hidden state.

FIG. 15D is a plan view a row-based dynamic virtual keyboard that displays the right row sections of the Top Row and Home Row and shows remaining keys toggled in the hidden state.

FIG. 16 is a chart that shows different forms and stages of a dynamic cursor.

FIG. 21 is a conceptual diagram that illustrates an aspect of a teaching method.

FIG. 23 is a conceptual diagram that illustrates an aspect of a teaching method.

FIG. 27 is a conceptual diagram that illustrates an aspect of a dynamic cursor.

FIG. 34 shows a screen image of a frame of an interactive activity that is entitled "Build a Keyboard."

FIG. 35 shows a screen image of a frame of an interactive activity that is entitled "Build a Keyboard."

FIG. 36 shows a screen image of a frame of an interactive activity that is entitled "Shuffled Letters."

FIG. 43 shows a screen image of a frame of an interactive activity that is entitled "Find The Letter."

FIG. 44 shows a screen image of a frame of an interactive activity that is entitled "Find The Letter."

FIG. 46 shows a screen image of a frame of an interactive activity that is entitled "One And More."

FIG. 48 shows a screen image of a frame of an interactive activity that is entitled "Write My Name."

FIG. 51 shows a screen image of a frame of an interactive activity that is entitled "Dump The Combo."

FIG. 52 shows a screen image of a frame of an interactive activity that is entitled "Rhyme Flip."

DETAILED DESCRIPTION OF THE INVENTION

Figure 1:
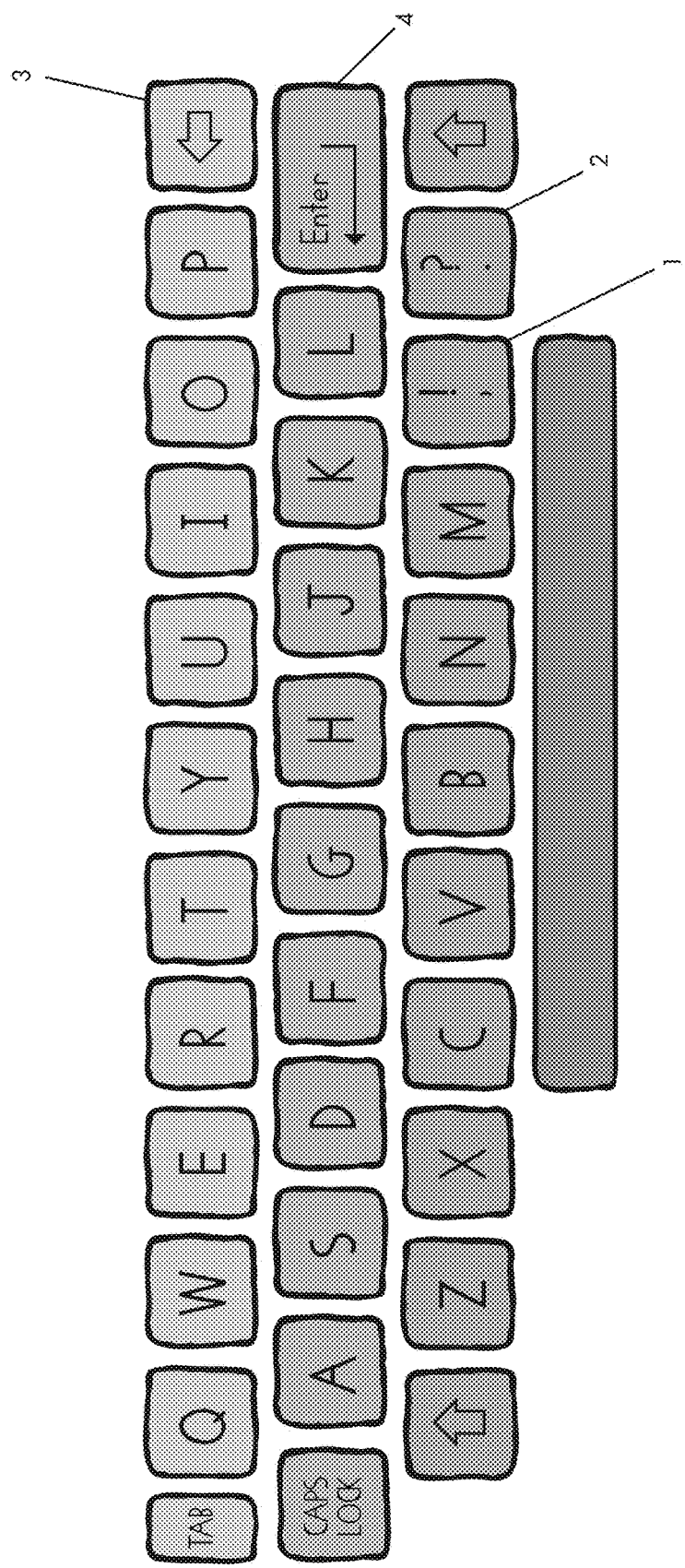
FIG. 1 is a plan view of a row-based color-coded virtual keyboard with child-friendly keys.

The detailed description provided hereafter, which references the attached drawings, describes an embodiment of the invention which comprises a software-implemented online curriculum that teaches students foundational pre-keyboarding and keyboarding skills, unilateral hand and finger skills utilizing a row-based visual cuing system, a row-based curricular teaching order, a virtual dynamic keyboard, and a context-sensitive dynamic cursor.

It should be appreciated that the particular implementations shown and described herein are illustrative of the invention and are not intended to limit the scope of the invention in any way. Furthermore, the conceptual diagrams and connecting lines shown in the various figures contained herein are intended to represent exemplary conceptual, spatial, and functional relationships between various elements of the system and method of the present invention. It should be noted that many alternative or additional conceptual, spatial, and functional relationships may be present in a metaphorical and visual cuing system to teach pre-keyboarding and keyboarding skills.

An important aspect of simplifying how pre-keyboarding and keyboarding skills are taught and learned in a developmental sequence is visual perception processing. Visual perception processing is a set of skills used to gather visual information from the environment and integrate them with other sensual stimuli, like touch, movement, and spatial orientation. Whether embodied in a physical keyboard or virtual keyboard, the QWERTY layout is a three-dimensional functional object requiring a spectrum of three-dimensional hand-finger movements of the left and right hand that are initially guided by the controlled attention of hand-eye coordination for the beginning keyboarder, and later guided innately via muscle memory once the keyboarder has attained fluency and proficiency. A child's fluency with visual perception processing skills forms an essential part of learning pre-keyboarding and keyboarding skills, in part due to the challenging bilateral movement spectrum required by the spatial complexity of the QWERTY layout, which requires students to orient the relational positions of objects, hands, and fingers in space.

Visual perception processing comprises the process of integrating information with other indicia of learning consciousness, such as past experiences, motivation, and development. Students use this information to derive understanding and meaning from the objects in a problem space. Visual perception processing includes six skills: form constancy, figure ground segregation, spatial relation, visual discrimination, visual closure, and visual memory.

Form constancy skills include the ability to identify a form even if it is different in size, orientation, color, or texture. Figure ground segregation skills include the ability to identify a form from the surrounding background. Spatial relation skills include the ability to define the position of objects in space in relation to each other and to one's self. Visual discrimination skills include the ability to perceive the differences and similarities in forms. Visual closure skills include the ability to identify a form even though part of it is not visible. Visual memory skills include the ability to remember the objects and their visual attributes and spatial relationships in a problem space after the problem space has been removed from the active field of vision.

Figure 14A:
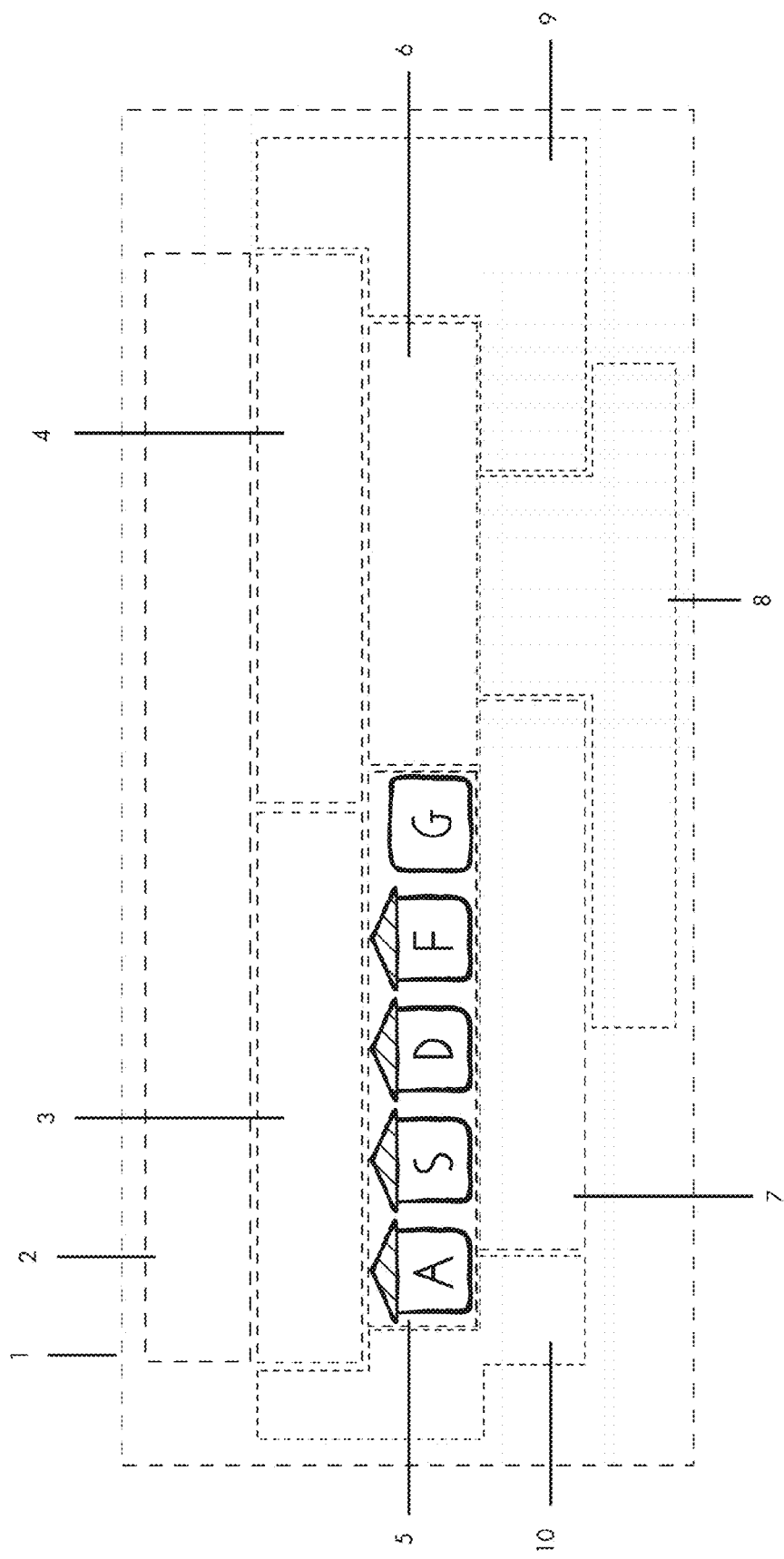
FIG. 14A is a plan view of a row-based dynamic virtual keyboard that displays a left row section of the Home Row and shows remaining keys toggled in the hidden state.

Form constancy is illustrated in the ability of a student to recognize keys in FIG. 1 of the adapted QWERTY layout when the shade of their color is altered. Figure ground segregation is illustrated in FIGS. 14A-O for example, which simplifies the structure of the visible ground of the QWERTY layout by dynamically toggling row sections to a hidden state thereby making it easier for the student to find and select the figure, being a particular key displaying a particular symbol. This dynamic toggling of row section visibility of the QWERTY layout also illustrates visual closure because a student learns to recognize a row section toggled to the visible state as part of the QWERTY layout even though the surrounding row sections may be toggled to the hidden state.

Spatial relation skills are intrinsic to the development of pre-keyboarding keyboarding fluency because students must be able to determining the relational position of keys displaying symbols on the QWERTY layout in order to keyboard from muscle memory.

Figure 2:
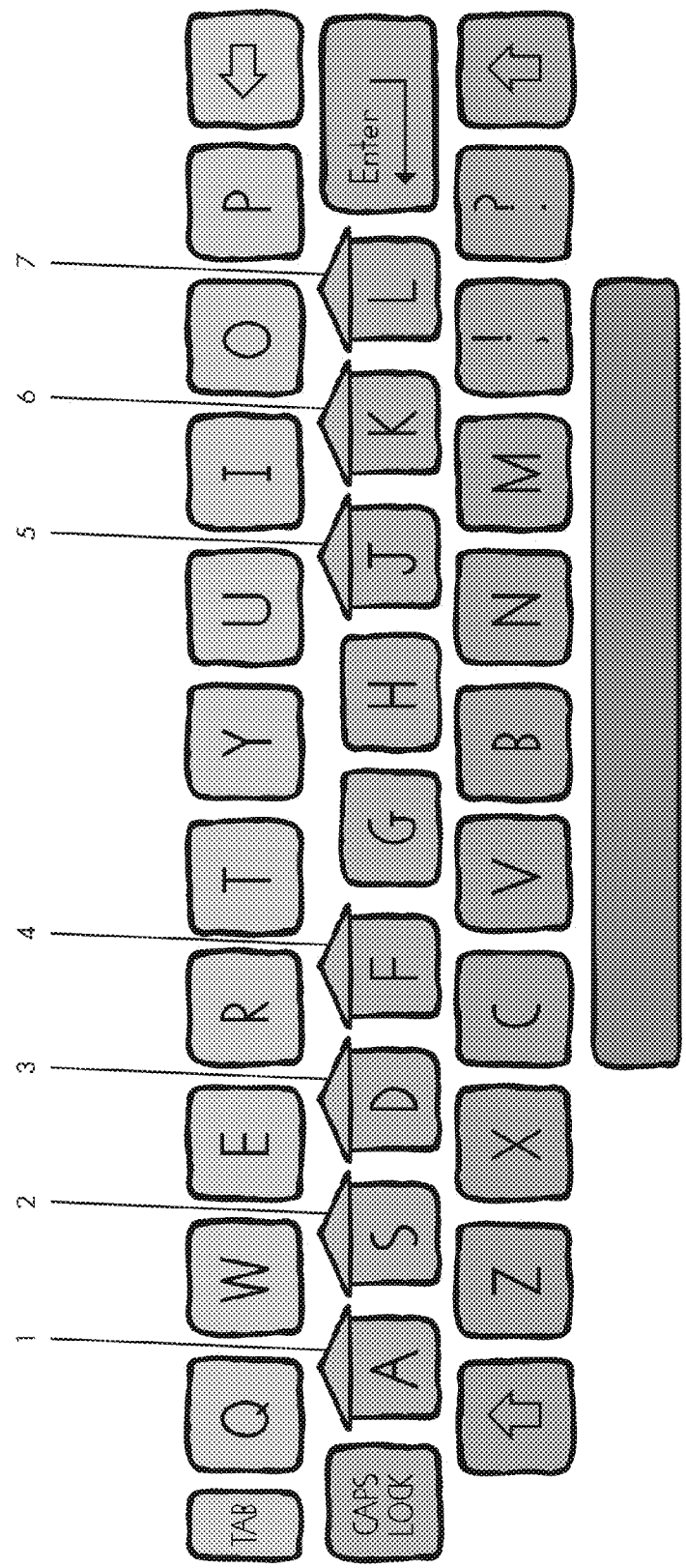
FIG. 2 is a plan view of a row-based color-coded virtual keyboard with child-friendly keys and modified QWERTY layout. In this plan view, selected keys of the Home Row are depicted as a house structure.

Visual discrimination is illustrated in FIG. 2 by the rendering of keys 1-7 as houses to help students differentiate these keys as the Home Row keys. Visual memory is illustrated by FIGS. 1-10 because the simplicity of the row-based color-coding scheme of the QWERTY is reasonably memorizable by students and can inform symbol location and finger movement from memory. Moreover, with a student's hands on the Home Row, two/thirds of the alphabetic rows of the QWERTY layout are substantially obscured by the student's hands and fingers on the Home Row hand positions. The ability of a student to visually memorize the structure of the QWERTY layout assists that student's ability to locate and press keys eventually from muscle memory as they gradually develop keyboarding proficiency.

Another important aspect of simplifying how pre-keyboarding and keyboarding skills are taught and learned in a developmental sequence is the application of Gestalt laws of organization and principles to visual chunking and the visual re-representation of Sholes' QWERTY layout to ease visual perception processing. Generally, the Gestalt laws of organization and principles inform the perception of elements that make up color, structure, and form in a visual perceptual field. These elements are typically arranged through psychological processes into patterns with optimized perceptual organization, whereby better organized stimuli drive better perception with regard to the goals of organization. Perception requires that a stimulus must contain a degree of heterogeneity to enable easy object segregation within the perceptual field that is necessary for the aforementioned aspects of visual perception processing. Differences between objects make individual objects easy to distinguish. A visual perceptual field must also contain a certain amount of redundant information to simplify discrimination and contrast of objects and their spatial organization and structure, which reduces uncertainty and error and contributes to improved organization. Effective responses to stimuli are modulated by the prevailing conditions in the visual perception field.

The application of Gestalt principles in visual chunking to such a visual perceptual field segregates the objects and the position of objects in space into the simplest and most stable of psychologically-ordered parts to minimize psychological and physiological stress incurred by manufactured visual complexity. Grouping a field into small units through the binding of objects into sets of objects encourages a visual chunking effect that can simplify visual perception processing and optimize the role of visuospatial working memory in developmental learning. By chunking and re-representing an array of relationally positioned objects in one visual perceptual field into a smaller number of units, Gestalt-oriented chunking processes can enhance the amount of information a student can hold in visuospatial working memory during an activity or lesson. A student who successfully perceives information in chunks can retain more information than the student who perceives information as many individual elements because the manageable units of objects generated by visual chunking allows for remembering more information and optimizes and assists with the encoding, storage, and recall of information.

The primary purpose of color-coding schemes in a KTM or KTS uses Gestalt-oriented visual chunking to simplify how the relational position of symbol location in the QWERTY keyboard layout and the keystroke spectrum of Home Row positioning-based finger movements are taught by educators and learned by students. The application of color in a deliberate pattern to keys on a keyboard can help visually simplify the perceived structural layout of the QWERTY keyboard layout by perceptually reducing a large plurality of spatially organized keys to a smaller plurality of spatially organized key groupings, like rows or columns. For example, FIGS. 1-10 shows color-coding schemes of the present invention that are applied to a QWERTY layout to visually chunk its spatial organization of keys into rows, and in contrast, FIGS. 54-56 (prior art) show a different color-coding scheme can be applied to a QWERTY layout to visually chunk its spatial organization into a multi-column view.

The act of pre-keyboarding may be defined as the gradual development of fine motor skills and spatial awareness of the relational position of the QWERTY keyboard layout by introducing a beginning keyboarder to hand positioning, relational position of symbol location, the relational position of rows, hand-key association, finger-key association, and the spectrum of one-handed finger movements that lead up to bilaterally integrated two-handed keyboarding. Pre-keyboarding is a preparatory stage in which the student develops hands separately, one hand actively typing while the other hand is static, and engaging a "target" symbol on a QWERTY layout. Pre-keyboarding skills include: using correct sitting posture; placing hands and fingers on the keyboard correctly; building correct hand-key and finger-key associations for the left and right hands; using a mouse as an input device for assorted functions (e.g., click, drag and drop, selecting objects, etc.). The spectrum of one-handed Home Row positioning-based finger movements for the left hand include the twenty-two keystrokes on the left side of the keyboard: {[Q, W, E, R, T, A, S, D, F, G, Z, X, C, V, B] [1, 2, 3, 4, 5], tab, left shift}. For example, in FIG. 3, the keys for these keystrokes include the 5 key and keys to the left of the 5 key in the orange Number row, the T key and keys to the left of the T key in the Top Row, the G key and keys to the left of the G key in the Home Row, the B key and keys to the left of the B key in the Bottom Row.

The spectrum of one-handed Home Row positioning-based finger movements for the right hand include the twenty-three keystrokes on the right side of the keyboard: {[Y, U, I, O, P, H, J, K, L, semicolon/colon, N, M, comma/less than, period/greater than, forward slash/question mark], [6, 7, 8, 9, 0], right shift, backspace, enter}. For example, in FIG. 3, the keys for these keystrokes include the 6 key and keys to the right of the 6 key in the orange Number row, the Y key and keys to the right of the Y key in the Top Row, the H key and keys to the right of the H key in the Home Row, the N key and keys to the right of the N key in the Bottom Row.

Learning and teaching pre-keyboarding skills reinforces and is a developmental precursor to learning and teaching keyboarding skills.

The act of keyboarding may be defined as the motoric and cognitive process of locating symbols, pressing keys, and releasing keys on a QWERTY layout rendered on a physical keyboard, a virtual keyboard, or a dynamic virtual keyboard. Keyboarding is a functional stage in which the student uses both hands on the keyboard to input letters, symbols, numbers, and actions. Keyboarding skills include: the use of two hands for keyboarding across all three alphabetic rows; the use of two hands for punctuation, action, and number keys; the ability to format existing text (e.g., highlight, bold, italicize, underline); the use of a mouse to scroll up or down for lines or text; the use of a mouse to make selections in a drop-down menu; the use of a full keyboard to input complete words, phrases, sentences, or paragraphs.

In the act of keyboarding, first, the student places their left and right hands on the keyboard in a stationary position on the Home Row, whereby the pinky finger, ring finger, middle finger, and index finger of the left hand are respectively placed on the A, S, D, and F keys, and the index finger, middle finger, ring finger, and pinky finger of the right hand are respectively placed on the J, K, L, and semicolon/colon keys. Secondly, after the student's hands and fingers are in this Home Row position, the student proceeds to iteratively move one finger of one hand to press one key at one time to render one symbol on a computing device screen, ad infinitum, until the keyboarder stops. The majority of the student's Home Row positioning-based finger movements fall within a predetermined, essential forty-six keystroke spectrum of Home Row positioning-based finger movements for the left and right hand, ninety percent of which involve vertical finger movements either up or down from the Home Row. The keyboarder continues this sequence of individual finger movements with the left and right hand in relatively stationary positions on the keyboard for the duration of keyboarding. While the process of symbol location and finger movement might initially be distinct cognitive and motoric processes for a beginning keyboarder, as the keyboarder develops fluency through practice and reinforcing instruction, these two processes merge into one.

Symbol-key association, hand-key association, and finger-key association are keyboarding skills that emanate from the calibration of human anatomy to keyboard geometry. They define how the hand and fingers functionally relate to the relational position of keys displaying symbols on the QWERTY layout. Learning symbol-key association on a QWERTY keyboard layout includes a keyboarder's learning of the relational position of keys displaying symbols with respect to other keys displaying symbols. Learning hand-key association on a QWERTY-style keyboard includes a keyboarder's learned association of specific keys on the QWERTY keyboard layout with specific fingers and finger movements of the left or right hand. Learning finger-key association on a QWERTY-style keyboard includes a keyboarder learning which fingers press which keys. Every key other than the Space Bar is pressed either by a finger of the left hand or a finger of the right hand, but never both.

The invention provides a horizontal-color coding scheme that colors the horizontally-aligned keys of a keyboard in one color, and uniquely does so for every set of horizontally-aligned keys, creates the visual perception of rows on the keyboard. For example, see FIGS. 1-10.

The prior art provides a vertical-color coding scheme that colors a vertically-aligned keys of a keyboard in one color, and uniquely does so for every set of vertically-aligned keys, creates the visual perception of columns on the keyboard. For example, see FIGS. 54-56. Column-based teaching methods for keyboarding are additionally ineffective and inefficient for at least the following reasons: (1) by assigning one finger to one color, this increases the probability that a child will need to search for a symbol on a key, creating visual figure ground confusion; (2) a column-based approach complicates teaching the Home Row keys which will all be rendered in a multi-color spectrum of colors assigned to fingers in the finger/color association scheme; (3) a column-based teaching method provides no visual cuing system for vertical finger movements up and down from the home row as there is no change in color within the column; (4) a column-based teaching method, due to the multiplicity of its color-coding scheme, can not generate a simple, effective metaphorical cuing system based on the color-coding scheme; (5) a column-based approach manufactures visual figure-ground confusion in identifying the relational position of symbol location once a keyboarder has identified the correct row because a column based approach color codes the rows of the QWERTY keyboard layout in multiple groupings, forcing a child keyboard to visually discriminate symbols and colors in each row.

A row-based philosophy pervades the KTMs and KTSs disclosed by the present invention because in contradistinction to the column-based approaches disclosed by the prior art, a row-based approach to making pre-keyboarding and keyboarding skills easy-to-teach and easy-to-learn is simpler and more effective. Fundamentally, the act of keyboarding is pressing keys after locating keys displaying symbols on the QWERTY layout. With a keyboarder's hands correctly placed on the Home Row, approximately ninety percent of Home Row positioning-based keystrokes require vertical finger movement up or down from the Home Row. Row-based and column-based approaches to KTM and KTS diverge fundamentally in how the aforementioned common four foundational skills are taught and learned. The visual chunking effect of a row-based approach uses color effectively to indicate movement. It guides the finger up or down through a change in color on the vertical axis for the finger that must move. It also simplifies the keyboard by creating only three groups or chunks of keys, if we consider only the alphabetic keys of the QWERTY layout. The row-based approach also makes teaching the Home Row—a foundational keyboarding skill—easy because all Home Row keys are displayed in one visual indicator, such as a color as in FIG. 1, or a line pattern as in FIG. 13. In contrast, a column-based approach does not facilitate finger movement up or down from the Home Row because there is no change in color for the finger that must move. With a keyboarder's hands on the Home Row, since human anatomy physiologically restricts the human finger to only move up or down from the Home Row, color-coding the vertical range of movement with one color is unhelpful and can not function as a visual clue to cue such movement. The use of color also creates unnecessary complexity, often drowning the keyboard in as many as ten columns of color. For example, see FIGS. 54-56. This approach to visual chunking also complicates how a column-based approach teaches the Home Row whose keys may be in ten different colors. For example in FIGS. 54-56, the Home Row keys—including A, S, D, F, G, H, J, K and L—are not visually chunked in one color but have two or more colors, visually creating two or more groups which manufactures visual complexity of the Home Row and creates visual figure-ground confusion for the student.

Additionally, column-based and row-based KTMs and KTSs essentially differ in how they impart and develop functional, relational, spatial, and associational relationships between variables of color, hand, finger, key, and symbol within the spatial organization of the QWERTY keyboard layout. In this regard, column-based KTMs and KTSs use a color-to-finger coding scheme whereby fingers are assigned a color that maps to a singular column of keys in the QWERTY keyboard layout which defines the essential keystrokes for that finger. Column-based approaches do not use color to meaningfully cue vertical movement since on the vertical axis, there is no break in color on the vertical axis to communicate the finger's change in vertical position as it moves up or down to keys above or beneath the Home Row. Alternatively, a row-based KTM uses a color-keyboard coding scheme whereby a row of keys in the QWERTY keyboard layout are uniquely assigned a color. The row-based KTM approach does cue vertical finger movement since there is a break in color on the vertical axis to enable the discernment of a change in position through the exercise of vertical color comparison.

Figure 53:
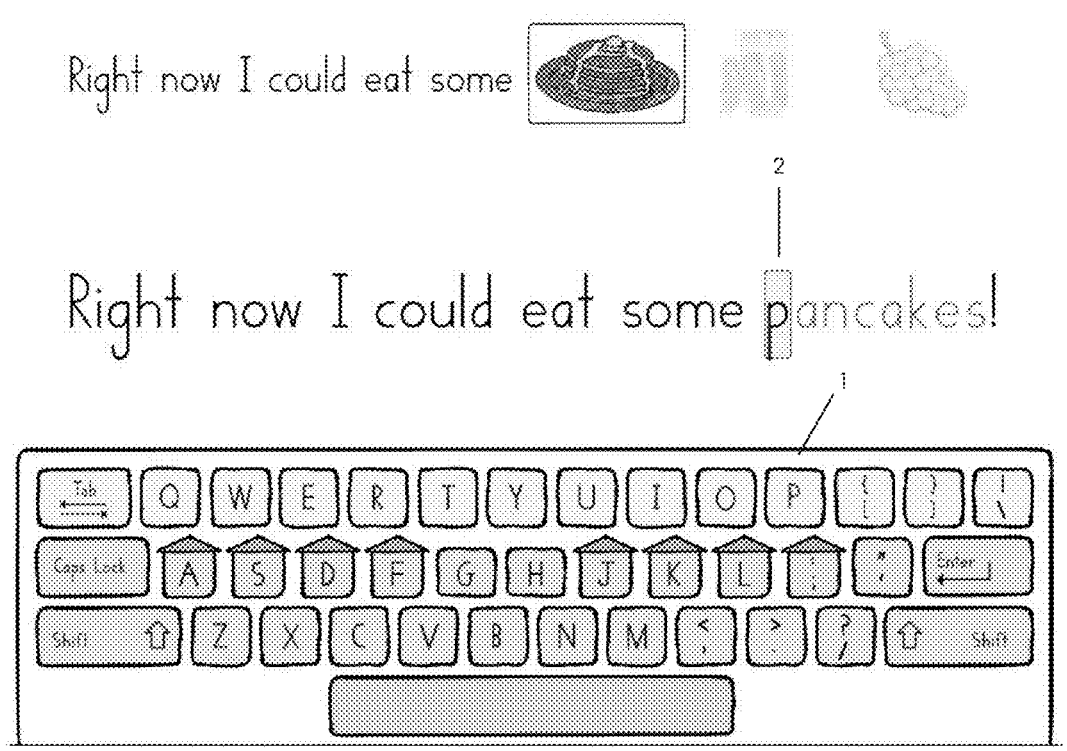
FIG. 53 shows a screen image of a frame of an interactive activity that is entitled "Pick Me."
Figure 54:
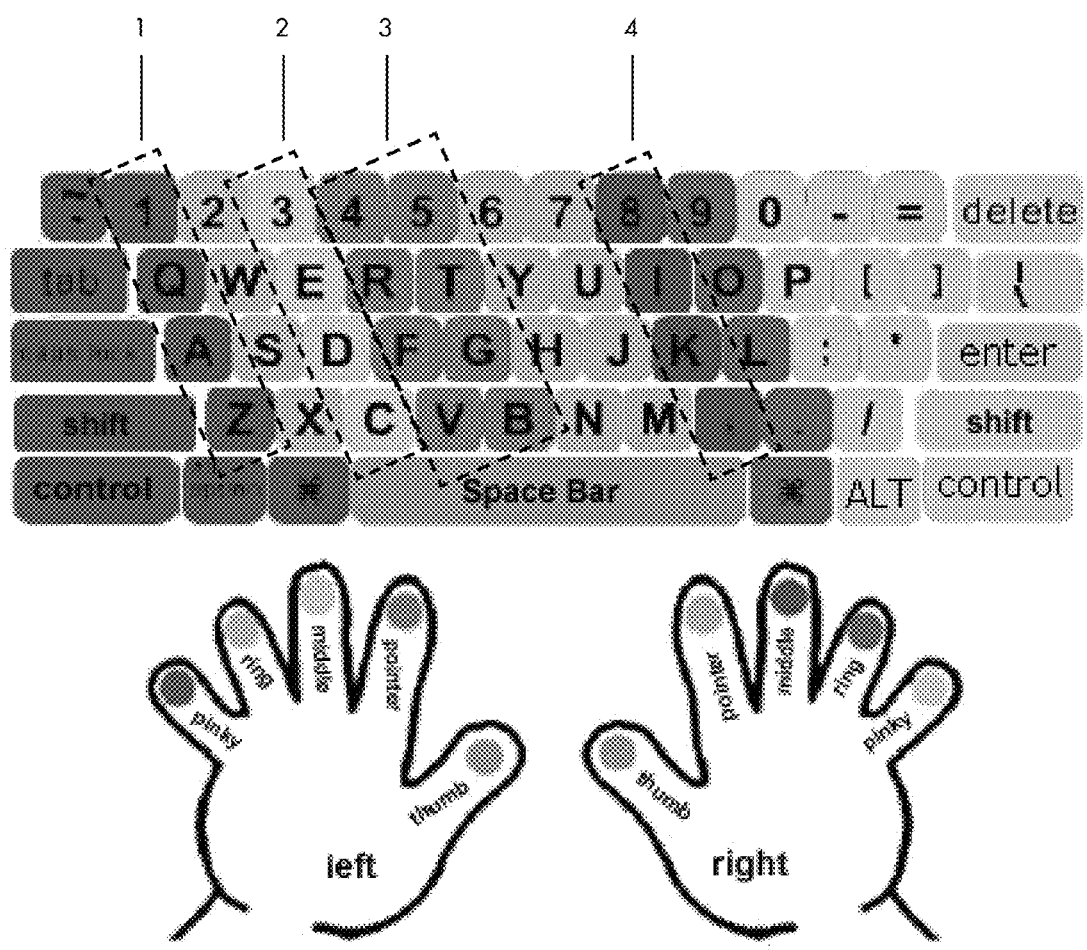
FIG. 54 is a plan view of a column-based system and method for teaching keyboarding in the prior art.
Figure 55:
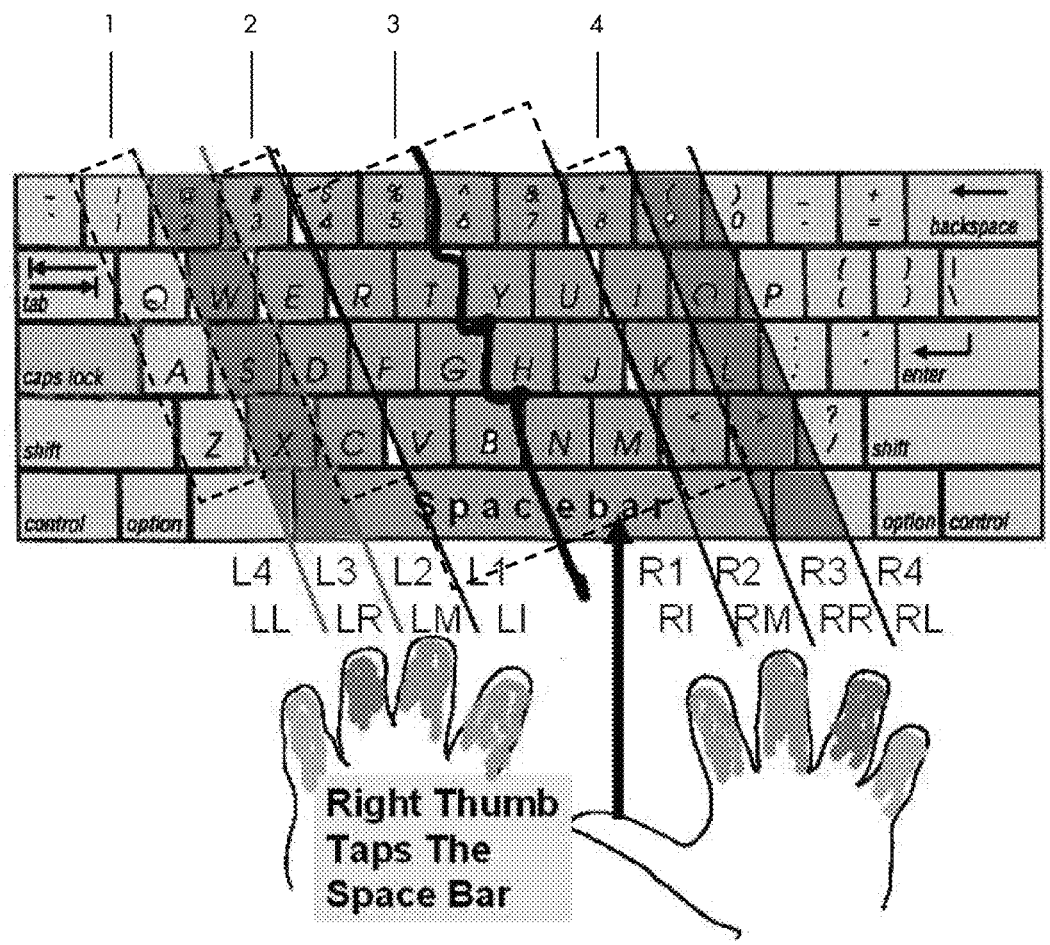
FIG. 55 is a plan view of a column-based system and method for teaching keyboarding in the prior art.
Figure 56:
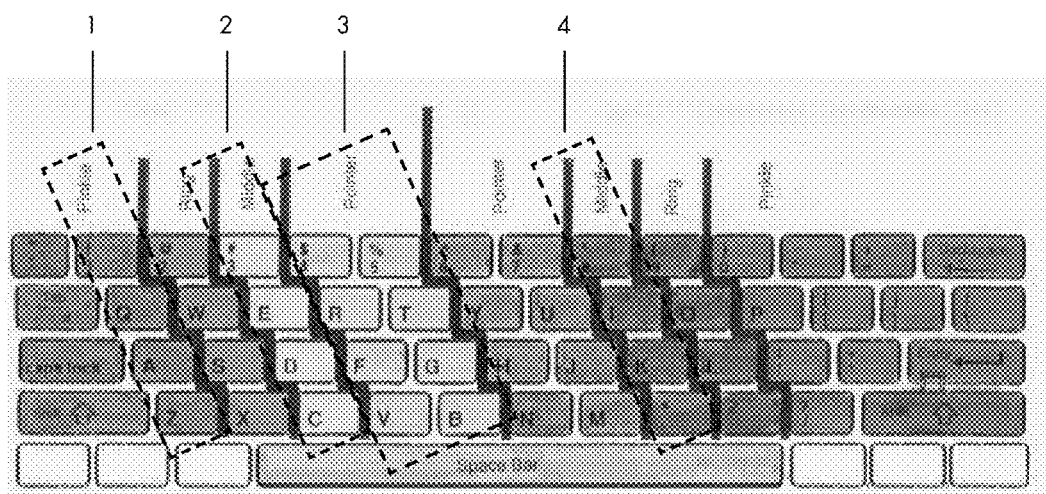
FIG. 56 is a plan view of a column-based system and method for teaching keyboarding in the prior art.

Referring to the drawings and variations in the adaptable QWERTY layout of the virtual keyboard and dynamic virtual keyboard, FIGS. 1-10 display exemplary variations of a row-based virtual keyboard. FIGS. 11-15H display exemplary variations of a row-based dynamic virtual keyboard. FIG. 16 and FIGS. 15-30 display exemplary variations and functions of a dynamic cursor in the system and method of the present invention. FIG. 16 and FIGS. 24-30 show conceptual diagrams that illustrate conceptual, spatial, and functional relationships between various elements of the present invention. FIGS. 31-53 show exemplary display screen images showing still frames of interactive activities in embodiments of the present invention. FIGS. 54-56 show examples of column-based approaches to KTMs or KTSs.

FIG. 1 shows an exemplary virtual keyboard with a row-based color-coding scheme and child-friendly keys which are rendered with a fun, cartoon-like aesthetic to engage students in the primary school level. The Top Row is colored yellow, the Home Row is colored Green, the Bottom Row is colored blue, and the Space Bar is colored purple. The QWERTY layout of the virtual keyboard in FIG. 1 also depicts an adaptable QWERTY layout that has been adapted and modified: the Number Row is not visually displayed; but for the comma/exclamation point key 1 and the period/question mark key 2, no Punctuation Keys are visually displayed; the shape attribute of the backspace key 3 is small. The shape attribute of the enter key 4 is larger than the other keys.

FIG. 2 shows an exemplary virtual keyboard with a row-based color-coding scheme and child-friendly keys which are rendered with a fun, cartoon-like aesthetic to engage students in the primary school level. The adapted QWERTY layout and visual attributes of the virtual keyboard of FIG. 2 are consistent with the visual attributes of the virtual keyboard and adaptable QWERTY layout of FIG. 1, except that FIG. 2 additional displays seven keys of the Home Row, namely the A key 1, S key 2, D key 3, F key 4, J key 5, K key 6, and L key 7 in a manner that is designed to resemble a house. These seven keys are displayed as houses to aid students in associating these keys and their relational position in the Home Row as Home Row keys that anchor the Home Row hand positions of the left and right hand. The rendering of the key shape as a house structure eases visual discrimination of the keys apart from other keys in the QWERTY layout, and reinforces the metaphorical association between a key designed in the shape of a house and the Home Row.

Figure 3:
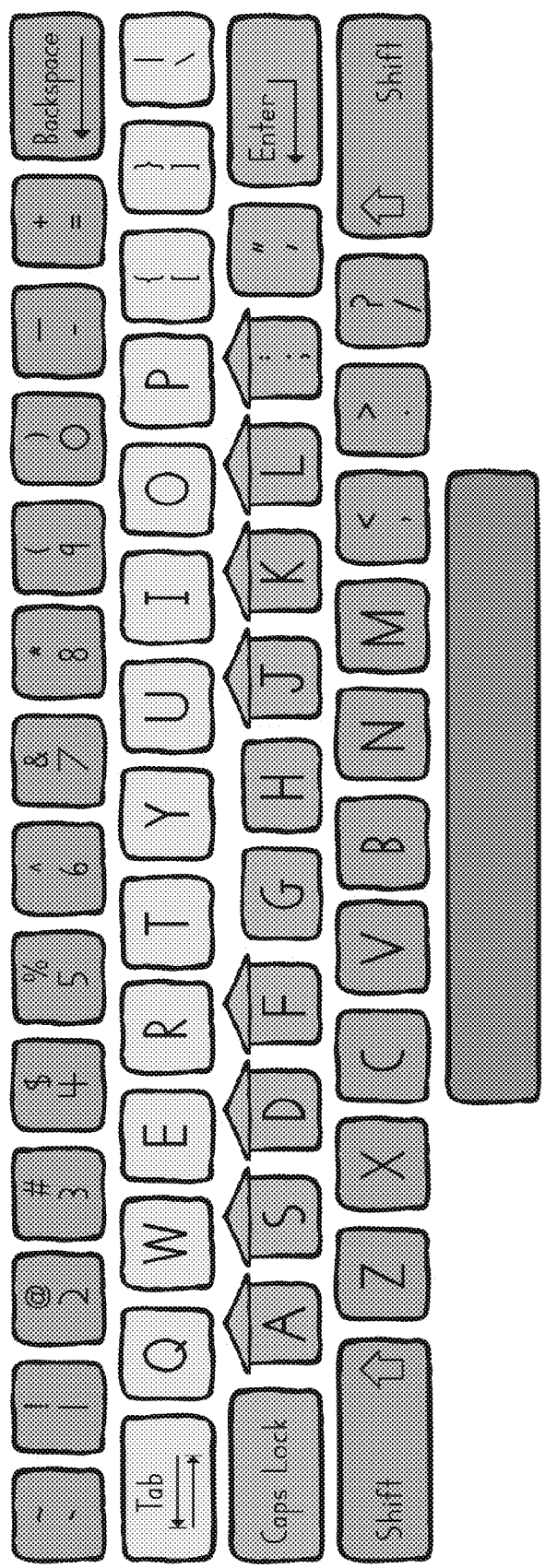
FIG. 3 is a plan view of a row-based color-coded virtual keyboard with child-friendly keys and modified QWERTY layout. In this plan view, selected keys of the Home Row are depicted as a house structure and the Number Row is displayed.

FIG. 3 shows an exemplary virtual keyboard with a row-based color-coding scheme and child-friendly keys. The QWERTY layout of the virtual keyboard displayed in FIG. 3 has not been adapted or modified and its spatial organization of keys displaying symbols is consistent with a normative QWERTY layout. The Number row is colored orange, the Top Row is colored yellow, the Home Row is colored Green, the Bottom Row is colored blue, and the Space Bar is colored purple. Eight keys of the Home Row, namely the A key 1, S key 2, D key 3, F key 4, J key 5, K key 6, L key 7, and the semicolon/colon key 8 are each visually rendered to resemble a house.

Figure 4:
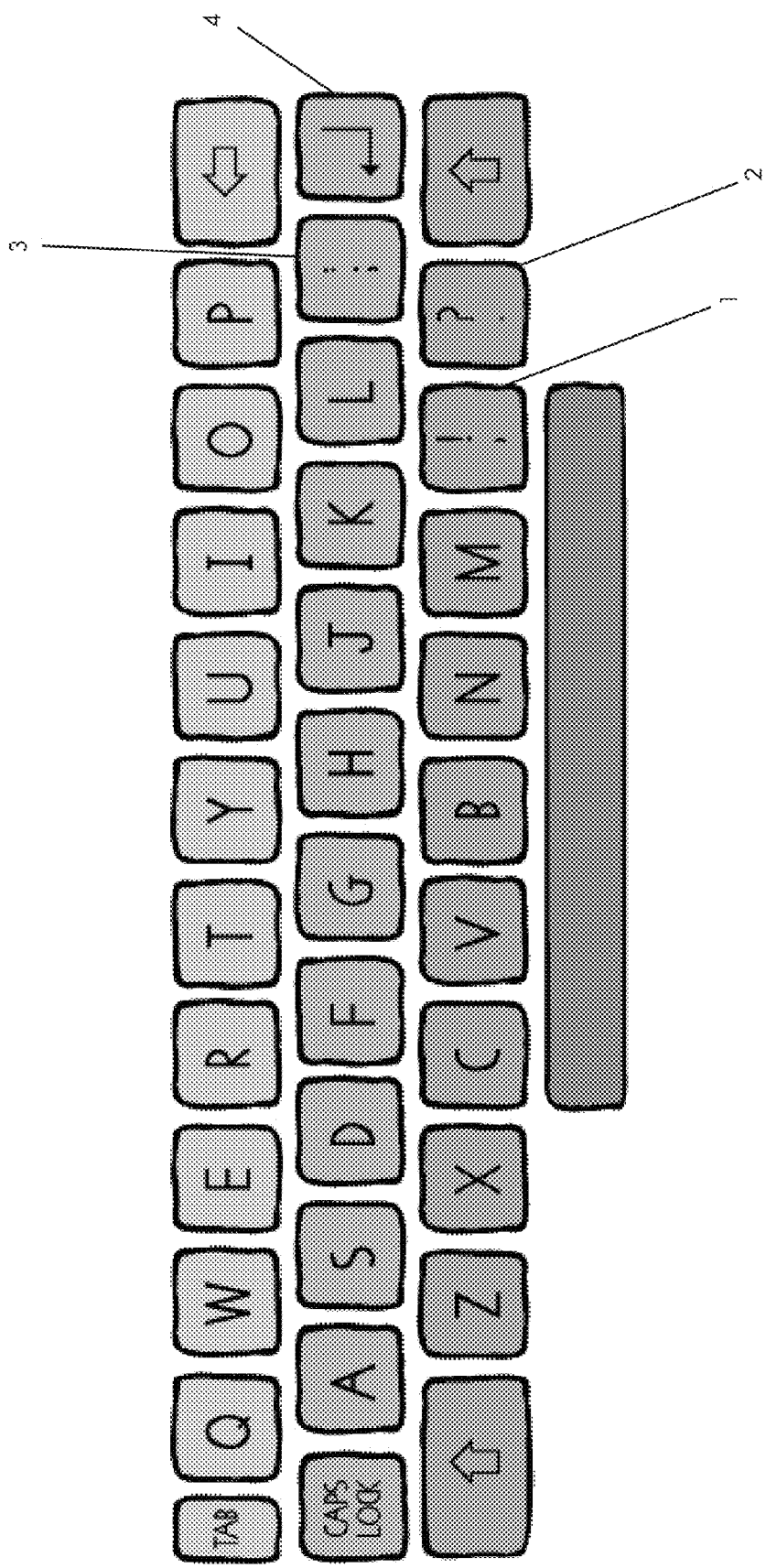
FIG. 4 is a plan view of a row-based color-coded virtual keyboard with child-friendly keys and modified QWERTY layout.

FIG. 4 shows an exemplary virtual keyboard with a row-based color-coding scheme and child-friendly keys. The Top Row is colored yellow, the Home Row is colored Green, the Bottom Row is colored blue, and the Space Bar is colored purple. The QWERTY layout of the adaptable virtual keyboard in FIG. 1 has been adapted and modified with the following changes: the Number Row is not visually displayed; but for the comma/exclamation point key 1 and the period/question mark key 2 and the semicolon/colon key 3, the Punctuation Keys of a normative QWERTY layout are not visually displayed; the shape attribute of the backspace key 3 is larger than normal. The shape attribute of the enter key 4 is smaller than norm and the text "Enter" is no longer part of the symbol displayed on the key.

Figure 5:
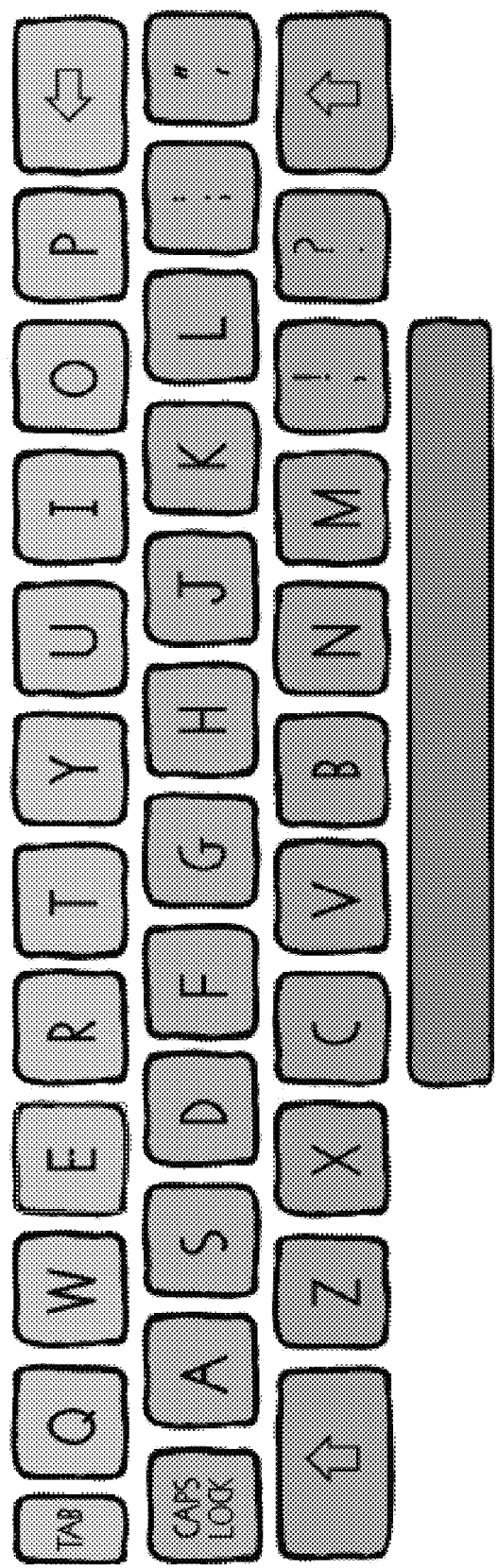
FIG. 5 is a plan view of a row-based color-coded virtual keyboard with child-friendly keys and modified QWERTY layout.

FIG. 5 shows an exemplary virtual keyboard with a row-based color-coding scheme and child-friendly keys. The Top Row is colored yellow, the Home Row is colored Green, the Bottom Row is colored blue, and the Space Bar is colored purple. The adapted QWERTY layout and visual attributes of the virtual keyboard of FIG. 5 are consistent with the visual attributes of the virtual keyboard of FIG. 4, except that FIG. 5 replaces the symbol for enter with the symbol for apostrophe/double quote on key 1.

Figure 6:
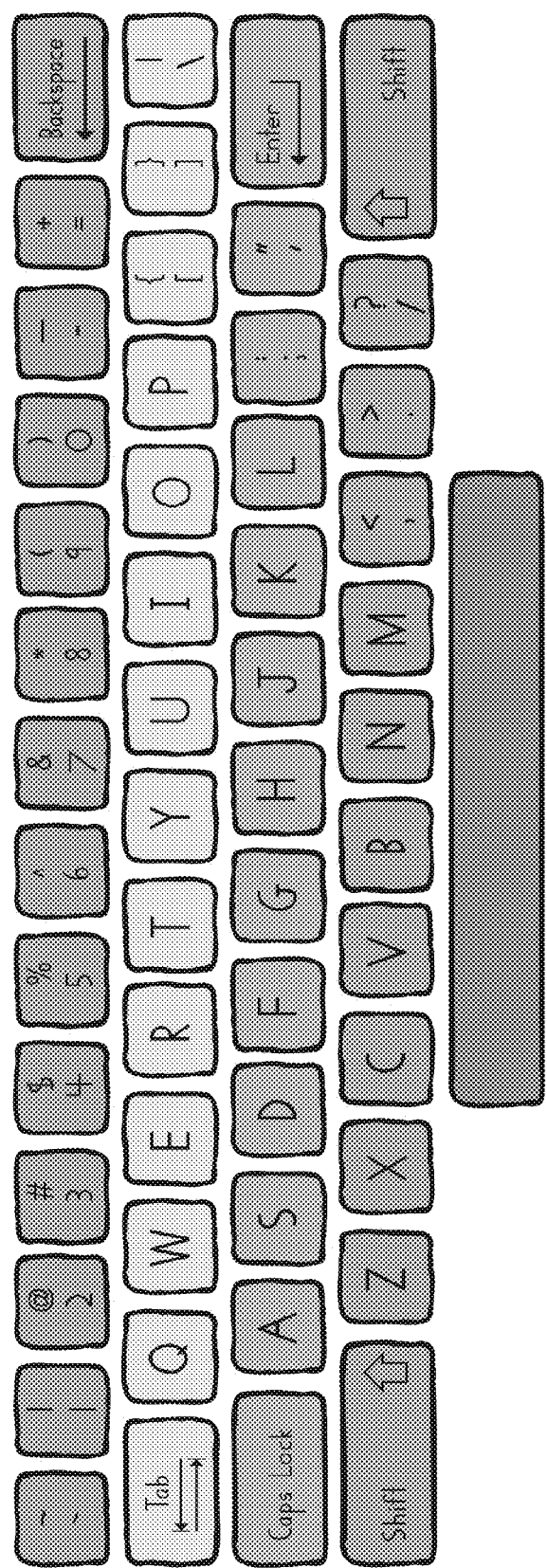
FIG. 6 is a plan view of a row-based color-coded virtual keyboard with child-friendly keys and full QWERTY layout.

FIG. 6 shows an exemplary virtual keyboard with a row-based color-coding scheme and child-friendly keys. The QWERTY layout of the adaptable virtual keyboard displayed in FIG. 3 has not been adapted or modified and its spatial organization of keys displaying symbols is consistent with a normative QWERTY layout. The Number row is colored orange, the Top Row is colored yellow, the Home Row is colored Green, the Bottom Row is colored blue, and the Space Bar is colored purple.

Figure 7:
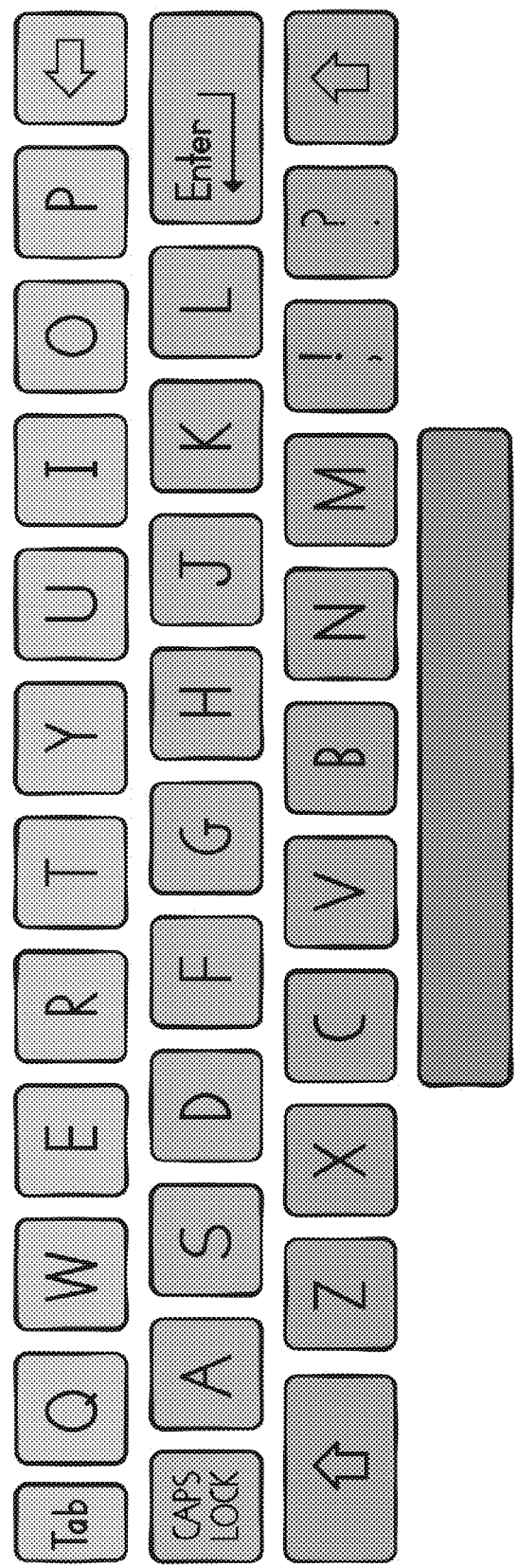
FIG. 7 is a plan view of a row-based color-coded virtual keyboard with square keys and modified QWERTY layout.

FIG. 7 shows an exemplary virtual keyboard that displays the adapted QWERTY layout of the adaptable virtual keyboard in FIG. 1, except that the key shape of each key has been altered from child-friendly and cartoonish to square shaped.

Figure 8:
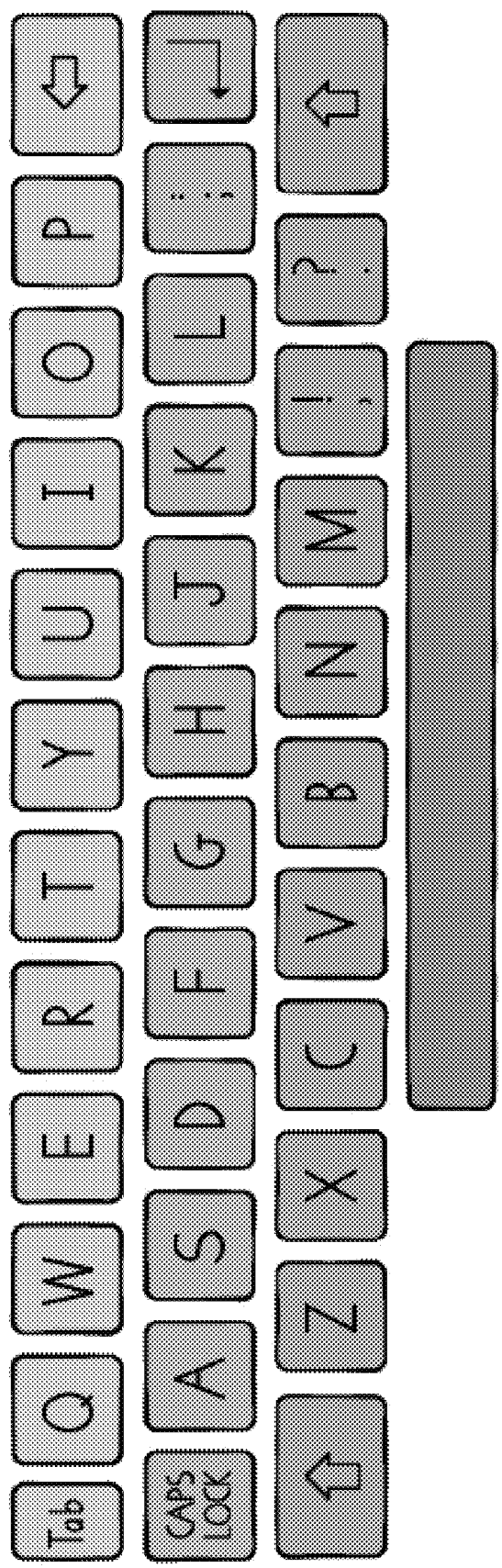
FIG. 8 is a plan view of a row-based color-coded virtual keyboard with square keys and modified QWERTY layout.

FIG. 8 shows an exemplary virtual keyboard that displays the adapted QWERTY layout of the adaptable virtual keyboard in FIG. 4, except that the key shape of each key has been altered from child-friendly and cartoonish to square shaped.

Figure 9:
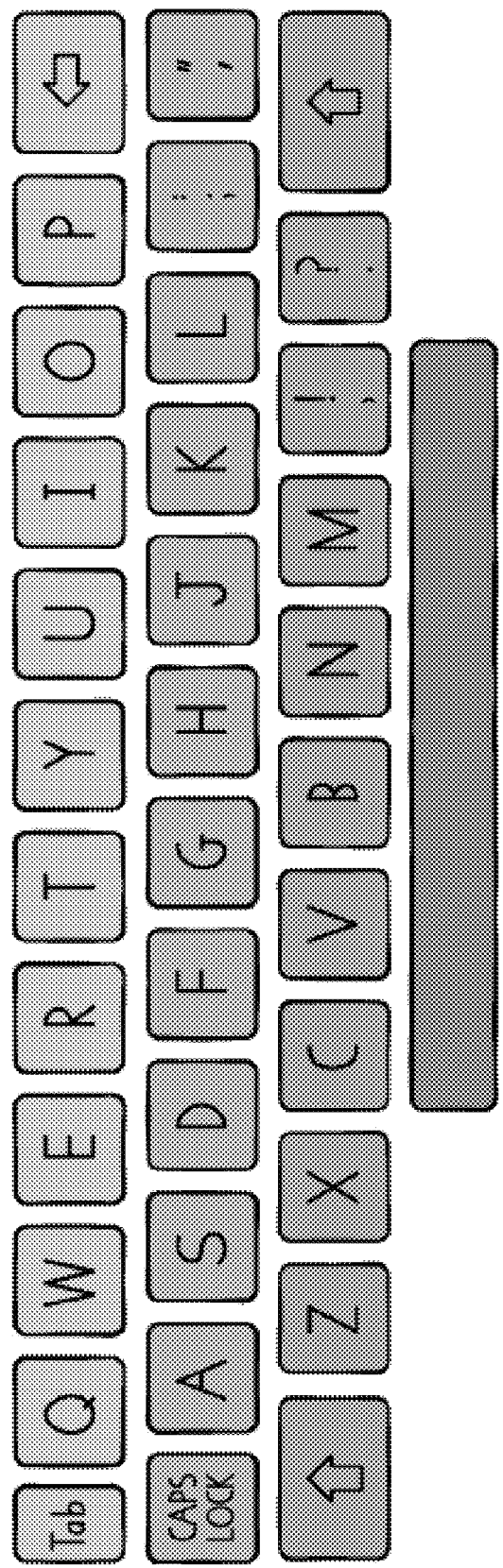
FIG. 9 is a plan view of a row-based color-coded virtual keyboard with square keys and modified QWERTY layout.

FIG. 9 shows an exemplary virtual keyboard that displays the adapted QWERTY layout of the adaptable virtual keyboard in FIG. 5, except that the key shape of each key has been altered from child-friendly and cartoonish to square shaped.

Figure 10:
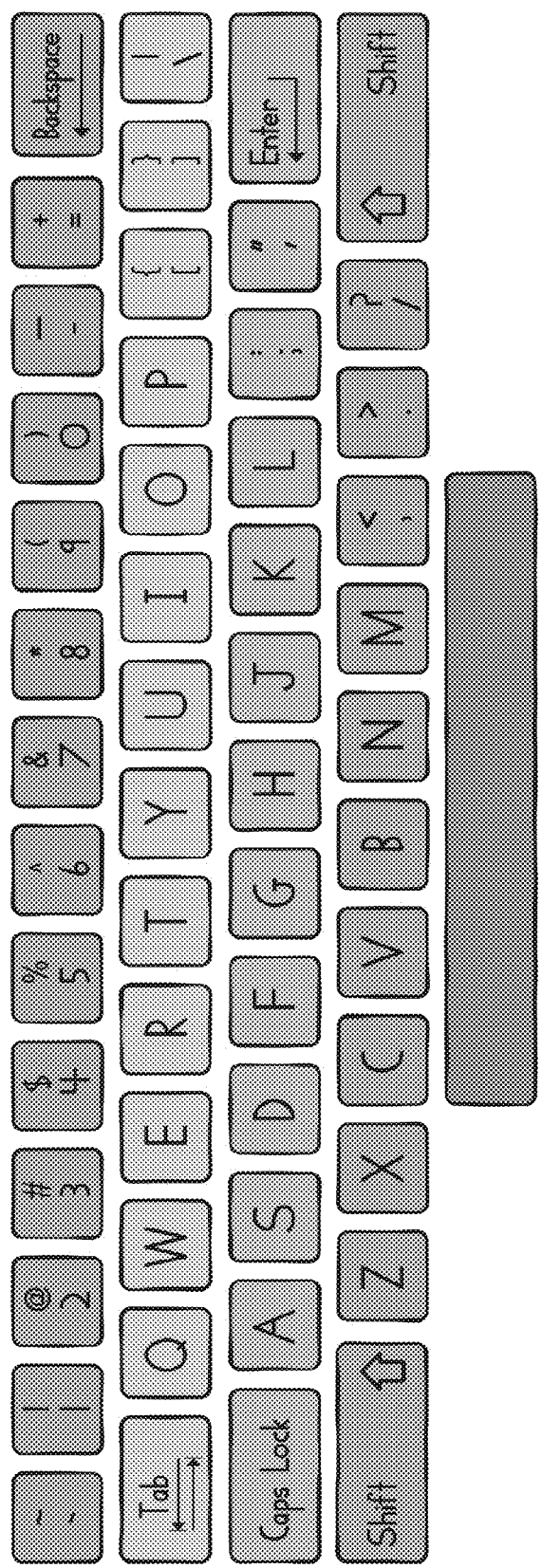
FIG. 10 is a plan view of a row-based color-coded virtual keyboard with square keys and full QWERTY layout.

FIG. 10 shows an exemplary virtual keyboard that displays the adapted QWERTY layout of the adaptable virtual keyboard in FIG. 5, except that the key shape of each key has been altered from child-friendly and cartoonish to square shaped.

Figure 11:
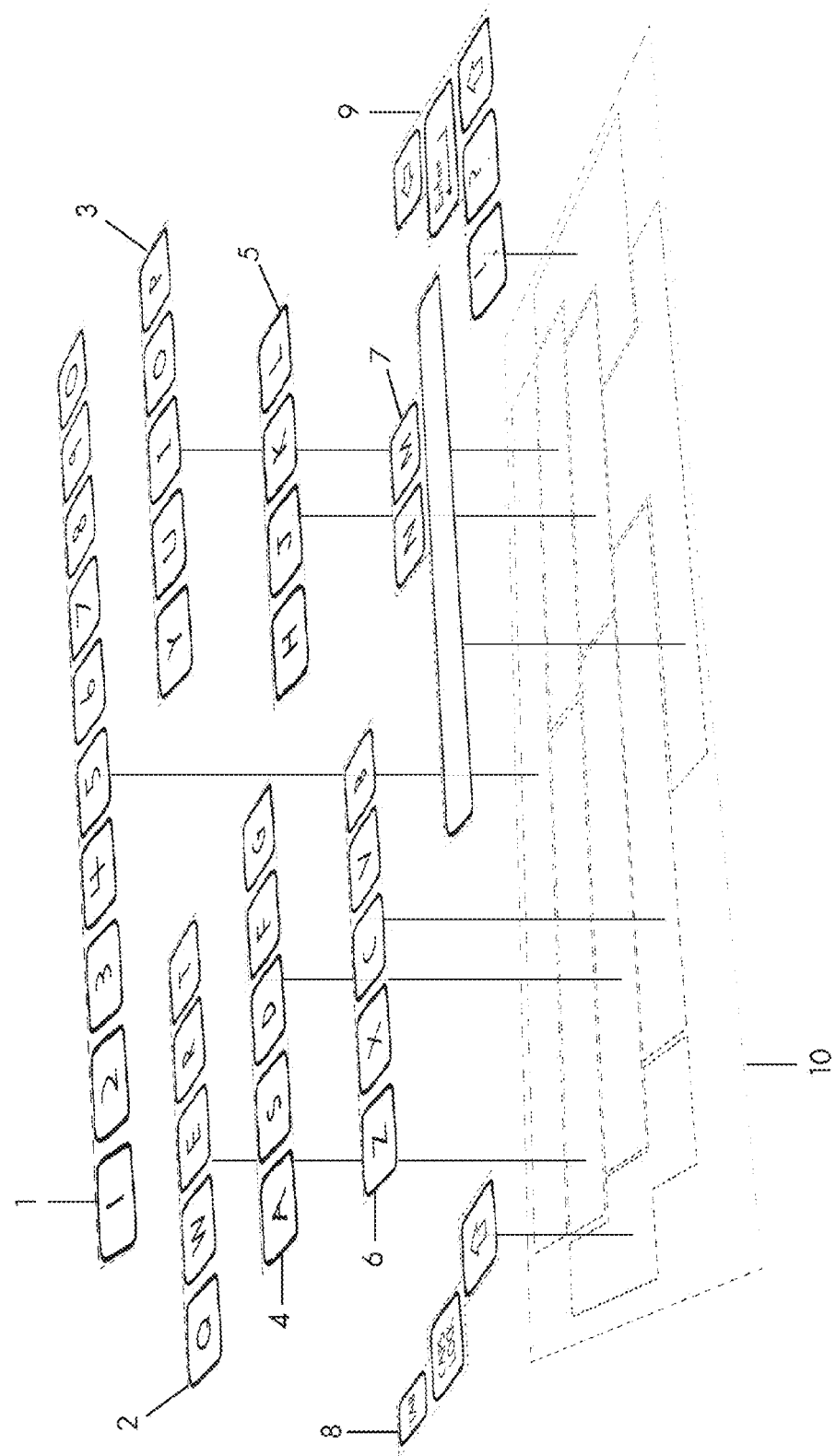
FIG. 11 is an exploded view of a row-based dynamic virtual keyboard with a modified QWERTY layout that is partitioned into row sections.

FIG. 11 shows an exploded view of a dynamic virtual keyboard displaying an adapted and modified QWERTY layout. The spatio-functional geometry of the QWERTY layout is generally partitioned into nine sections, seven of which are row oriented. Row section 1 is the Number Row. Dashed lines 10 demarcates the rectilinear perimeter of the dynamic virtual keyboard. The portion of the QWERTY layout that includes alphabetic characters and the Space Bar is hexfurcated into six row sections: 2, 3, 4, 5, 6, 7. Row sections 2, 4, and 6 are associated with Home Row positioning-based finger movements of the left hand. Row sections 4, 5, and 7 are associated with Home Row positioning-based finger movements of the right hand. Row sections 4 and 5 are the Home Row. Further, the keys displaying the symbols A, S, D, F in row section 4 and the keys displaying the symbols J, K and L in row section 5 are each designed to resemble a house. Sections 8 and 9 are Action Keys.

Figure 12:
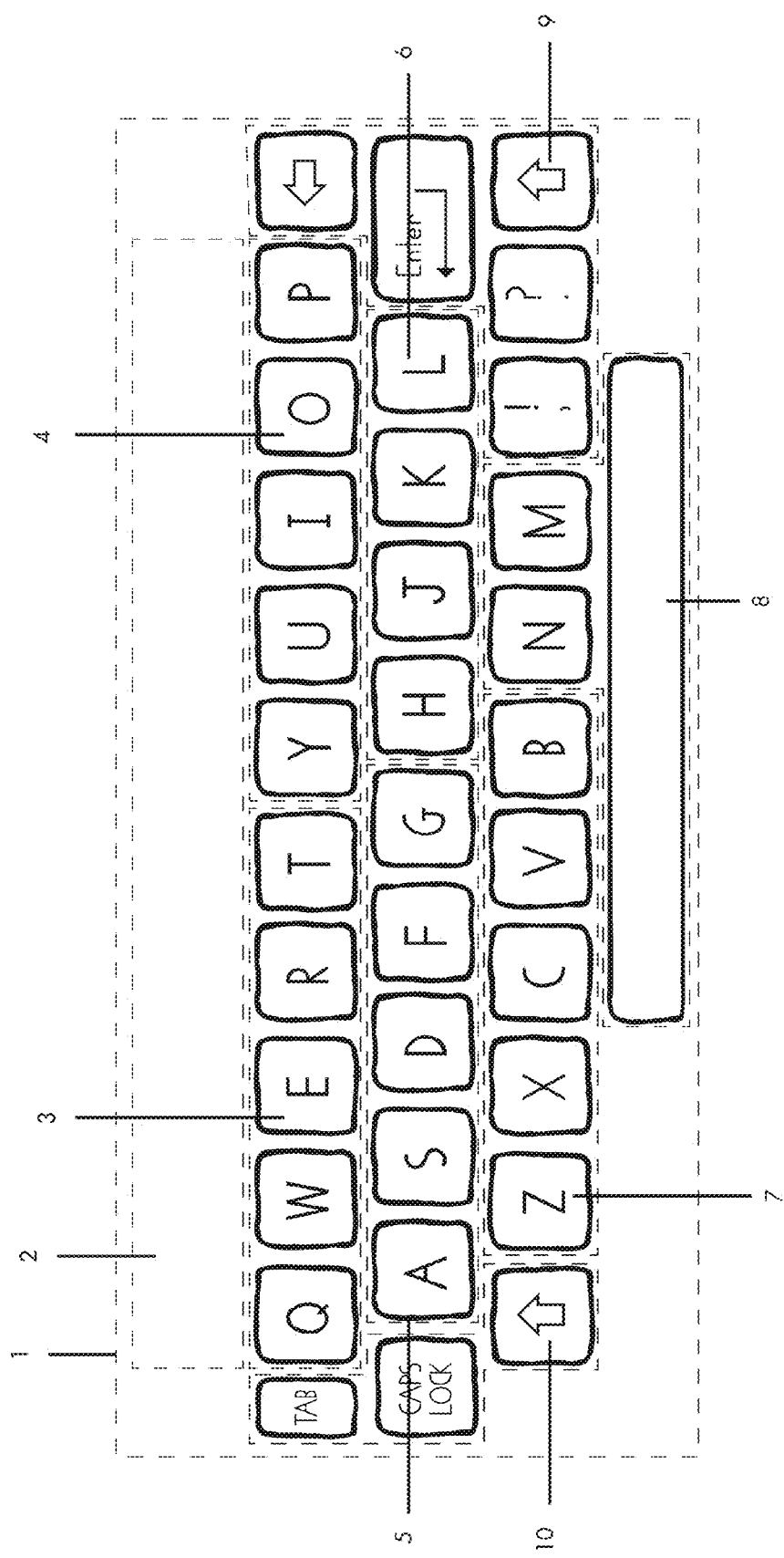
FIG. 12 is a plan view of a row-based dynamic virtual keyboard with a modified QWERTY layout that is structurally partitioned into sections, a partitioning that includes the toggling of the Number Row's visibility to a hidden state, and that includes the bifurcation of the Top Row, Home Row, and Bottom Row into a left portion and right portion.

FIG. 12 shows a colorless rendering of a virtual keyboard with an adapted QWERTY layout as depicted in FIG. 1. FIG. 12 substitutes the color coding scheme of FIG. 1 with a framework of row-based environmental structure that partitions the QWERTY layout into sections of keys, the majority of which are spatially row-oriented, whereby the keys in that section are horizontally-aligned rather than vertically aligned. Dashed lines 1 shows the rectilinear perimeter of the dynamic virtual keyboard that resembles the shape of the physical perimeter of a physical keyboard on a laptop or desktop computer for example. Row sections 2 and 3 comprise the Top Row. Row sections 4 and 5 comprise the Home Row. Row Sections 6 and 7 comprise the Bottom Row. Sections 8 and 9 comprise Action Keys. When a student's hands are in the Home Row hand positions, Home Row positioning-based finger movements of the left hand are associated with row sections 2, 4, and 6 and Home Row positioning-based finger movements of the right hand are associated with row sections 3, 5, and 7. It should be appreciated that while row sections 2-9 are visible in FIG. 12, the dynamic virtual keyboard may independently toggle the visibility of individual row sections during the course of interactive activities in the curriculum. Each row section is relationally positioned to other row sections within the QWERTY layout, and the visibility of each is toggled by the dynamic virtual keyboard in a manner that retains this relational position.

Figure 13:
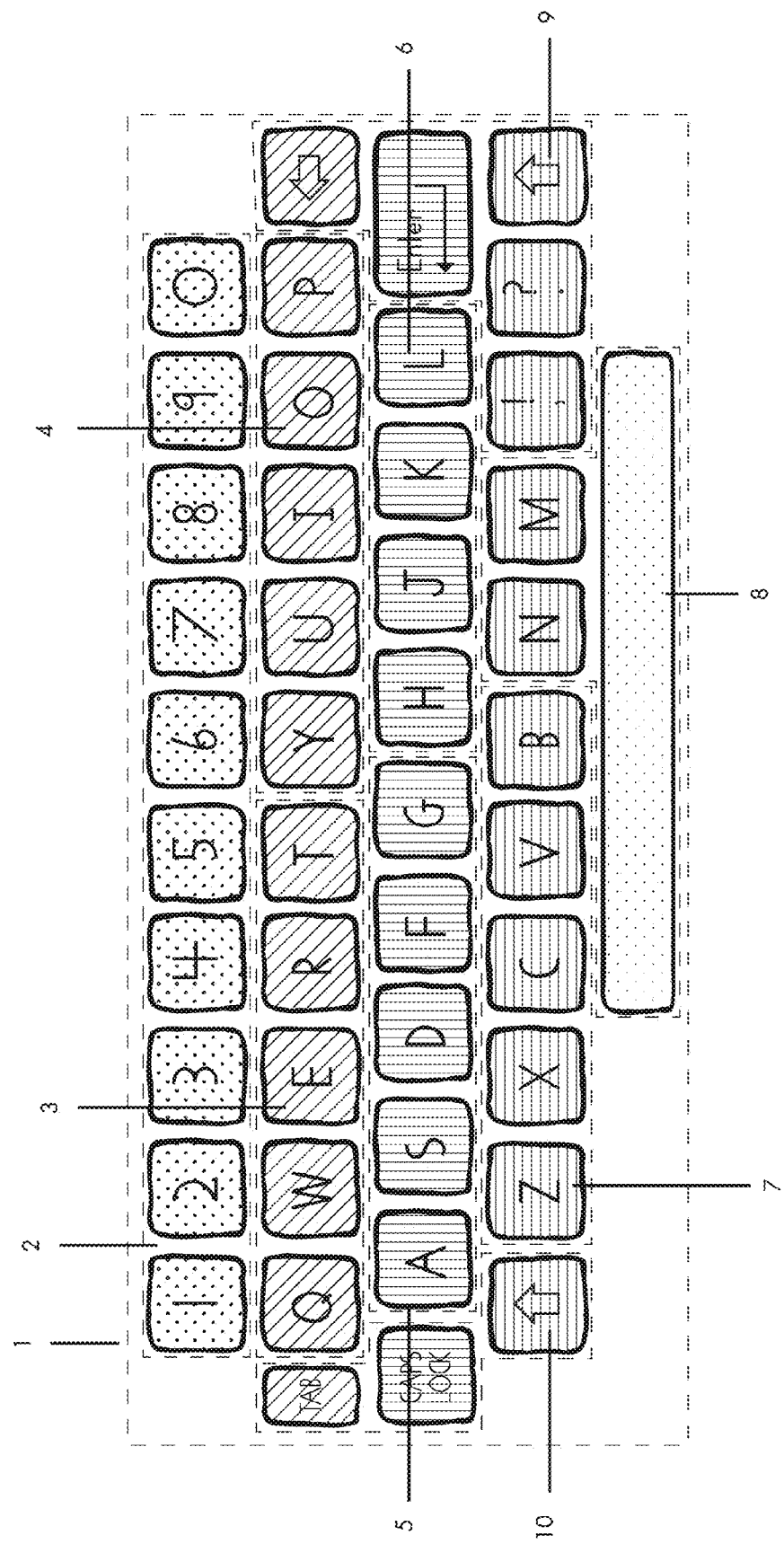
FIG. 13 is a plan view of a row-based dynamic virtual keyboard with child-friendly keys and a modified QWERTY layout that is structurally partitioned into portions distinguishable by unique visual indicators.

FIG. 13 shows an exemplary embodiment of a dynamic virtual keyboard that displays the adapted QWERTY layout of the dynamic virtual keyboard in FIG. 12, except the colorless rendering of FIG. 12 is substituted with a coding scheme of unique line patterns that preserve the row-based structure of the spatial organization of keys as displayed in FIG. 1 using color. Dashed lines 1 shows the rectilinear perimeter of the dynamic virtual keyboard that resembles the shape of the physical perimeter of a physical keyboard on a laptop or desktop computer for example. Row sections 2 and 3 comprise the Top Row. Row sections 4 and 5 comprise the Home Row. Row Sections 6 and 7 comprise the Bottom Row. Sections 8 and 9 comprise Action Keys.

FIG. 14A shows an exemplary embodiment of a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard on a laptop or desktop computer for example. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The A, S, D, and F keys are depicted to resemble a house. The keys of row section 5 are visible and the keys of row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden. By hidden, it is meant that these keys/rows have been toggled to the invisible state by manipulating the dynamic virtual keyboard to these different states (e.g. shown in FIGS. 14A-14O and FIGS. 15A-15H). Methods of the present invention will teach pre-keyboarding and keyboarding skills that relate to the relational position and finger movements associated with the keys and symbols that are visible.

FIG. 14B shows an exemplary embodiment of a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard on a laptop or desktop computer for example. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are hidden and the keys of row section 6 are visible. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

Figure 14C:
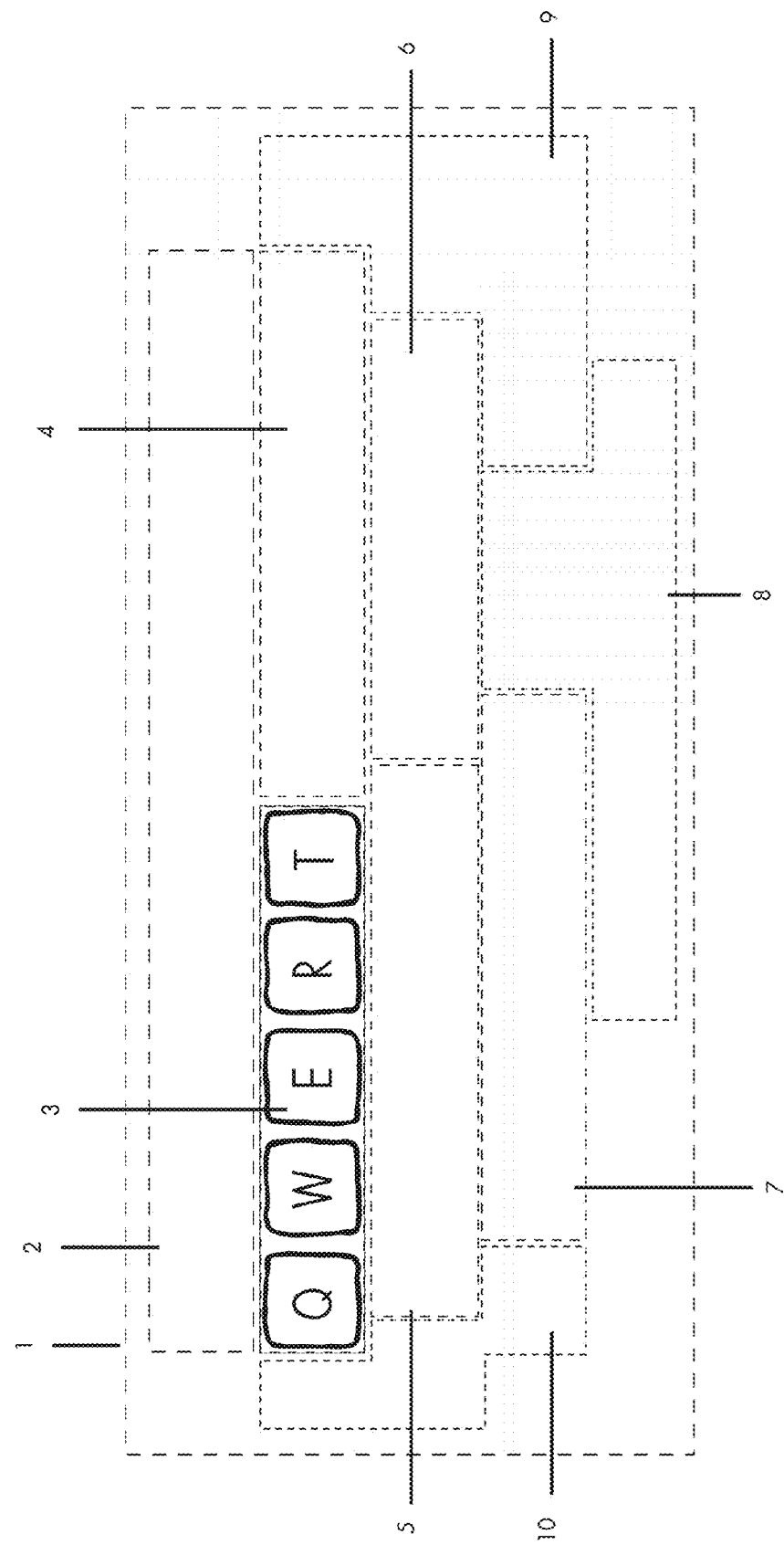
FIG. 14C is a plan view of a row-based dynamic virtual keyboard that displays a left row section of the Top Row and shows remaining keys toggled in the hidden state.

FIG. 14C shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are visible and the keys of row section 4 are hidden. Row section 5 is the left portion of the Home Row and row section 6 is the right portion of the Home Row. The keys of row section 5 and row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of 9 and 10 are hidden.

Figure 14D:
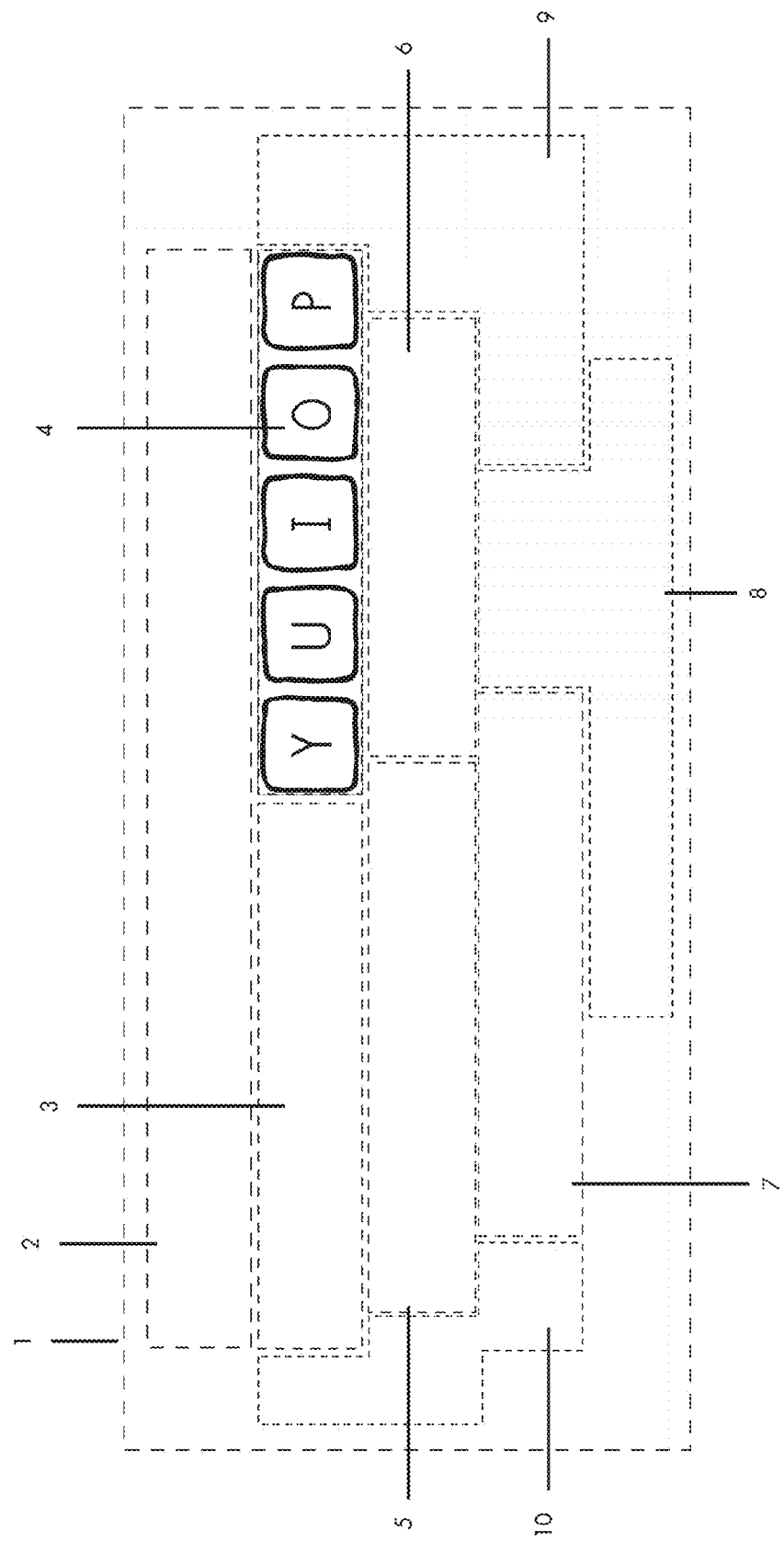
FIG. 14D is a plan view of a row-based dynamic virtual keyboard that displays a right row section of the Top Row and shows remaining keys toggled in the hidden state.

FIG. 14D shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of 2 are hidden. Row section 3 is the left portion of the Top Row and row section 4 is the right portion of the Top Row. The keys of 3 are hidden and the keys of 4 are visible. Row section 5 is the left portion of the Home Row and row section 6 is the right portion of the Home Row. The keys of 5 and 6 are hidden. Row section 7 is the left portion of the Bottom Row and row section 8 is the right portion of the Bottom Row. The keys of 7 and 8 are hidden. Section 9 and 10 comprise Action Keys. The keys of section 9 and section 10 are hidden.

Figure 14E:
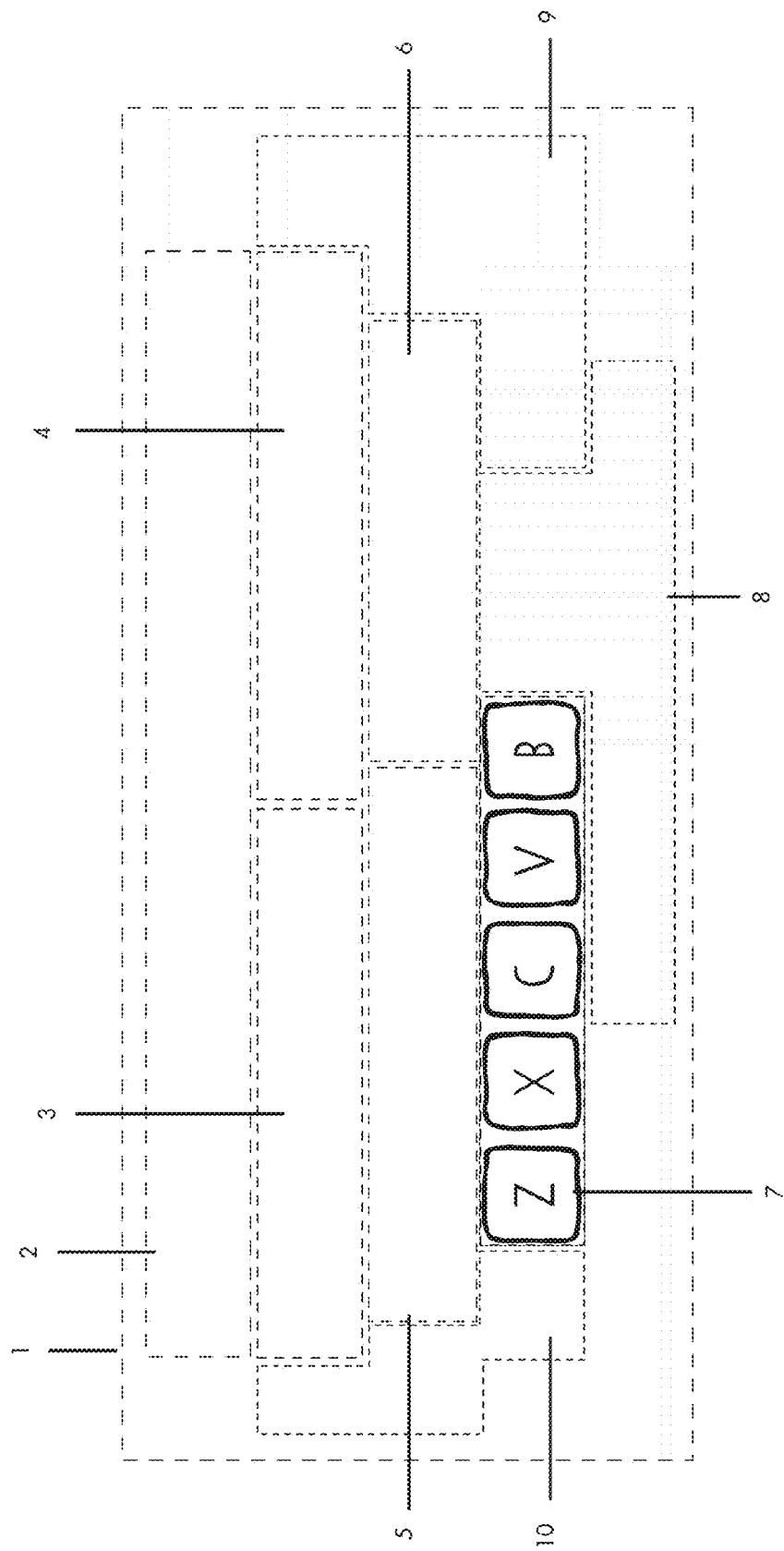
FIG. 14E is a plan view of a row-based dynamic virtual keyboard that displays a left row section of the Bottom Row and shows remaining keys toggled in the hidden state.

FIG. 14E shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 and row section 6 are hidden. Row section 7 is the left portion of the Bottom Row and row section 8 is the right portion of the Bottom Row. The keys of row section 7 are visible and the keys of row section 8 are hidden. Section 9 and section 10 comprise Action Keys. The keys of section 9 and section 10 are hidden.

Figure 14F:
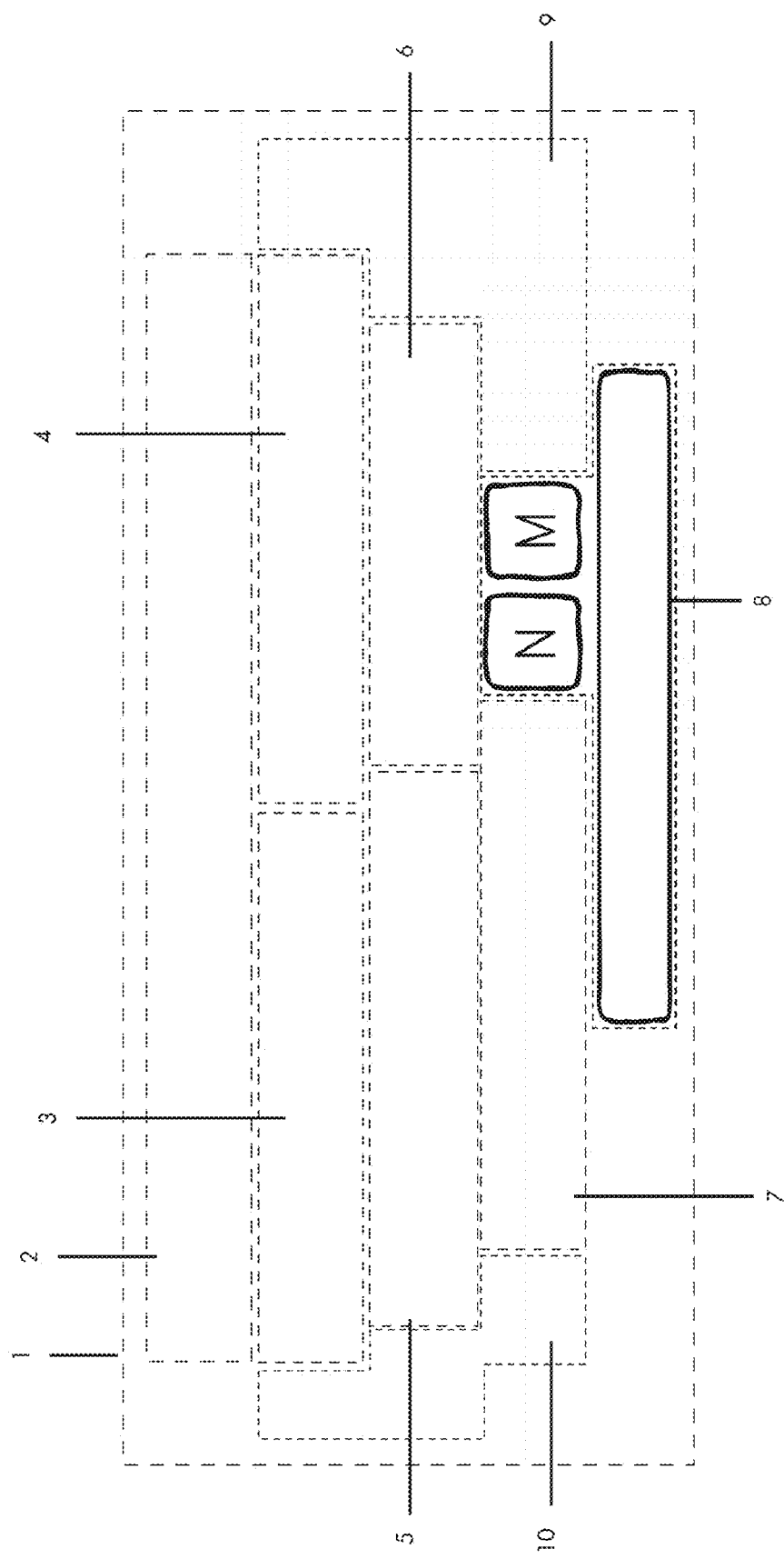
FIG. 14F is a plan view of a row-based dynamic virtual keyboard that displays a right row section of the Bottom Row and shows remaining keys toggled in the hidden state.

FIG. 14F shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 and row section 6 are hidden. Row section 7 is the left portion of the Bottom Row and row section 8 is the right portion of the Bottom Row. The keys of row section 7 are hidden and the keys of row section 8 are visible. Section 9 and section 10 comprise Action Keys. The keys of section 9 and section 10 are hidden.

Figure 14G:
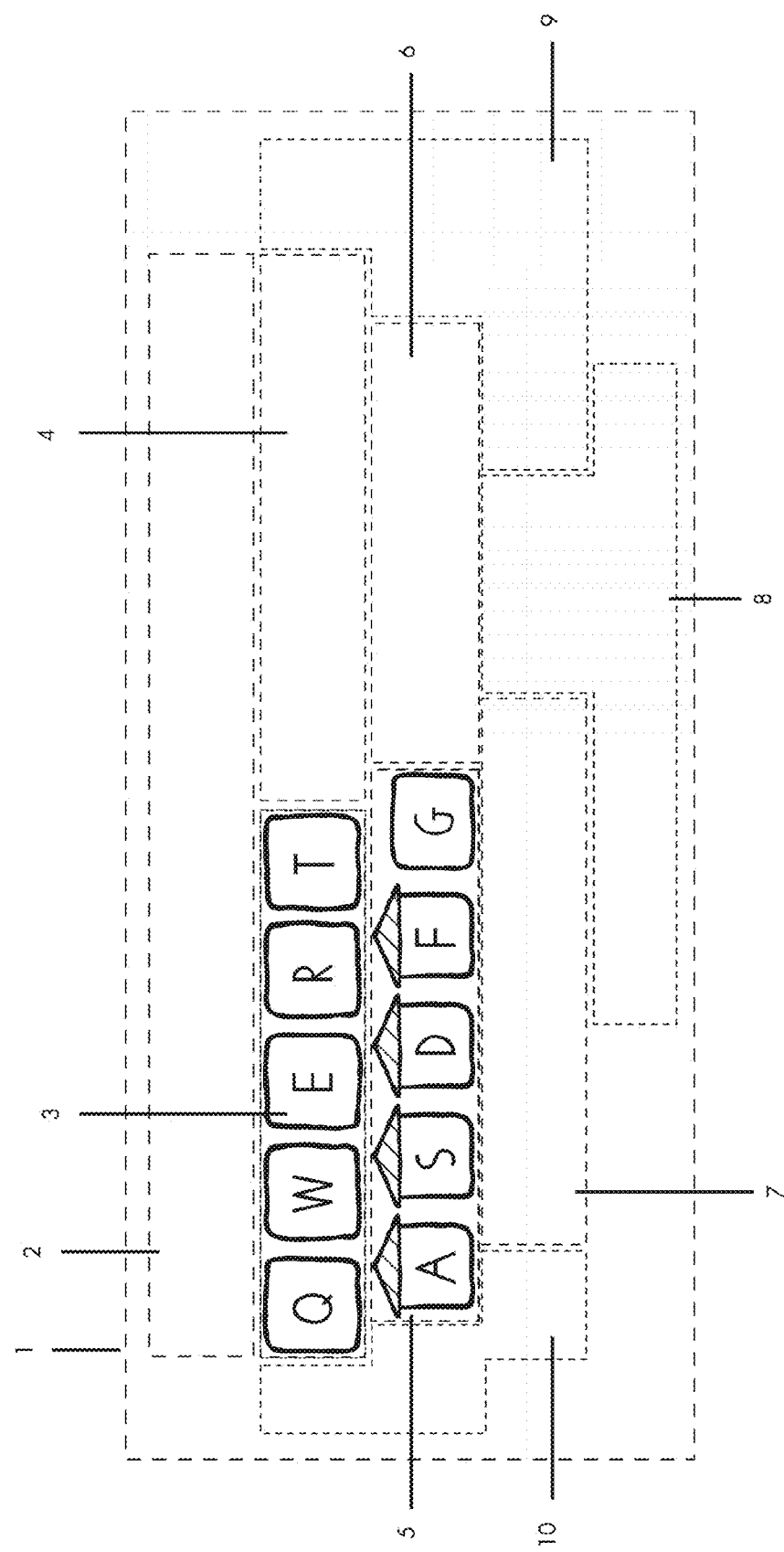
FIG. 14G is a plan view of a row-based dynamic virtual keyboard that displays the left row sections of the Top Row and Home Row and shows remaining keys toggled in the hidden state.

FIG. 14G shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are visible and the keys of row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

Figure 14H:
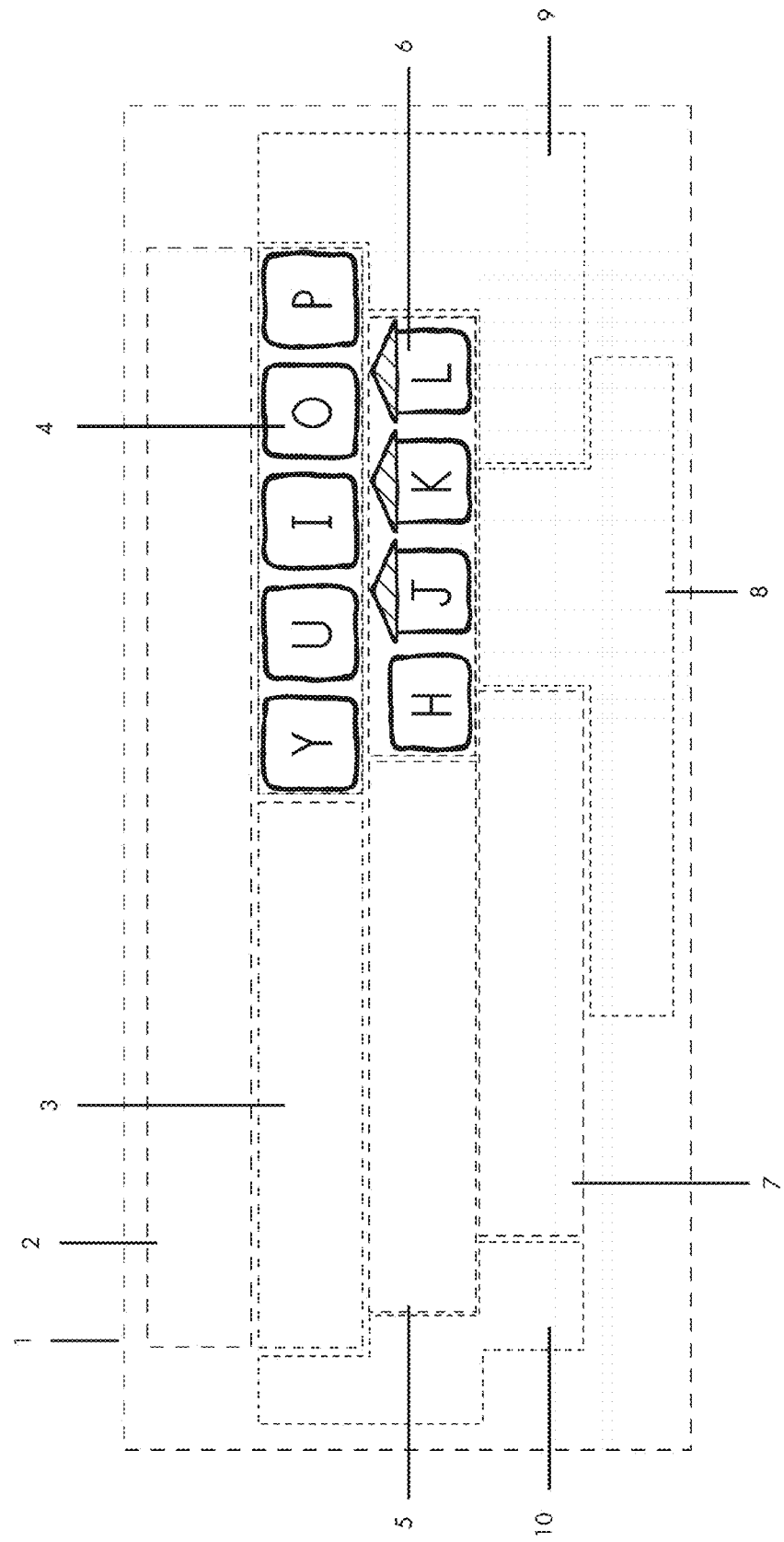
FIG. 14H is a plan view of a row-based dynamic virtual keyboard that displays the right row sections of the Top Row and Home Row and shows remaining keys toggled in the hidden state.

FIG. 14H shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are hidden and the keys of row section 4 are visible. Row section 5 is the left portion of the Home Row and row section 6 is the right portion of the Home Row. The keys of row section 5 are hidden and the keys of row section 6 are visible. Row section 7 is the left portion of the Bottom Row and row section 8 is the right portion of the Bottom Row. The keys of row section 7 and row section 8 are hidden. Section 9 and section 10 comprise Action Keys. The keys of row section 9 and row section 10 are hidden.

Figure 14I:
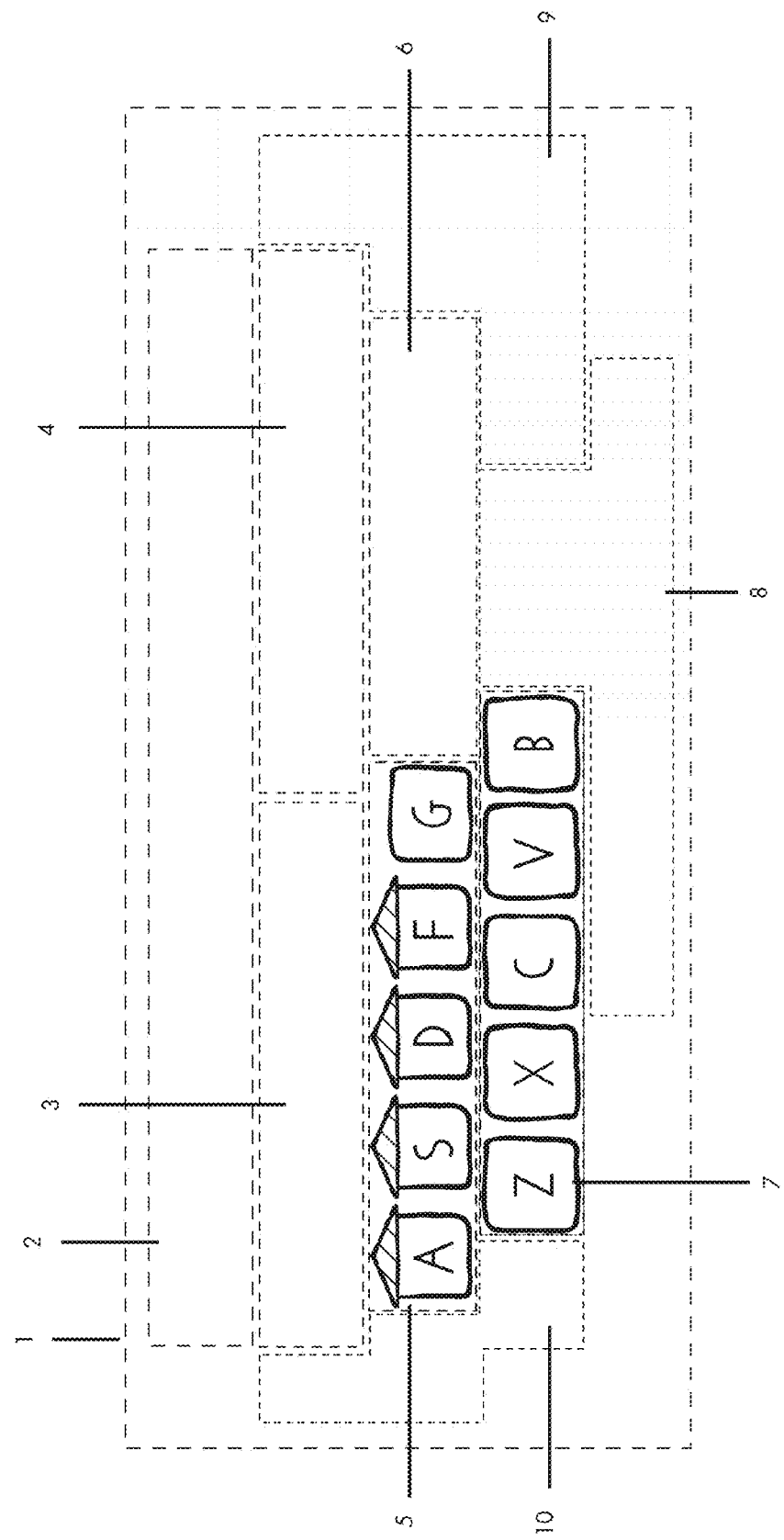
FIG. 14I is a plan view of a row-based dynamic virtual keyboard that displays the left row sections of the Bottom Row and Home Row and shows remaining keys toggled in the hidden state.

FIG. 14I shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 are visible and the keys of row section 8 are hidden. Section 9 and section 10 comprise Action Keys. The keys of section 9 and section 10 are hidden.

Figure 14J:
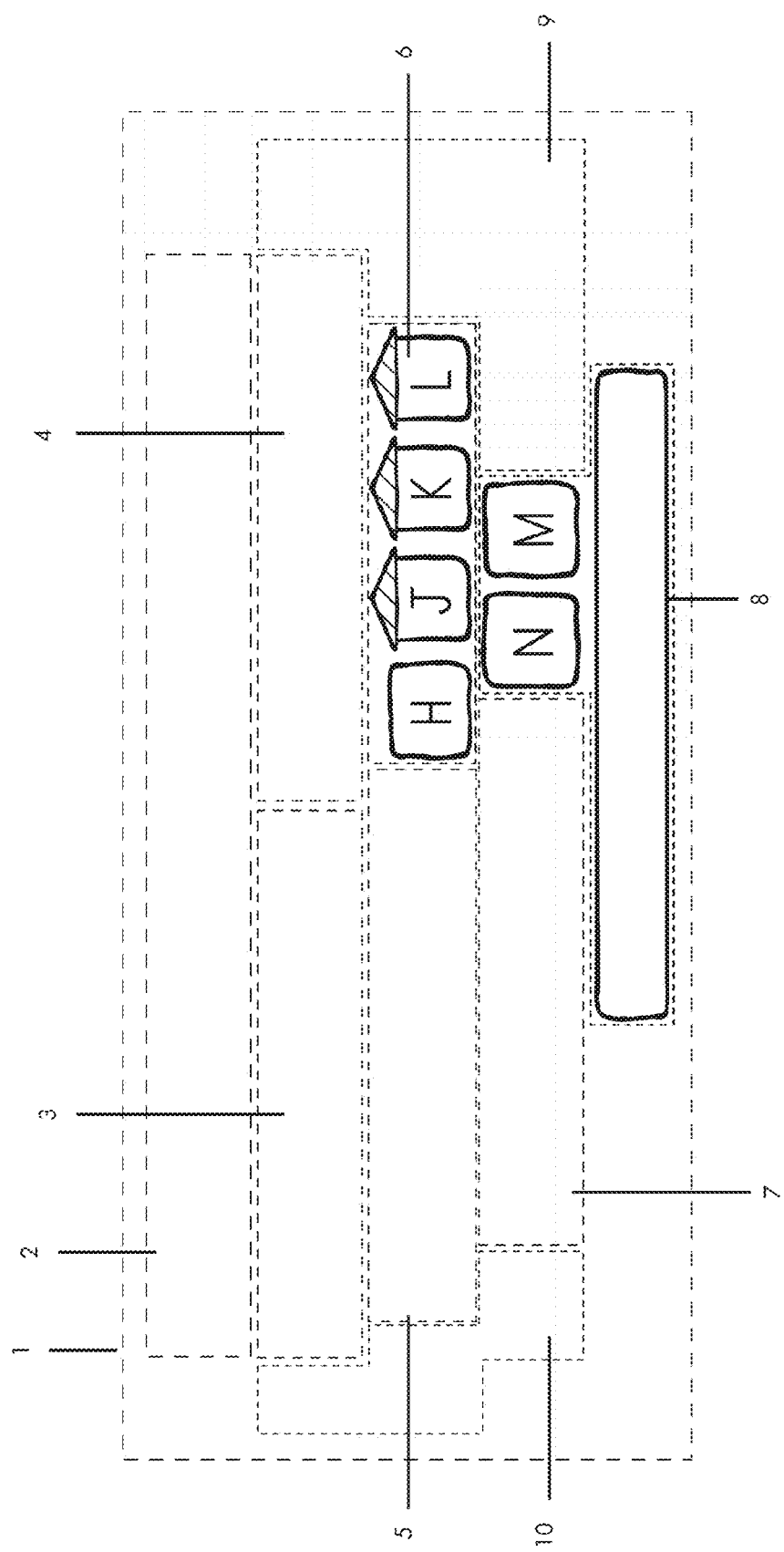
FIG. 14J is a plan view of a row-based dynamic virtual keyboard that displays the right row sections of the Bottom Row and Home Row and shows remaining keys toggled in the hidden state.

FIG. 14J shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are hidden and the keys of row section 6 are visible. Row section 7 is the left portion of the Bottom Row and row section 8 is the right portion of the Bottom Row. The keys of row section 7 are hidden and the keys of row section 8 are visible. Section 9 and section 10 comprise Action Keys. The keys of section 9 and section 10 are hidden.

FIG. 14K shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are visible and the keys of row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 are visible and the keys of row section 8 are hidden. Section 9 and section 10 comprise Action Keys. The keys of section 9 and section 10 are hidden.

Figure 14L:
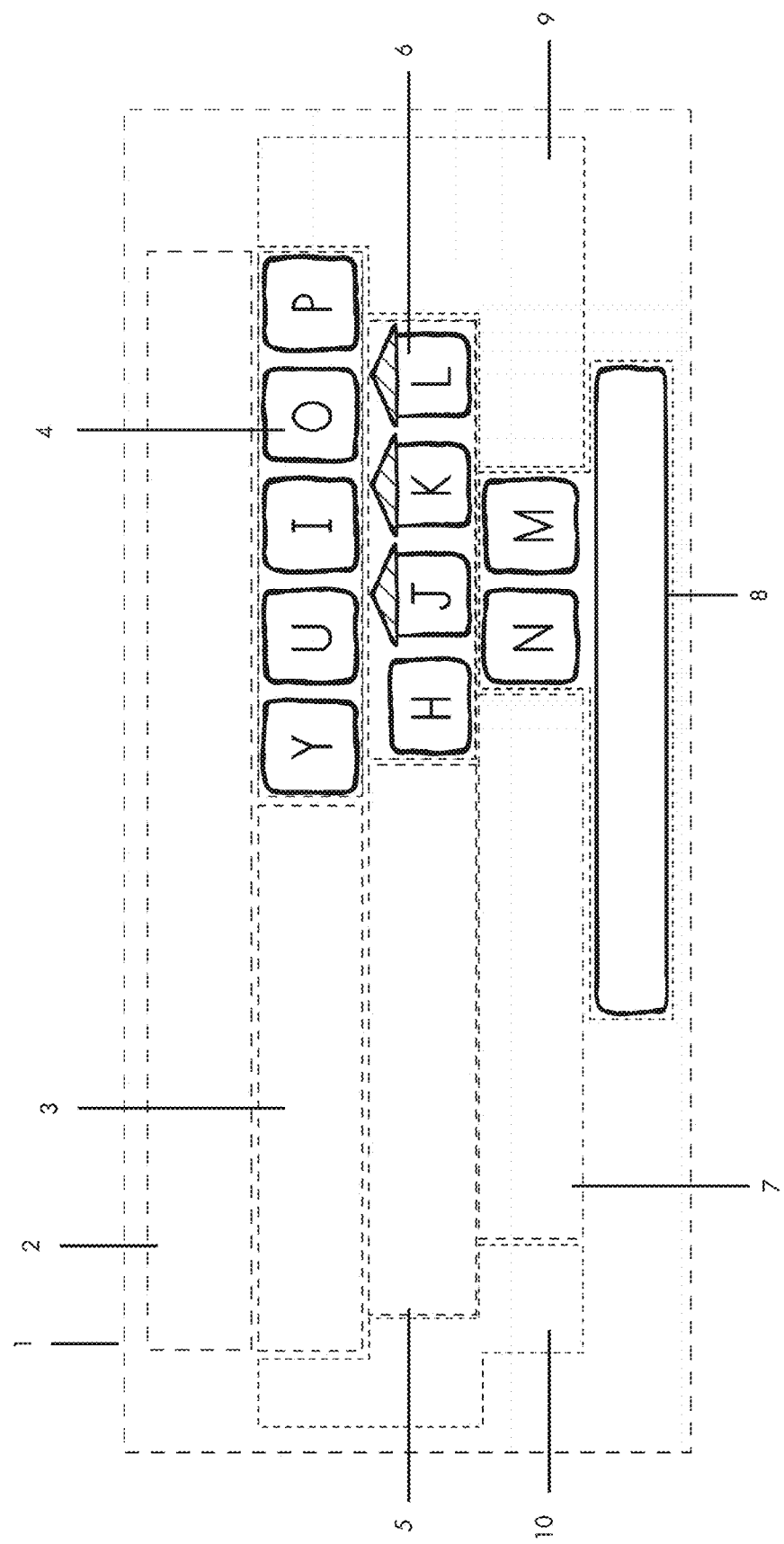
FIG. 14L is a plan view of a row-based dynamic virtual keyboard that displays the right row sections of the Top Row and Home Row and Bottom Row and shows remaining keys toggled in the hidden state.

FIG. 14L shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are hidden and the keys of row section 4 are visible. Row section 5 is the left portion of the Home Row and row section 6 is the right portion of the Home Row. The keys of row section 5 are hidden and the keys of row section 6 are visible. Row section 7 is the left portion of the Bottom Row and row section 8 is the right portion of the Bottom Row. The keys of row section 7 are hidden and the keys of row section 8 are visible. Section 9 and section 10 comprise Action Keys. The keys of section 9 and section 10 are hidden.

Figure 14M:
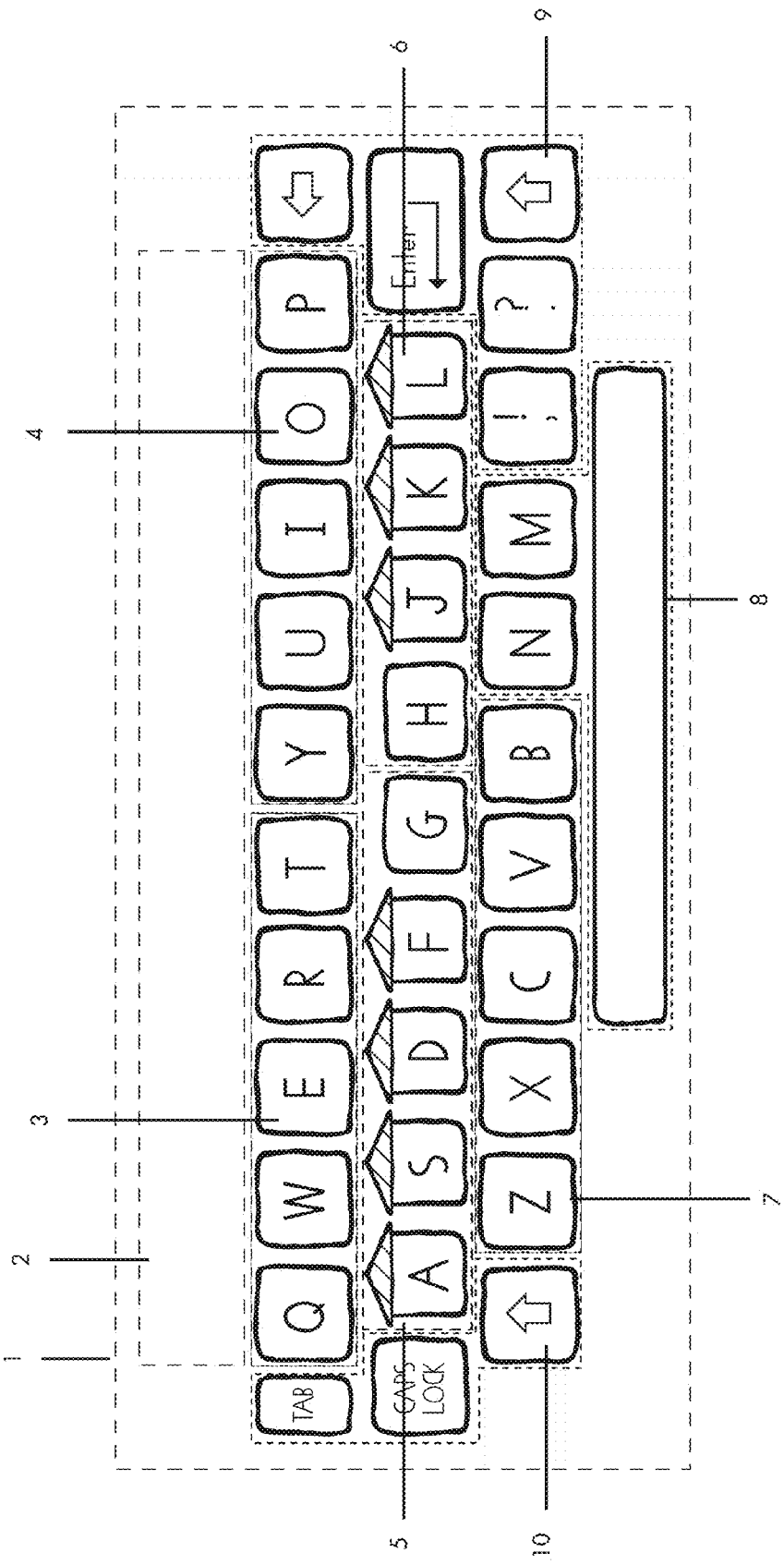
FIG. 14M is a plan view of a row-based dynamic virtual keyboard that displays the left and right row sections of the Top Row and Home Row and Bottom Row and shows remaining keys toggled in the hidden state.

FIG. 14M shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are visible. Row section 5 is the left portion of the Home Row and row section 6 is the right portion of the Home Row. The keys of row section 5 and row section 6 are visible. Row section 7 is the left portion of the Bottom Row and row section 8 is the right portion of the Bottom Row. The keys of row section 7 and row section 8 are visible. Section 9 and section 10 comprise Action Keys. The keys of section 9 and section 10 are visible.

Figure 14N:
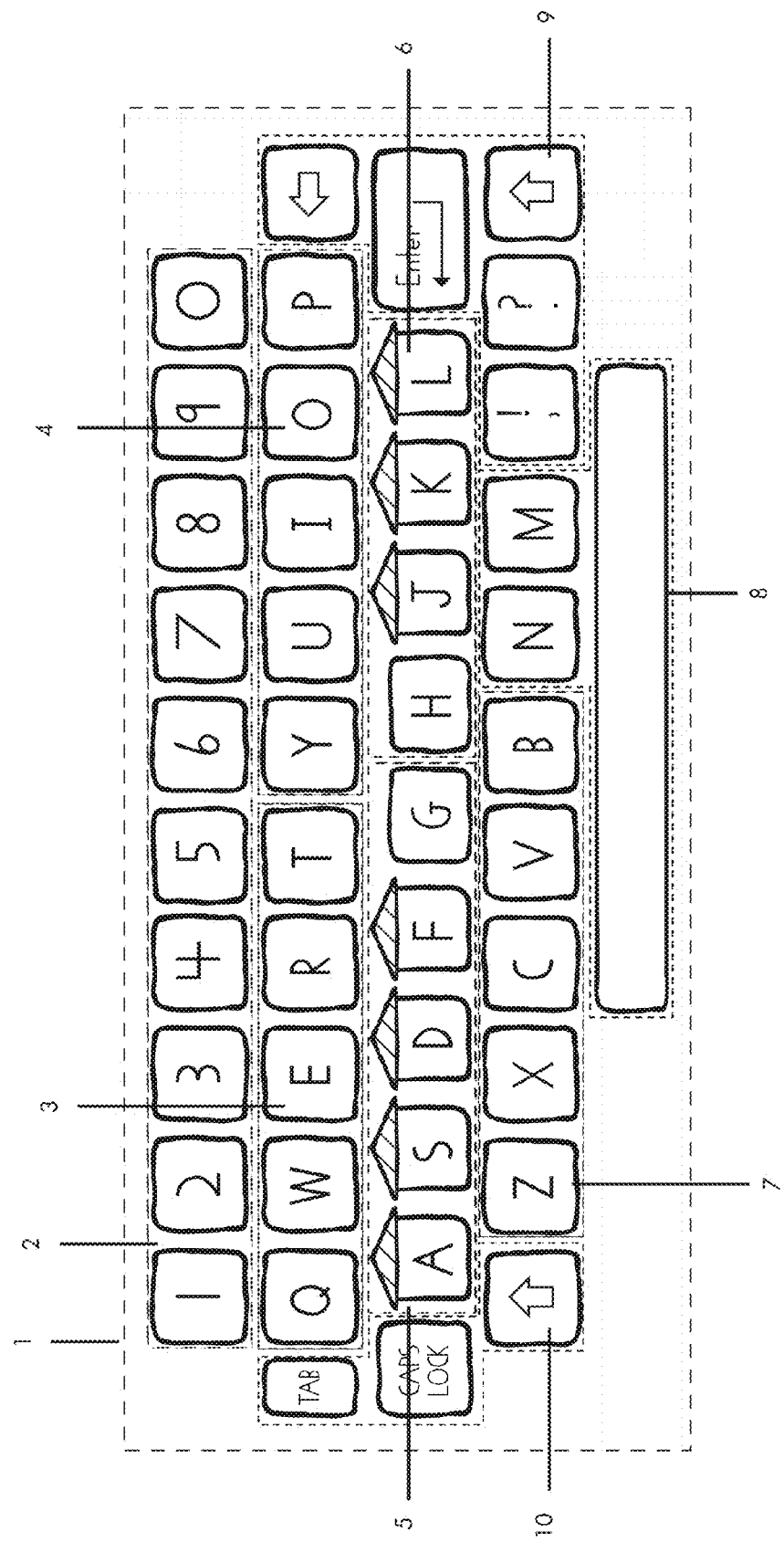
FIG. 14N is a plan view of a row-based dynamic virtual keyboard that displays the Number Row and the left and right row sections of the Top Row and Home Row and Bottom Row and shows remaining keys toggled in the hidden state.
Figure 14O:
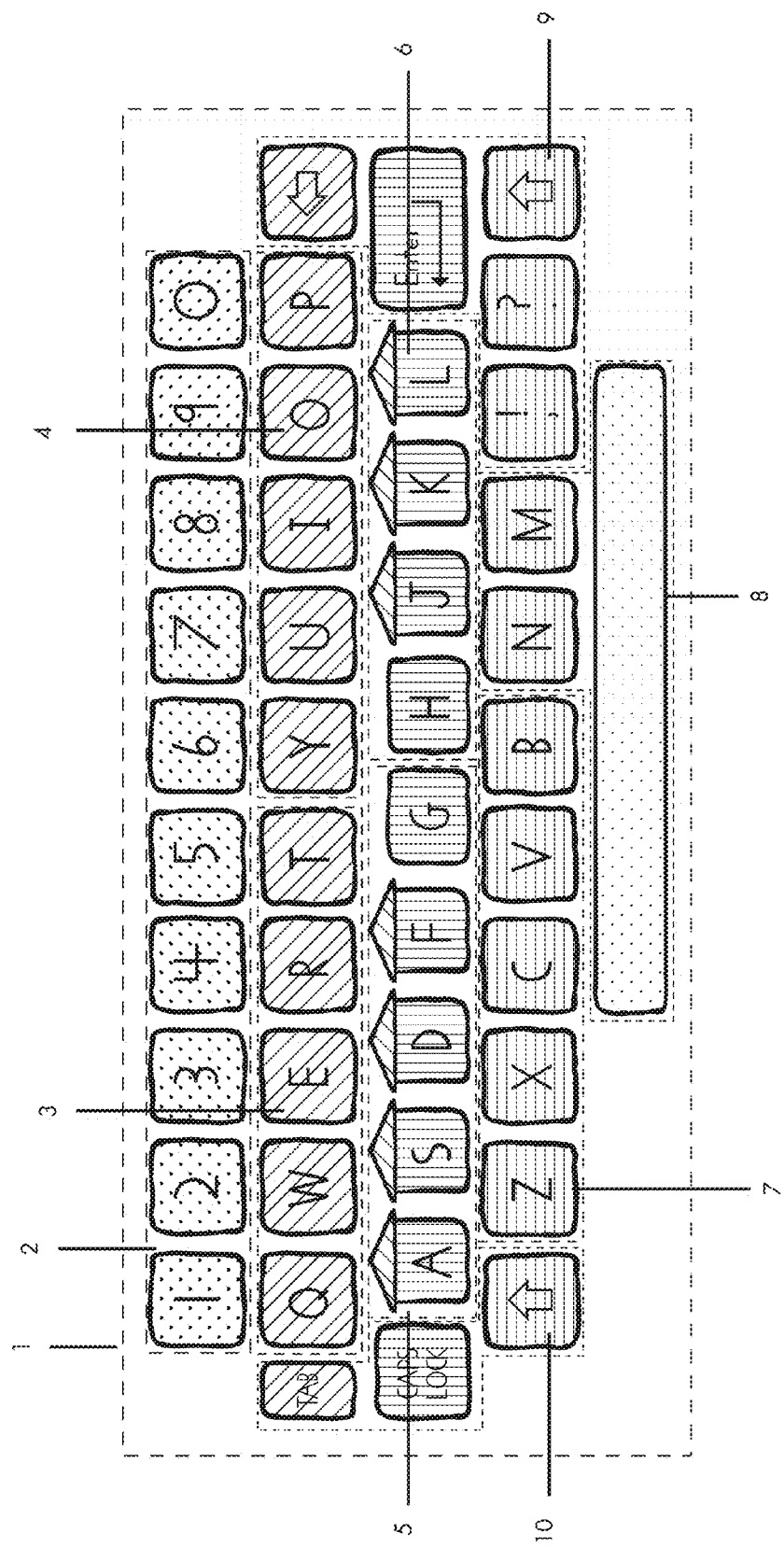
FIG. 14O is a plan view of a row-based dynamic virtual keyboard that displays the Number Row and the left and right row sections of the Top Row and Home Row and Bottom Row and shows remaining keys toggled in the hidden state.

FIG. 14N shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are visible. Row section 3 is the left portion of the Top Row and row section 4 is the right portion of the Top Row. The keys of row section 3 and row section 4 are visible. Row section 5 is the left portion of the Home Row and row section 6 is the right portion of the Home Row. The keys of row section 5 and row section 6 are visible. Row section 7 is the left portion of the Bottom Row and row section 8 is the right portion of the Bottom Row. The keys of row section 7 and row section 8 are visible. Section 9 and section 10 comprise Action Keys. The keys of section 9 and section 10 are visible.

FIG. 14O shows a colorless rendering of the dynamic virtual keyboard that displays the adapted QWERTY layout and a coding scheme with unique row-based line patterns. Dashed lines 1 shows the rectilinear perimeter of the dynamic virtual keyboard that resembles the shape of the physical perimeter of a physical keyboard. Row section 2 shows the Number Row. The keys of row section 2 are visible. Row section 3 is the left portion of the Top Row and row section 4 is the right portion of the Top Row. The keys of row section 3 and row section 4 are visible. Row section 5 is the left portion of the Home Row and row section 6 is the right portion of the Home Row. The keys of row section 5 and row section 6 are visible. Row section 7 is the left portion of the Bottom Row and row section 8 is the right portion of the Bottom Row. The keys of row section 7 and row section 8 are visible. Section 9 and section 10 comprise Action Keys. The keys of section 9 and section 10 are visible.

Figure 15A:
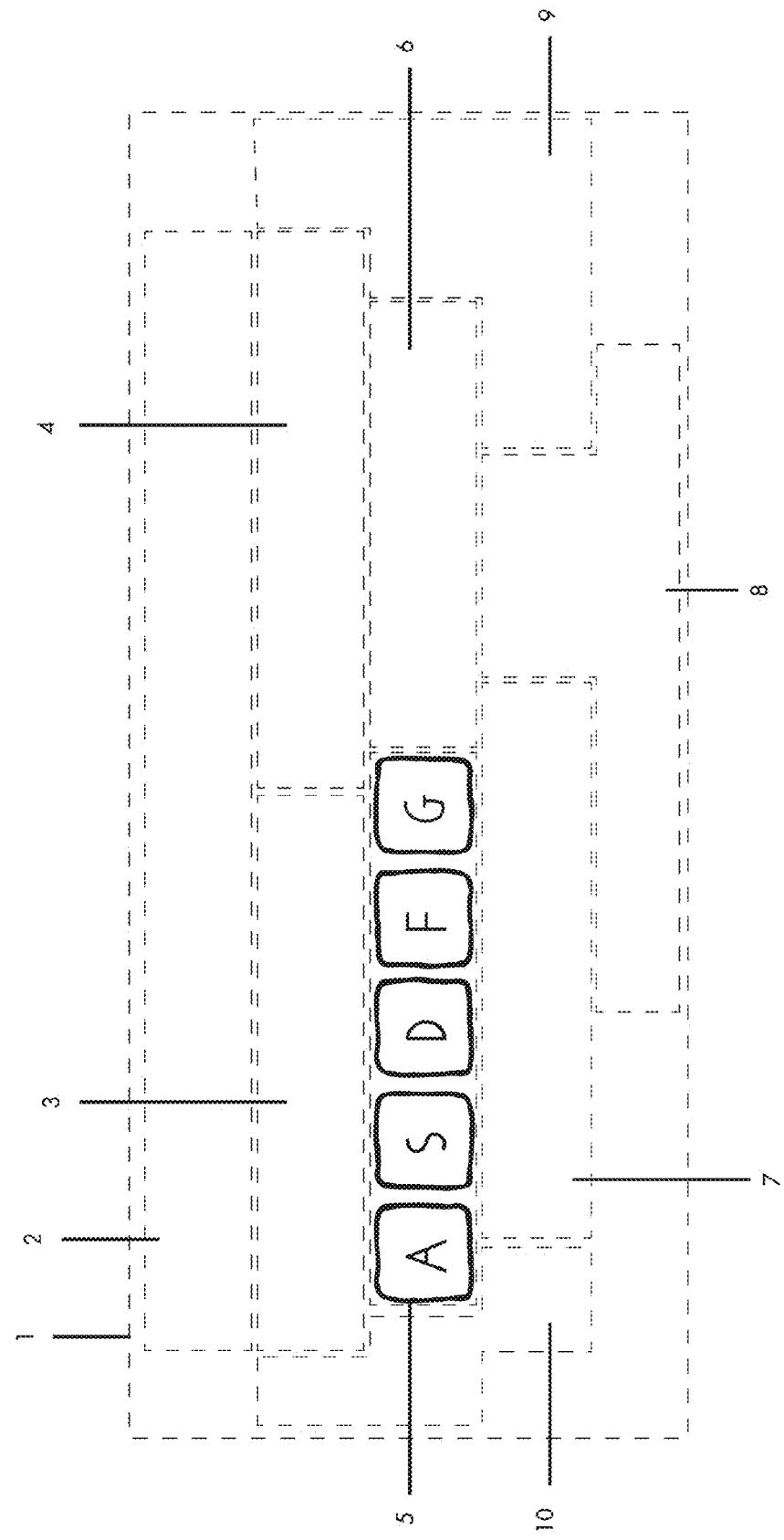
FIG. 15A is a plan view of a row-based dynamic virtual keyboard that displays a left row section of the Home Row and shows remaining keys toggled in the hidden state.

FIG. 15A shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

Figure 15B:
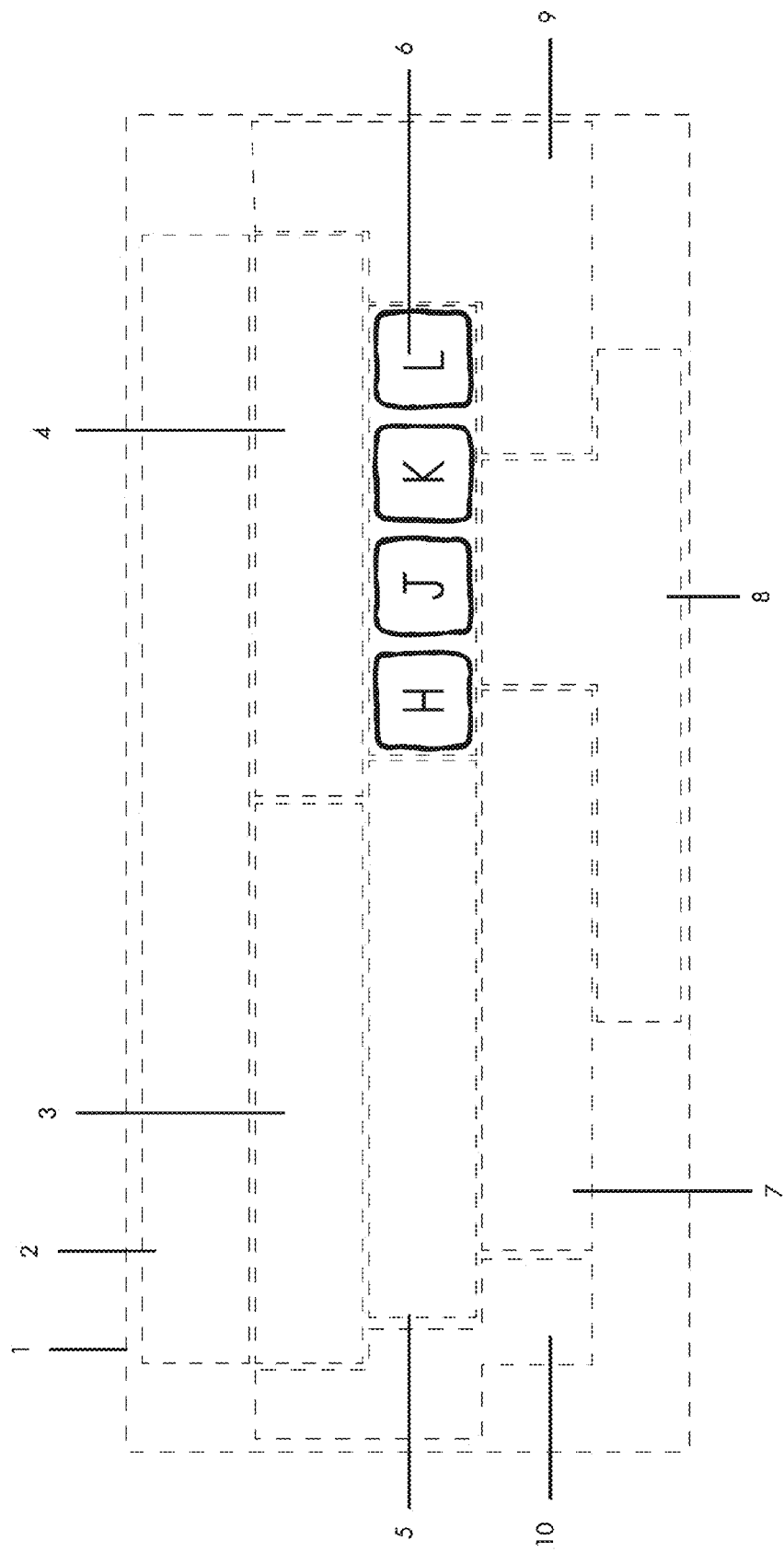
FIG. 15B is a plan view of a row-based dynamic virtual keyboard that displays a right row section of the Home Row and shows remaining keys toggled in the hidden state.

FIG. 15B shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

Figure 15C:
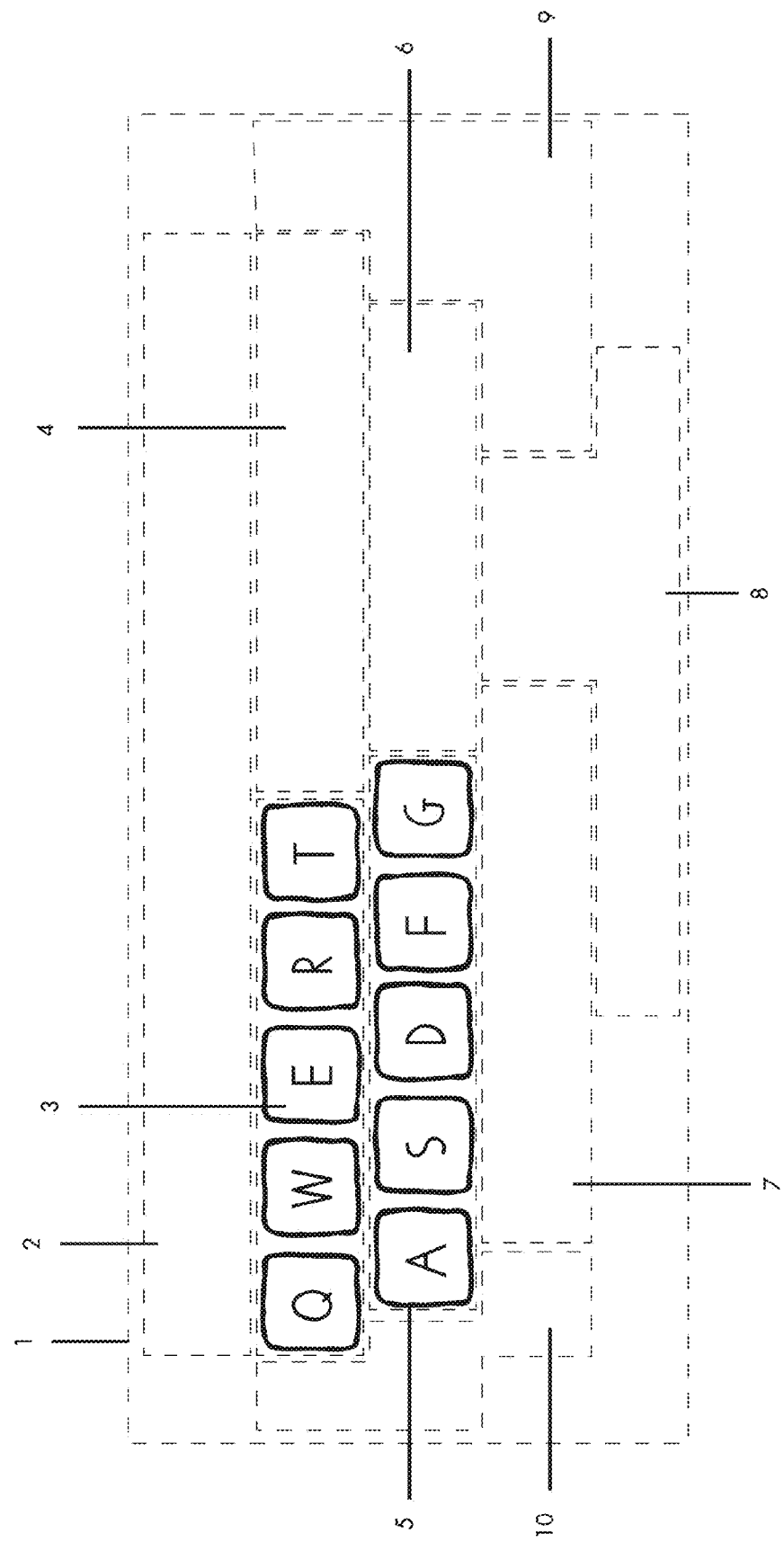
FIG. 15C is a plan view of a row-based dynamic virtual keyboard that displays the left row sections of the Top Row and Home Row and shows remaining keys toggled in the hidden state.

FIG. 15C shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are visible and the keys of row section 4 are hidden. Row section 5 is the left portion of the Home Row and row section 6 is the right portion of the Home Row. The keys of row section 5 are visible and the keys of row section 6 are hidden. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

FIG. 15D shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are hidden and the keys of row section 4 are visible. Row section 5 is the left portion of the Home Row and row section 6 is the right portion of the Home Row. The keys of row section 5 are hidden and the keys of 6 are visible. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

FIG. 15D shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are hidden and the keys of row section 4 are visible. Row section 5 is the left portion of the Home Row and row section 6 is the right portion of the Home Row. The keys of row section 5 are hidden and the keys of 6 are visible. Row section 7 is the left portion of the Bottom Row and row section 8 is the right portion of the Bottom Row. The keys of row section 7 and row section 8 are hidden. Section 9 and section 10 comprise Action Keys. The keys of section 9 and section 10 are hidden.

Figure 15E:
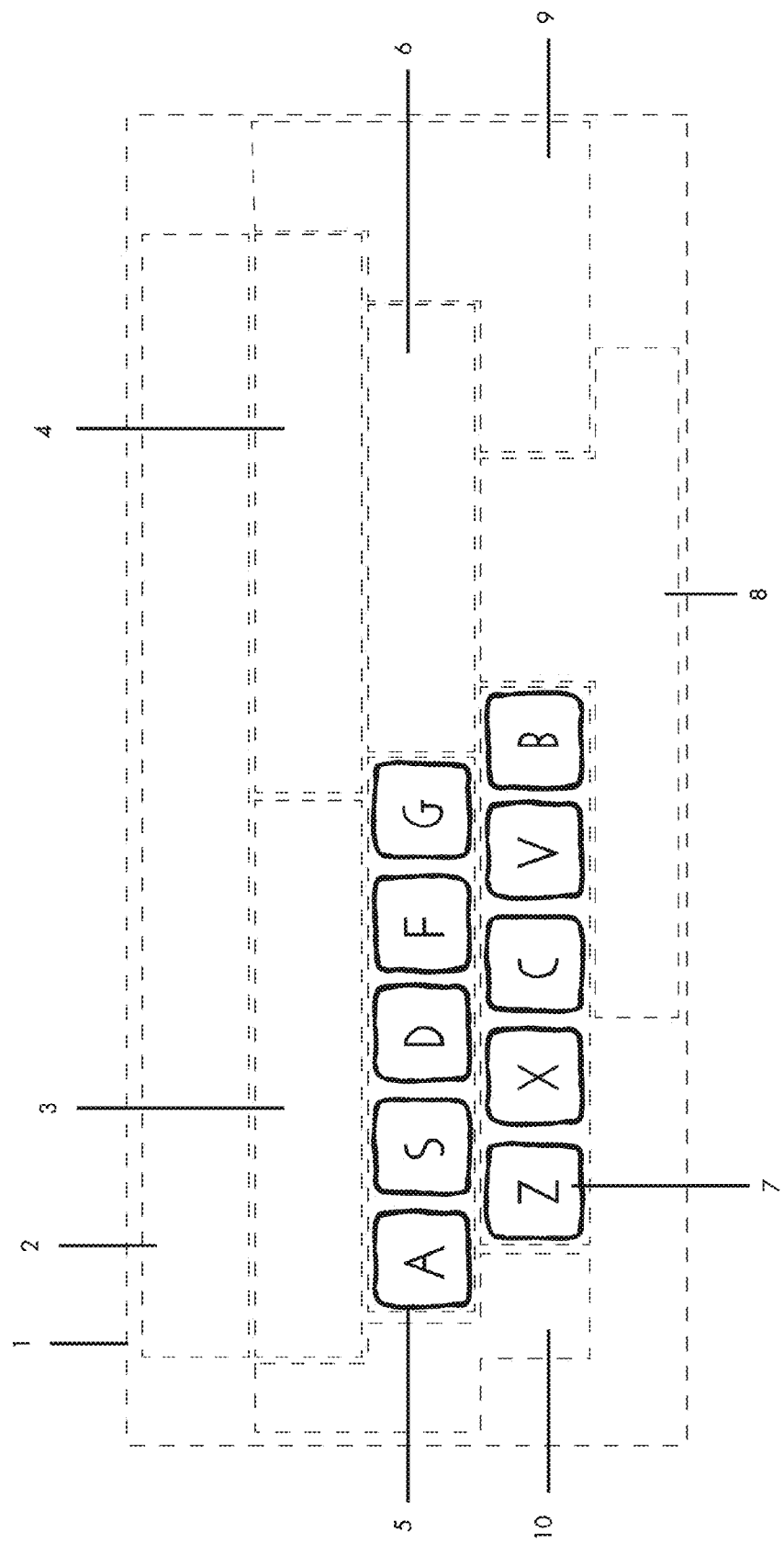
FIG. 15E is a plan view of a row-based dynamic virtual keyboard that displays the left row sections of the Bottom Row and Home Row and shows remaining keys toggled in the hidden state.

FIG. 15E shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are visible and the keys of 6 are hidden. Row section 7 is the left portion of the Bottom Row and row section 8 is the right portion of the Bottom Row. The keys of row section 7 are visible and the keys of row section 8 are hidden. Section 9 and section 10 comprise Action Keys. The keys of section 9 and section 10 are hidden.

Figure 15F:
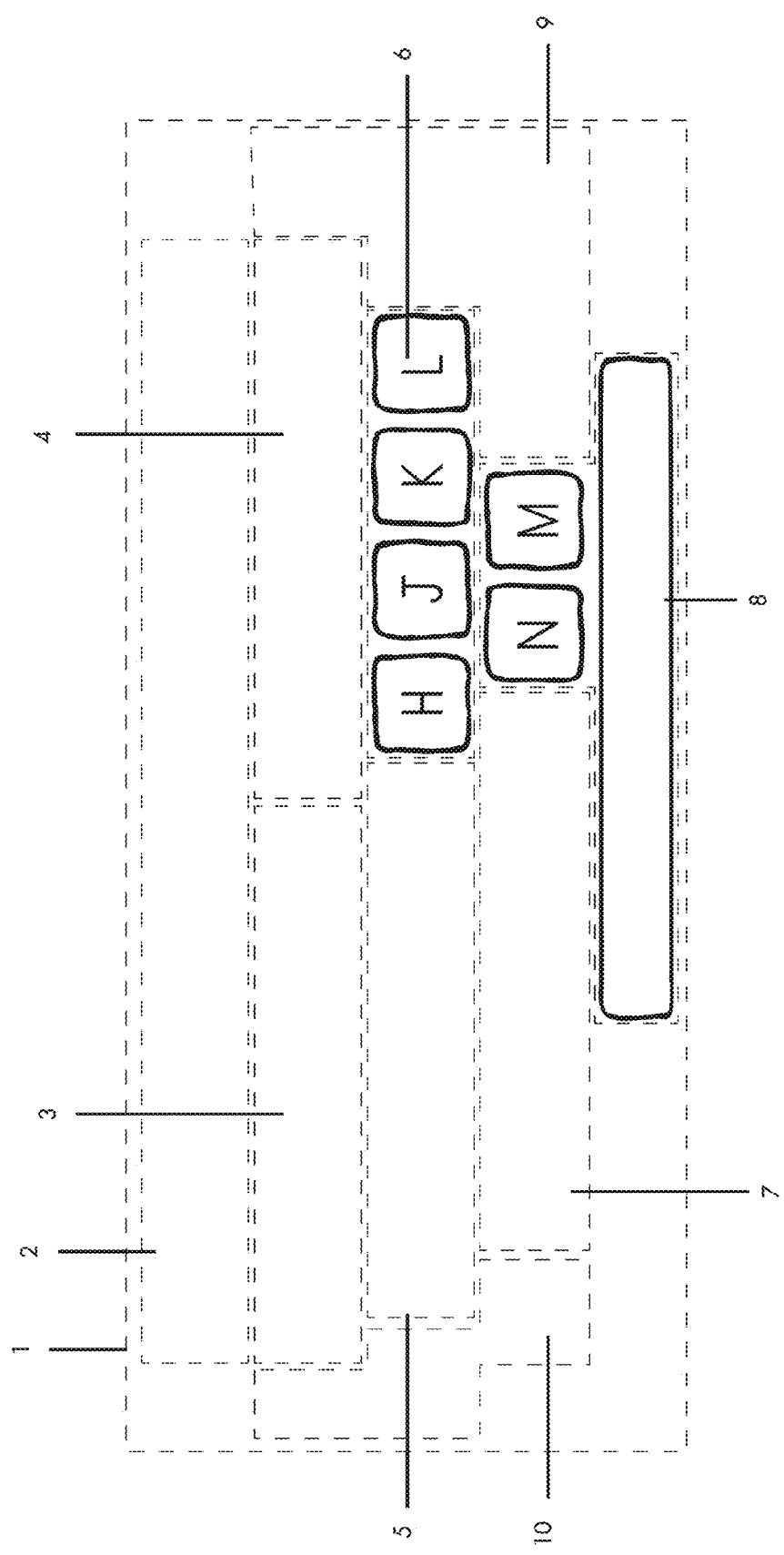
FIG. 15F is a plan view of a row-based dynamic virtual keyboard that displays the right row sections of the Bottom Row and Home Row and shows remaining keys toggled in the hidden state.

FIG. 15F shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 and row section 4 are hidden. Row section 5 is the left portion of the Home Row and row section 6 is the right portion of the Home Row. The keys of row section 5 are hidden and the keys of 6 are visible. Row section 7 is the left portion of the Bottom Row and row section 8 is the right portion of the Bottom Row. The keys of row section 7 are hidden and the keys of row section 8 are visible. Section 9 and section 10 comprise Action Keys. The keys of section 9 and section 10 are hidden.

Figure 15G:
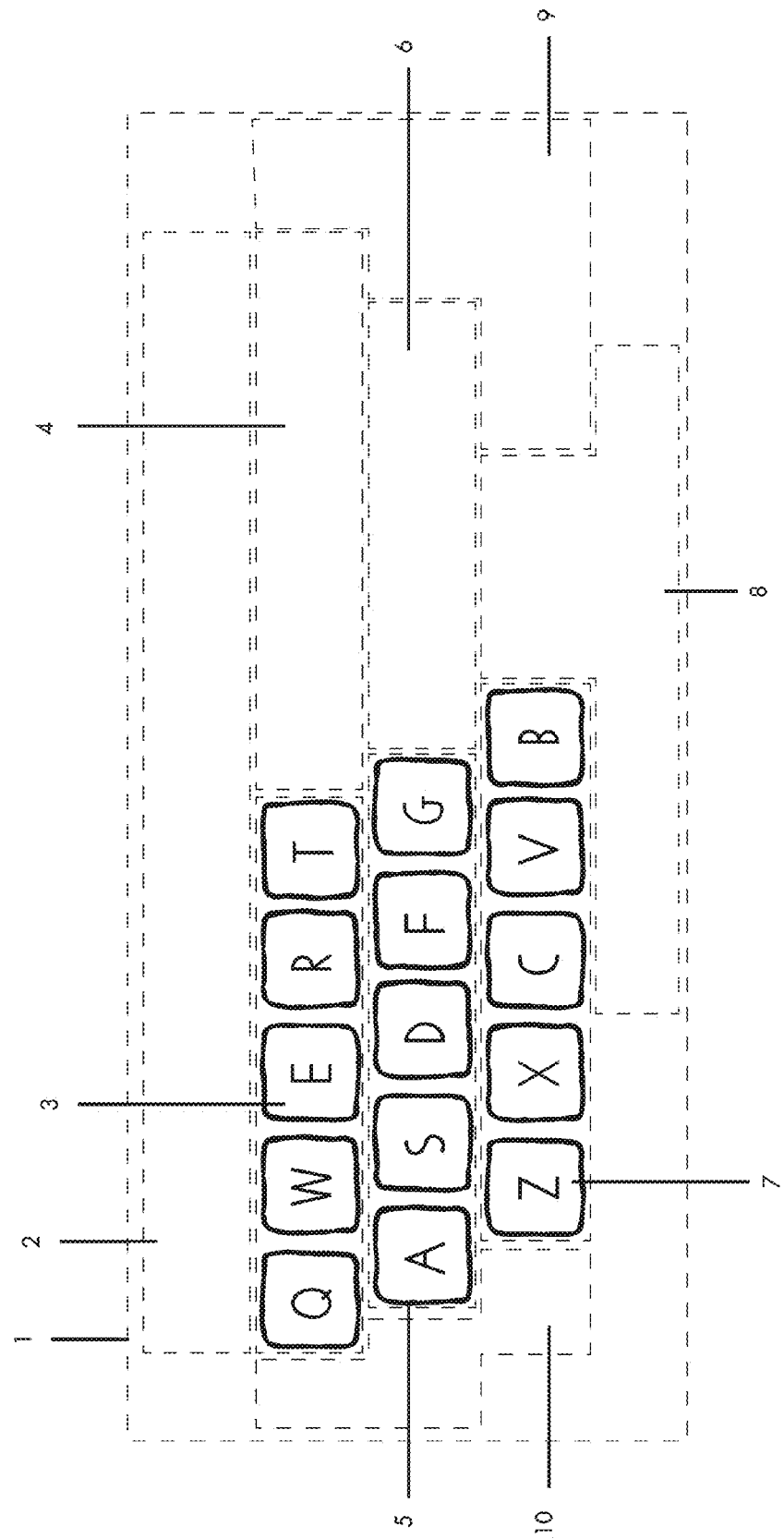
FIG. 15G is a plan view of a row-based dynamic virtual keyboard that displays the right row sections of the Top Row and Home Row and Bottom Row and shows remaining keys toggled in the hidden state.

FIG. 15G shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are visible and the keys of row section 4 are hidden. Row section 5 is the left portion of the Home Row and row section 6 is the right portion of the Home Row. The keys of row section 5 are visible and the keys of 6 are hidden. Row section 7 is the left portion of the Bottom Row and row section 8 is the right portion of the Bottom Row. The keys of row section 7 are visible and the keys of row section 8 are hidden. Section 9 and section 10 comprise Action Keys. The keys of section 9 and section 10 are hidden.

Figure 15H:
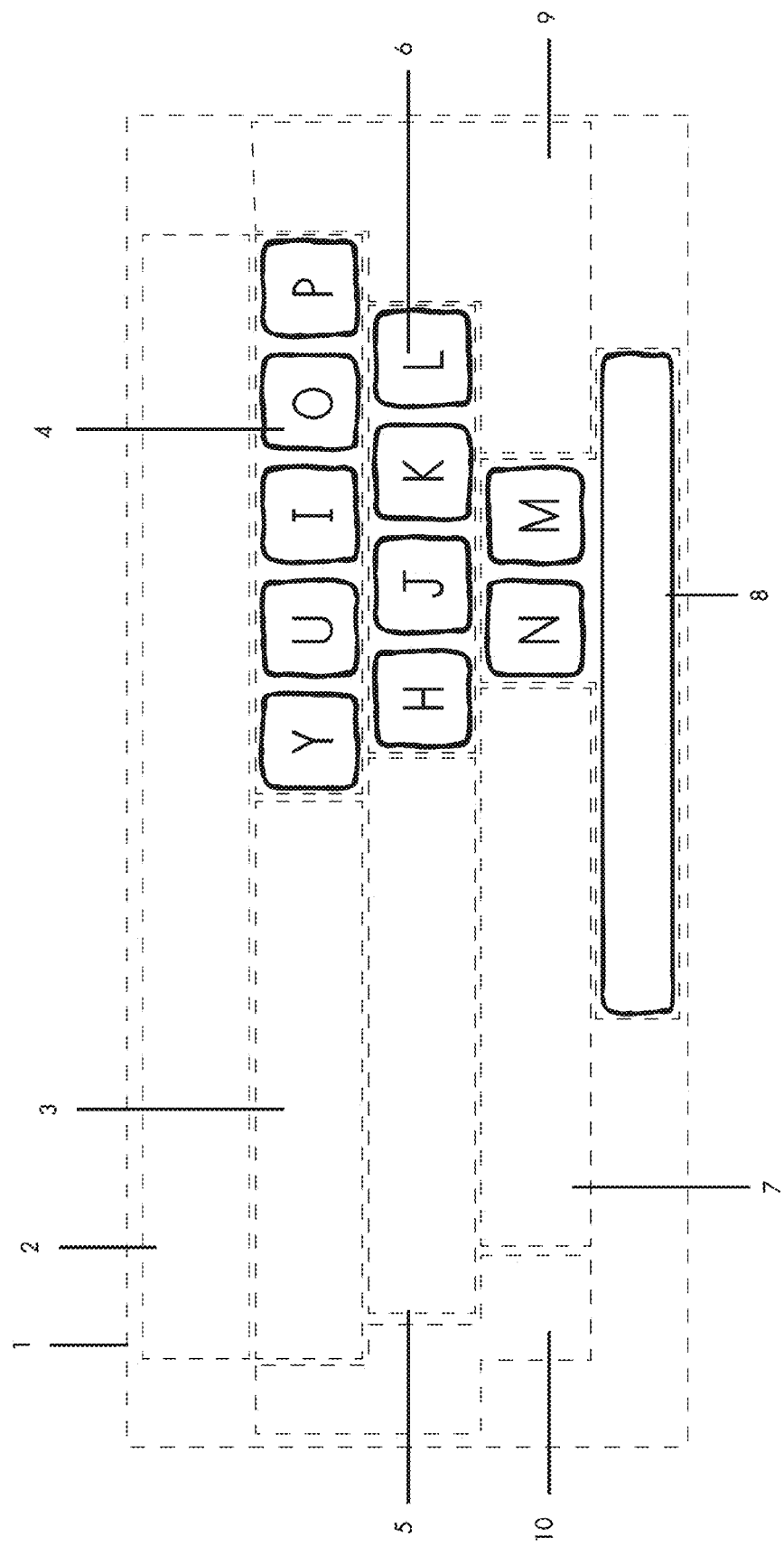
FIG. 15H is a plan view of a row-based dynamic virtual keyboard that displays the left and right row sections of the Top Row and Home Row and Bottom Row and shows remaining keys toggled in the hidden state.

FIG. 15H shows a colorless rendering of the dynamic virtual keyboard that displays the adapted QWERTY layout of the dynamic virtual keyboard. Dashed lines 1 shows the rectilinear perimeter of the dynamic virtual keyboard that resembles the shape of the physical perimeter of a physical keyboard. Row section 2 shows the Number Row. The keys of row section 2 are hidden. Row section 3 is the left portion of the Top Row and row section 4 is the right portion of the Top Row. The keys of row section 3 are hidden and the keys of row section 4 are visible. Row section 5 is the left portion of the Home Row and row section 6 is the right portion of the Home Row. The keys of row section 5 are hidden and the keys of 6 are visible. Row section 7 is the left portion of the Bottom Row and row section 8 is the right portion of the Bottom Row. The keys of row section 7 are hidden and the keys of row section 8 are visible. Section 9 and section 10 comprise Action Keys. The keys of section 9 and section 10 are hidden.

FIG. 16 shows a conceptual diagram that conveys the functionality of a dynamic cursor. The dynamic cursor is keystroke-sensitive and displays in a pre-keystroke variation to cue a student to type, and two post-keystroke variations to indicate whether the student has pressed the correct or incorrect key.

These variations are illustrated in the following three categories: "Cue to Type," "Typed Correctly," and "Typed Incorrectly."

The dynamic cursor when integrated into a curriculum may have four stages that use color with varying degrees of developmentally-appropriate prominence in the dynamic cursor's visual rendering. These four stages are: Colored Key shown in dynamic cursor 1, Colored Letter Box shown in dynamic cursor 2, Colored Line shown in vertical dynamic cursor 3 and horizontal dynamic cursor 4, and Black & White Line shown in vertical dynamic cursor 5 and horizontal dynamic cursor 6.

A dynamic cursor's color may cue the finger movement for the next keystroke to press a target symbol, whereby its color is the color of that target symbol's virtual row in the color-coding scheme of a row-based virtual keyboard or virtual dynamic keyboard. For example, if an interactive activity prompts a student to press the E key, if the Top Row is yellow in such a color-coding scheme, since the E key is in the Top Row, a dynamic cursor like the dynamic cursor 1 may be rendered as a yellow lined box. If the student presses the E key, then the dynamic cursor may shade in its form in the color yellow to indicate the correct key was pressed, as shown in dynamic cursor 7. If the student presses a key other than the E key, then the dynamic cursor may shade in its form in the color red to indicate the incorrect key was pressed, as shown in dynamic cursor 8.

If the student sees vertical dynamic cursor 3 that renders in yellow to cue the student to press the E key, and the student correctly presses the E key, the dynamic cursor advances on character and renders in the color of the next symbol to press. If the Home Row is green in such a color-coding scheme, and the next letter to press is the A key, then a dynamic cursor may render in green like vertical dynamic cursor 9.

The dynamic cursor may use color only to indicate correct or incorrect keystrokes when a student is prompted to press a key with a target symbol, and does not use color to cue the student to locate that row and relational position of that target symbol. For example, if a student is prompted with the target symbol E and dynamic cursor 5 is displayed in an interactive activity, the dynamic cursor is the color black which is not a color in the color-coding scheme of the virtual keyboarding or dynamic virtual keyboard. If the student incorrectly presses a key other than the E key, the dynamic cursor does not advance to the next character and changes color to indicate the key pressed was incorrect, such as in dynamic cursor 10.

Figure 17:
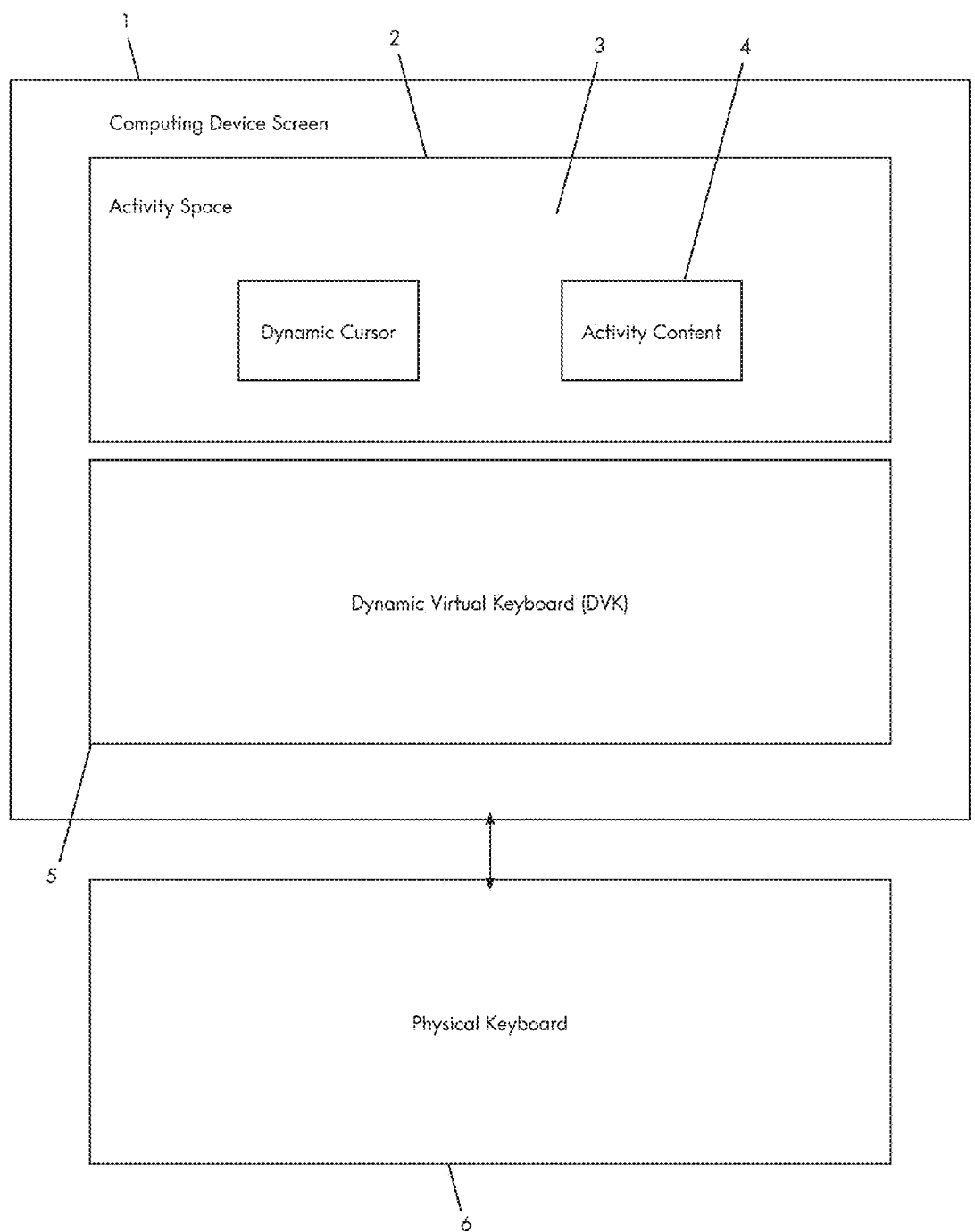
FIG. 17 is a conceptual diagram that shows a plurality of components of a system of teaching pre-keyboarding and keyboarding.

FIG. 17 shows a conceptual diagram that illustrates the spatial and functional relationships various components of systems of the present invention. Computing device screen 1 is the screen of any personal computing device, such as a desktop computer or laptop or touch-sensitive screen technology such as a tablet or iPad®. The computing device screen 1 is vertically bifurcated into two, non-overlapping rectangular displays, display 2 and display 5. Display 2, embodies the Activity Space and is the portion of computing device screen 1 where interactive activities are displayed. Beneath display 2, a virtual keyboard or dynamic virtual keyboard with an adaptable QWERTY layout is displayed in display 5. A physical keyboard 6 will generally be connected to the computing device screen when the present invention is embodied in a desktop computer or laptop. A physical keyboard 6 may or may not be connected to the computing device screen when the present invention is embodied in a touch-screen technology such as a tablet or an iPad®.

Within the Activity Space, the interactive activity may display activity content and a dynamic cursor. In a typical instructional sequence, the activity content will prompt a student with a target symbol whose relational position on a physical keyboard is cued with color by both the (dynamic) virtual keyboard and the dynamic cursor. A curriculum of interactive activities designed in this manner will teach a student foundational keyboarding skills—such as Home Row hand positions, relational position of symbol location, and Home Row positioning-based finger movements— through reinforcing instruction in a developmental sequence.

Figure 18:
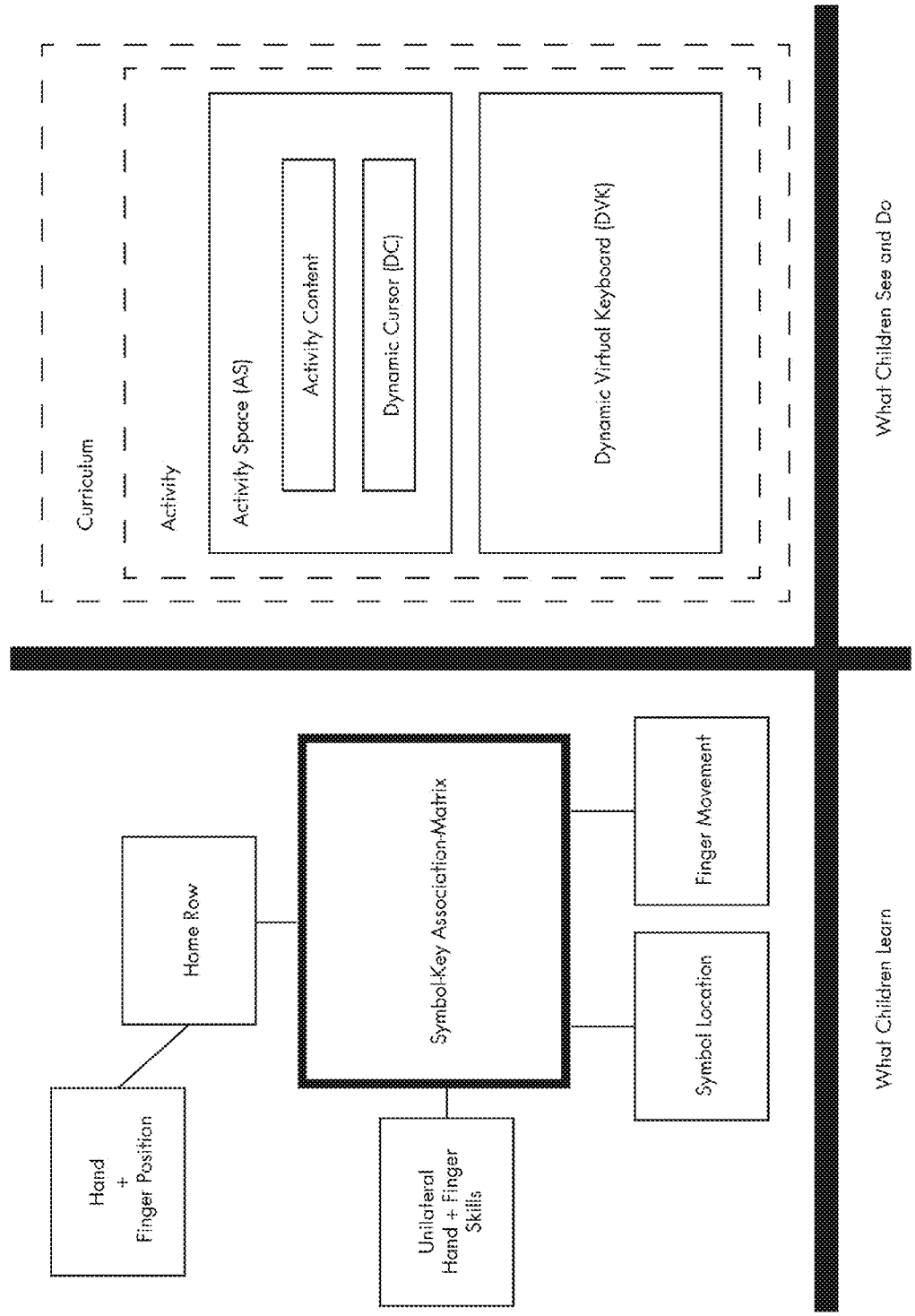
FIG. 18 is a conceptual diagram that shows relationships in a teaching methodology between the curriculum and learning objectives.

FIG. 18 shows a conceptual diagram that illustrates the methodological relationship between the audiovisual content displayed on a computing device screen shown to students, and how exposure to this content in a curriculum through reinforcing instruction teaches students foundational pre-keyboarding and keyboarding skills What students see on a computing device screen of the invention, as depicted in the right quadrant of FIG. 18, may include an interactive activity displayed in an activity space that comprises a dynamic cursor and audiovisual content, and a (dynamic) virtual keyboard. A student's interaction with the activity space and the (dynamic) virtual keyboard gradually teaches that student foundational pre-keyboarding and keyboarding skills, illustrated in the left quadrant of FIG. 18. Foundational pre-keyboarding and keyboard skills a student learns includes the Symbol-Key Association Matrix—which in certain embodiments is the QWERTY layout—symbol location, finger movement, unilateral hand and finger skills, the Home Row, Home Row hand and finger positions, and Home Row positioning-based finger movements of the left and right hand.

Figure 19:
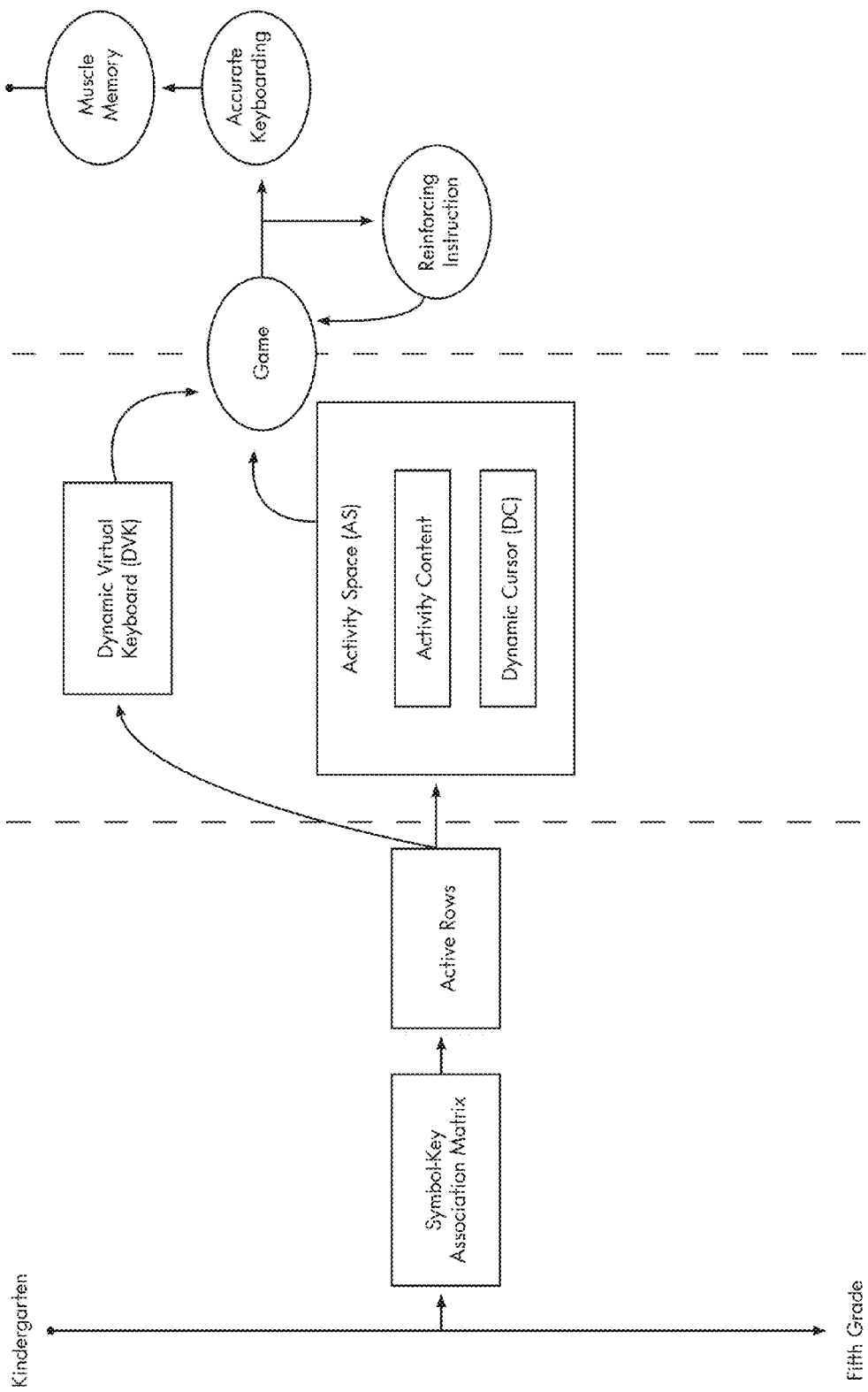
FIG. 19 is a flow chart of the teaching method as disclosed in the present invention.

FIG. 19 displays a flow chart of how systems and methods of the invention may teach pre-keyboarding and keyboarding skills over a grade-based curriculum, such as from Kindergarten to Fifth grade. One objective of a KTM or KTS may include assisting a student to transform the QWERTY layout into muscle memory gradually through a curriculum that may be based on drills, repetition, or reinforcing instruction. In certain embodiments, a curriculum may sequence showing and teaching developmentally-appropriate parts of the Symbol-Key Association Matrix in a particular teaching order which only renders certain rows of the QWERTY layout active, and therefore visible in the (dynamic) virtual keyboard on the computing device screen at a particular time. Such a teaching order may start from setting singular row sections as active, and gradually building up the student's knowledge and fluency with the entire QWERTY layout. As FIG. 19 illustrates, the row sections that are active then determine which rows are visible on the (dynamic) virtual keyboard, and also limit the content tested by the interactive activity in the Activity Space to the symbols displayed on the active row. These components are combined in a game-based user experience that teaches and develops foundational pre-keyboarding and keyboarding skills through reinforcing instruction until the student can accurately keyboard from muscle memory.

Figure 20:
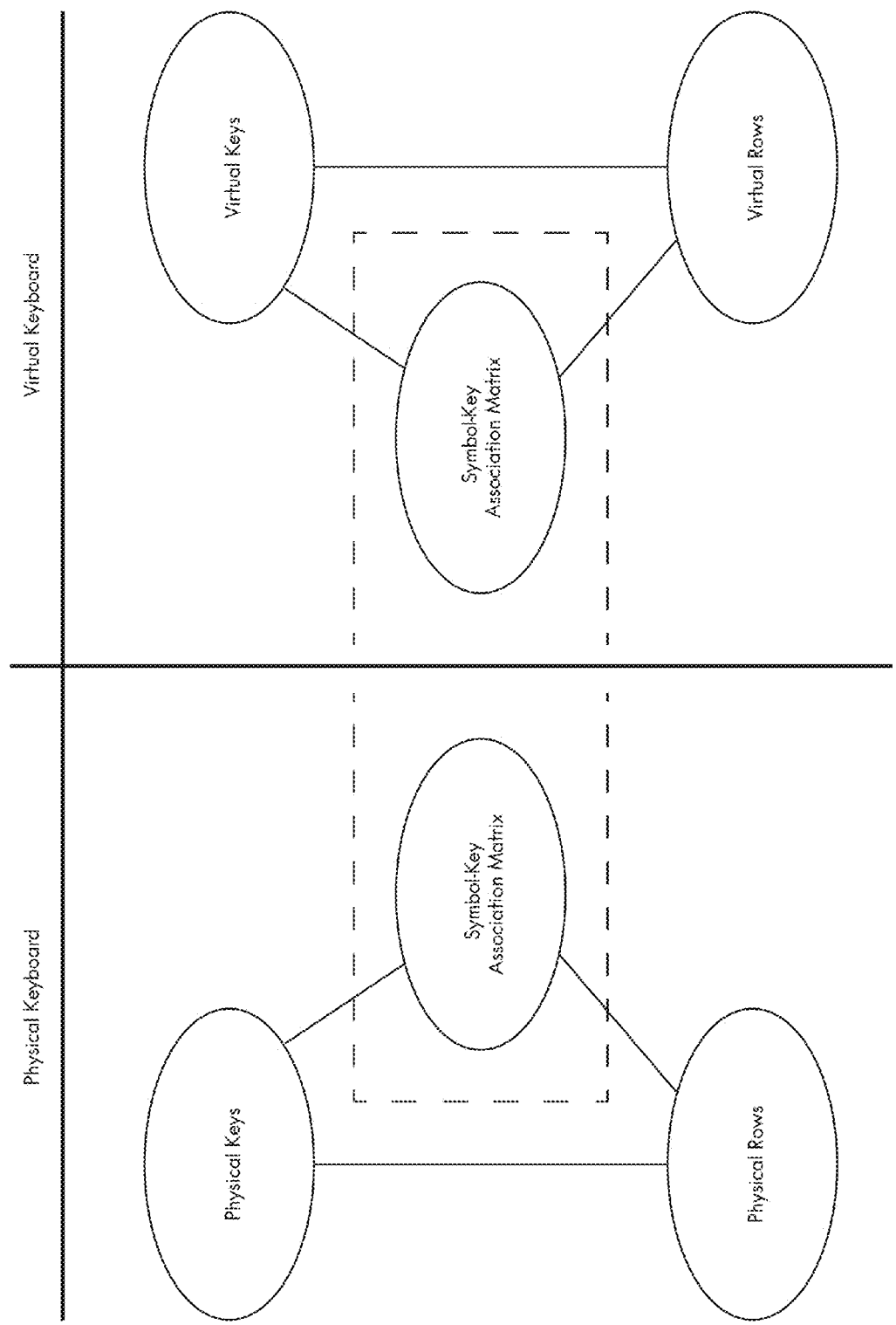
FIG. 20 is a conceptual diagram that illustrates the relationship of a virtual keyboard to a physical keyboard in a teaching method.

FIG. 20 shows a conceptual diagram that illustrates the associational relationship in a teaching system or method between the components of the physical keyboard and virtual keyboard. The Symbol-Key Association Matrix ("SKAM") is a concept that represents the particular spatiofunctional design and organization of keys displaying symbols that is shared by both the physical keyboard and virtual keyboard. Accordingly, every virtual key on the virtual keyboard corresponds to a physical key on the physical keyboard and every virtual row on the virtual keyboard corresponds to a physical row on the physical keyboard. Even when specific virtual row sections on the virtual keyboard have been toggled to a hidden state, the relational position of all virtual row sections—visible and hidden— retain their spatial organization within the QWERTY layout.

FIG. 21 shows a conceptual diagram that illustrates how a row-based color-coding scheme in the invention may use color as an aid in the KTS or KTM to meaningfully cue vertical finger movement up or down from the Home Row, whereas a multi-column-based color-coding scheme does not and can not rely on color in a KTS or KTM to cue vertical finger movement up or down from the Home Row. Key column 1 depicts the left most alphabetic column of keys on a QWERTY layout: Q, A, Z. Key column 2 shows a column-based cross section of a row-based color coding scheme for a virtual keyboard. One column has multiple colors in key column 2 because each row has a different color. Key column 3 shows a column-based cross section of column-based color coding scheme. In key column 2, since each row is marked with a different color, the change in color up or down from the middle square 4 allows a KTS or KTM to use color to cue vertical finger movement. In contrast, in key column 3, since each row is marked with the same color, there is no change in color up or down from the middle square 5 which prevents a KTS or KTM based on this color-coding scheme to use color to cue vertical finger movement.

Figure 22:
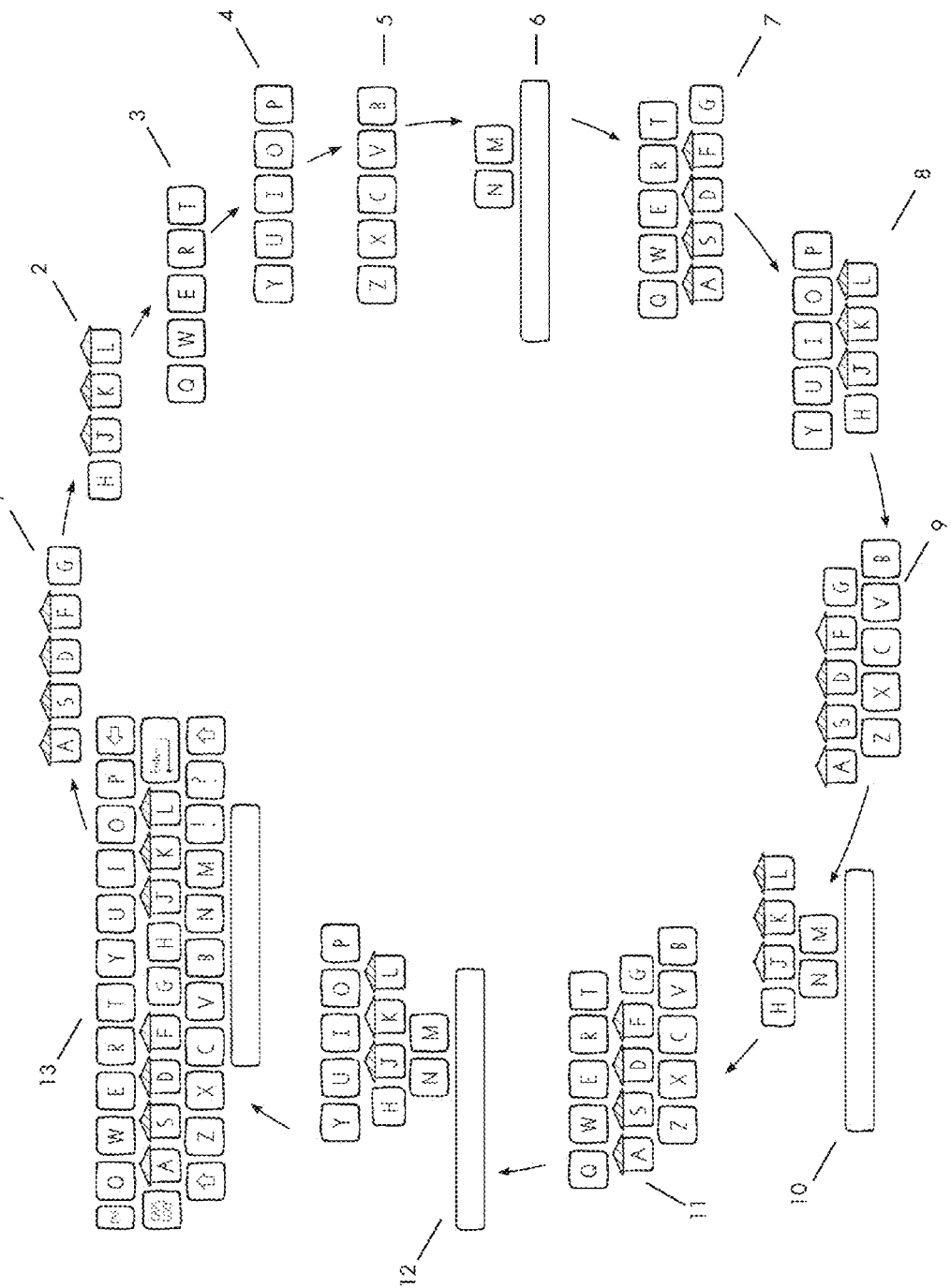
FIG. 22 is a conceptual diagram that illustrates an aspect of a teaching method.

FIG. 22 shows a conceptual diagram that illustrates the cyclical iteration of a thirteen stage row-based curriculum progression of systems and methods that may be employed in the present invention. The curriculum progression essentially toggles the visibility of portions of the QWERTY layout between visible and hidden states. This enables a KTM or KTS that implements such a curriculum progression to developmentally teach only the part of the QWERTY layout that is visible, rather than teaching the entire QWERTY layout all the time, irrespective of the students age or grade-level. The QWERTY layout of the dynamic virtual keyboard is partitioned into row-based sections and alphabetic cross section of the QWERTY layout is hexfurcated into row sections that are toggled by the KTM or KTS between a visible state and a hidden state in a developmental sequence. The six row sections are: left portion of the Top Row, right portion of the Top Row, left portion of the Home Row, right portion of the Home Row, left portion of the Bottom Row, right portion of the Bottom Row: The thirteen stages of the curriculum progression toggle one or more row sections to the visible state and one or more row sections to the hidden state in each stage and teaches only the relational position and finger movement of symbols displayed on visible row sections. In row section 1, the left portion of the Home Row is displayed and all other row sections are toggled to the hidden state. In row section 2, the right portion of the Home Row is displayed and all other row sections are toggled to the hidden state. In row section 3, the left portion of the Top Row is displayed and all other row sections are toggled to the hidden state. In row section 4, the right portion of the Top Row is displayed and all other row sections are toggled to the hidden state. In row section 5, the left portion of the Bottom Row is displayed and all other row sections are toggled to the hidden state. In row section 6, the right portion of the Bottom Row is displayed and all other row sections are toggled to the hidden state. In row section 7, the left portions of the Home Row and Top Row are displayed and all other row sections are toggled to the hidden state. In row section 8, the right portions of the Home Row and Top Row are displayed and all other row sections are toggled to the hidden state. In row section 9, the left portions of the Home Row and Bottom Row are displayed and all other row sections are toggled to the hidden state. In row section 10, the right portions of the Home Row and Bottom Row are displayed and all other row sections are toggled to the hidden state. In row section 11, the left portions of the Top Row and Home Row and Bottom Row are displayed and all other row sections are toggled to the hidden state. In row section 12, the right portions of the Top Row and Home Row and Bottom Row are displayed and all other row sections are toggled to the hidden state. In row section 13, the left and right portions of the Top Row and Home Row and Bottom Row are displayed.

FIG. 23 shows a visual rendering of an embodiment of the Symbol-Key Association Matrix (SKAM) as a two-dimensional data structure with a spatial organization of symbols arranged into five rows and fourteen columns and which conforms with a traditional QWERTY layout. The five of rows of SKAM are: the Number Row 1 which includes the array of symbols in SKAM[1]; the Top Row 2 which includes the array of symbols in SKAM[2]; the Home Row 3 which includes the symbols in SKAM[3]; the Bottom Row 4 which includes the symbols in SKAM[4]; the Space Bar Row 5 which includes the array of symbols in SKAM[5]. The relational position of symbols in the SKAM correspond with the relational position of keys displaying those symbols on a physical keyboard or (dynamic) virtual keyboard. By way of illustration, the relational position of the symbols Q in SKAM[2], A in SKAM[3], and Z in SKAM[4] correspond with the relational position of the Q key, A key, and Z key in the QWERTY layouts illustrated in FIGS. 1-10.

Figure 24:
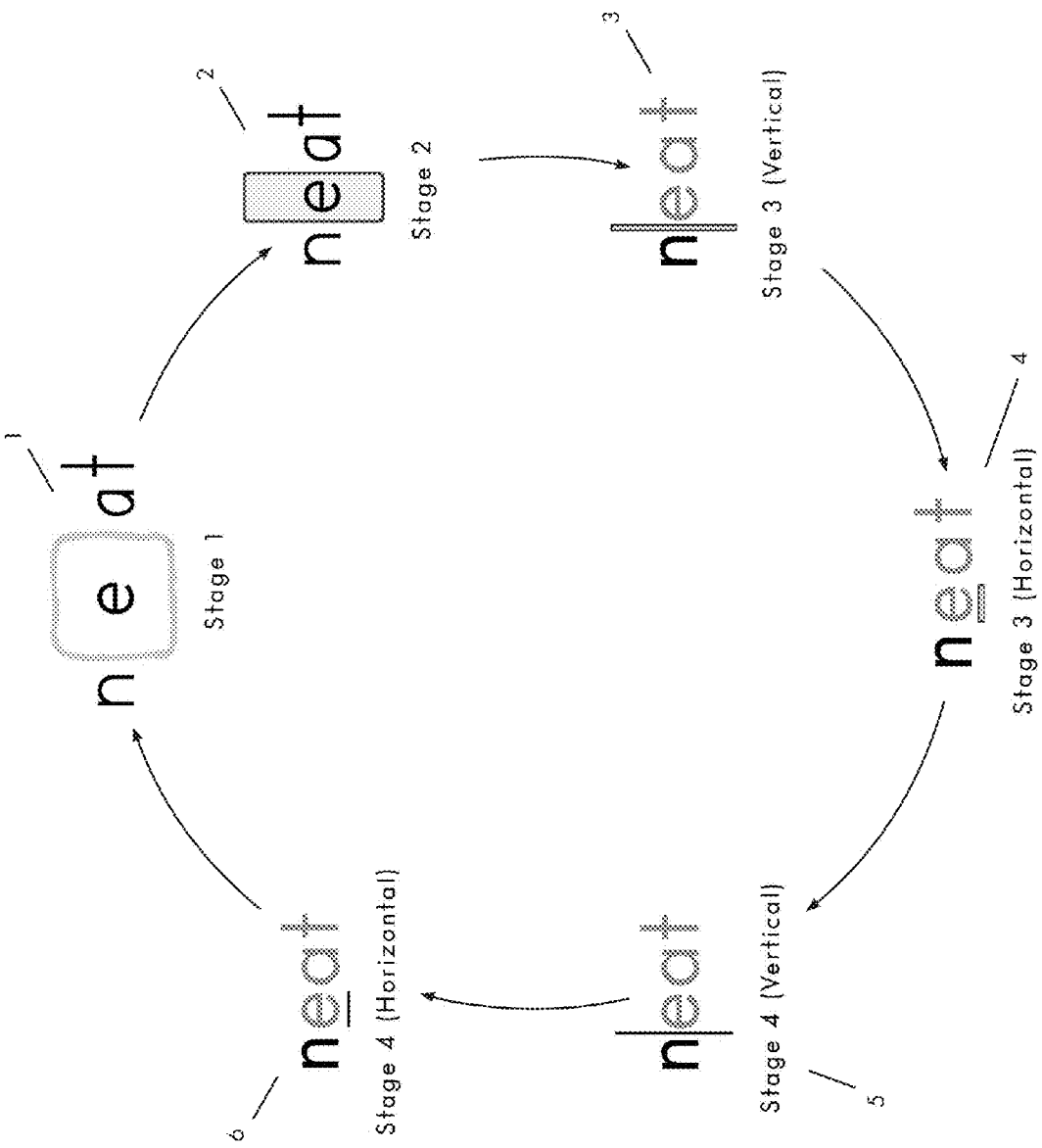
FIG. 24 is a conceptual diagram that illustrates an aspect of a teaching method.

FIG. 24 shows a conceptual diagram of an embodiment of a six step evolution through four stages of variations of a dynamic cursor which developmentally adjusts the visual prominence of the use of color to cue keystrokes and teach the relational position of symbol location on a physical or virtual keyboard.

In the first step and stage one, the shape of the dynamic cursor 1 is the shape of a virtual key and resembles the shape of a physical key, thereby visually facilitating the development of finger-key and symbol-key association. Dynamic cursor 1 of FIG. 24 corresponds with dynamic cursors 1, 7, and 8 of FIG. 16.

In the second step and stage two, dynamic cursor 2 is the shape of a colored letter box and corresponds with dynamic cursors 2, 11, and 12 of FIG. 16. Dynamic cursor 2 display color prominently but alters the cursor shape from the shape of a key to a box in order to reduce a student's reliance on an exact geometrical match between the cursor and the key. This alteration of the cursor form emphasizes the use of color to cue finger movement to the relational position of a symbol's location while diminishing the concurrent use of an exact geometrical match between the key shape and cursor form to build hand-key and finger-key association.

In the third step and stage three, dynamic cursor 3 is the shape of a vertical colored line and corresponds with dynamic cursors 3, 9, and 13 of FIG. 16. In the third step and stage three, the dynamic cursor form reduces the visual prominence of the use of color as a cue for teaching symbol location and finger movement in relationship to the size of the letter the cursor is positioned on.

In the fourth step and stage three, dynamic cursor 4 is the shape of a smaller horizontally colored line and corresponds with dynamic cursors 4, 14, and 15 of FIG. 16. The form of dynamic cursor 4 with respect to dynamic cursor 3 further diminishes the visual prominence of the use of color as a cue for teaching symbol location and finger movement in relationship to the size of the letter the cursor is positioned on.

In the fifth step and stage four, dynamic cursor 5 is the shape of a vertical black line and corresponds with dynamic cursors 5, 10, and 16 of FIG. 16. Dynamic cursors 5 and 6 in certain embodiments renders in either black or red to indicate accurate or inaccurate keyboarding, whereby if the student presses the correct key then the dynamic cursor remains black and advances to the next letter, and whereby if the student presses the incorrect key then the dynamic cursor turns to red and does not advance to the next letter until the student presses the correct key.

In step six and stage four, dynamic cursor 6 is the shape of a horizontal black line and corresponds with dynamic cursors 6, 17, and 18 of FIG. 16. With respect to dynamic cursor 5, dynamic cursor 6 of step six and stage four further reduces the visual prominence of the use of color to indicate correct or incorrect keyboarding in relationship to the letter the cursor is positioned on.

Figure 25:
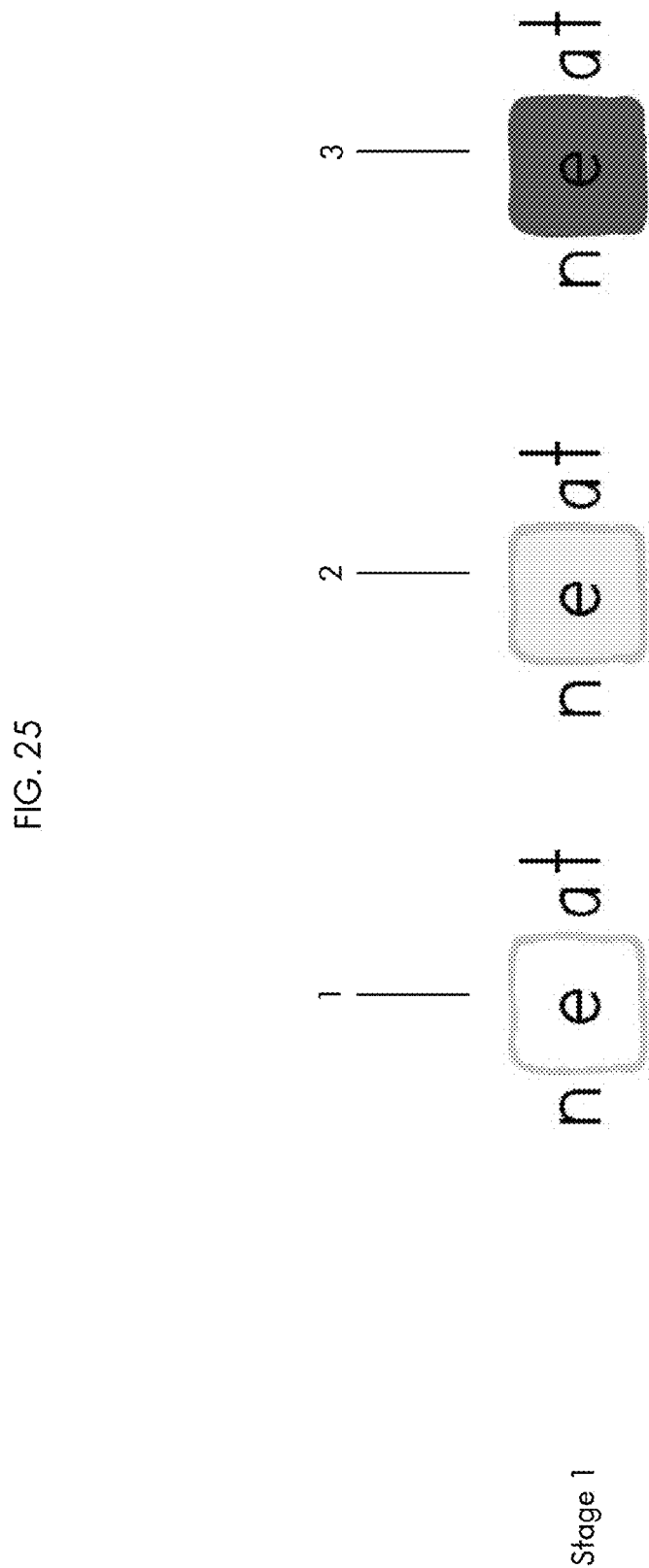
FIG. 25 is a conceptual diagram that illustrates an aspect of a dynamic cursor.

FIG. 25 shows the pre-keystroke and post-keystroke functionality of a dynamic cursor. Dynamic cursor 1 of FIG. 24 cues finger movement, symbol location, and indicates whether the student pressed the correct or incorrect key. In pre-keystroke form 1, the dynamic cursor displays as a key shape in the visual indicator of the virtual row of the letter to be pressed as defined in the virtual keyboard's coding scheme. In FIG. 25, the dynamic cursor displays in a yellow outline because the Top Row of the virtual keyboard that contains the symbol E is colored yellow. In post-keystroke form 2, the student has pressed the correct key and therefore the dynamic cursor is shaded yellow to indicate to the student that the student pressed the correct key. In post-keystroke form 3, the student has pressed the incorrect key and therefore the dynamic cursor is shaded red.

Figure 26:
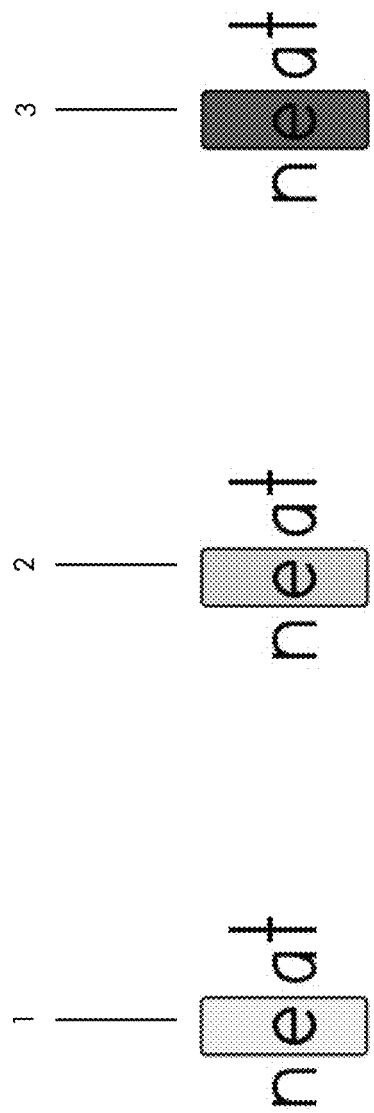
FIG. 26 is a conceptual diagram that illustrates an aspect of a dynamic cursor.

FIG. 26 shows the stages of the pre-keystroke and post-keystroke functionality of an embodiment of dynamic cursor 2 of FIG. 24 that cues finger movement, symbol location, and indicates whether the student pressed the correct or incorrect key. In pre-keystroke form 1, the dynamic cursor displays as a letter box shape in the visual indicator of the virtual row of the letter to be pressed as defined in the virtual keyboard's coding scheme. In FIG. 26, the dynamic cursor displays in a light yellow shade because the Top Row of the virtual keyboard that contains the symbol E is colored yellow. In post-keystroke form 2, the student has pressed the correct key and therefore the dynamic cursor is shaded dark yellow to indicate to the student that the student pressed the correct key. In post-keystroke form 3, the student has pressed the incorrect key and therefore the dynamic cursor is shaded red.

FIG. 27 shows stages of the pre-keystroke and post-keystroke functionality of an embodiment of dynamic cursor 3 of FIG. 24 that cues finger movement, symbol location, and indicates whether the student pressed the correct or incorrect key. In pre-keystroke form 1, the dynamic cursor displays as a vertical colored line shape in the visual indicator of the virtual row of the symbol to be pressed as defined in the virtual keyboard's coding scheme. In FIG. 27, by way of illustration, the dynamic cursor displays in yellow because the Top Row of the virtual keyboard that contains the symbol E is colored yellow. In post-keystroke form 2, the student has pressed the correct key and therefore the dynamic cursor is shaded green to indicate to the student that the student pressed the correct key and the visual indicator of the virtual row of the next letter to be pressed. In this exemplary illustration, post-keystroke form 2 is green because in the coding scheme of the virtual keyboard, the Home Row that contains the letter A is colored green. In post-keystroke form 3, the student has pressed the incorrect key and therefore the dynamic cursor is shaded red.

Figure 28:
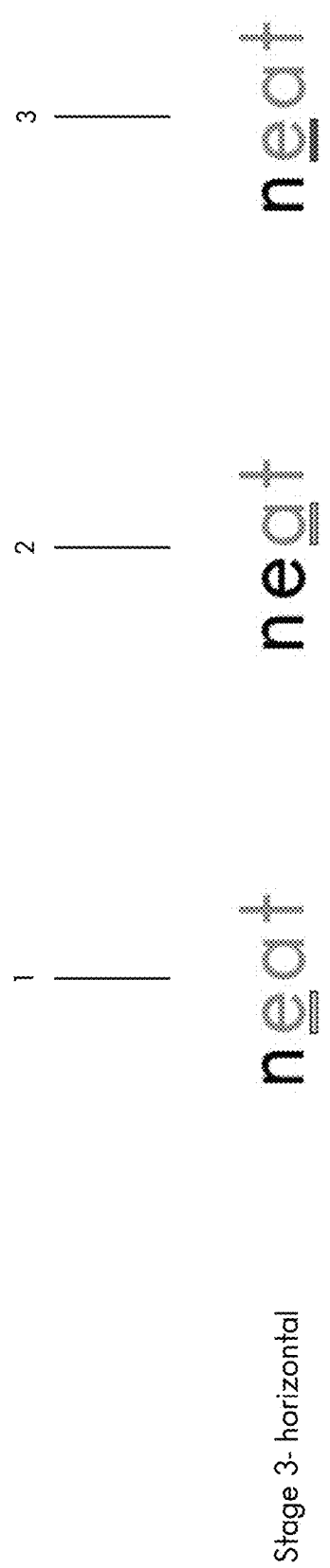
FIG. 28 is a conceptual diagram that illustrates an aspect of a dynamic cursor.

FIG. 28 shows the pre-keystroke and post-keystroke functionality of an embodiment of dynamic cursor 4 of FIG. 24 that cues finger movement, symbol location, and indicates whether the student pressed the correct or incorrect key. In pre-keystroke form 1, the dynamic cursor displays as a horizontal colored line shape in the visual indicator of the virtual row of the symbol to be pressed as defined in the virtual keyboard's coding scheme. In FIG. 28, by way of illustration, the dynamic cursor displays in yellow because the Top Row of the virtual keyboard that contains the symbol E is colored yellow. In post-keystroke form 2, the student has pressed the correct key and therefore the dynamic cursor is shaded green to indicate to the student that the student pressed the correct key and the visual indicator of the virtual row of the next letter to be pressed. In this exemplary illustration, post-keystroke form 2 is green because in the coding scheme of the virtual keyboard, the Home Row that contains the letter A is colored green. In post-keystroke form 3, the student has pressed the incorrect key and therefore the dynamic cursor is shaded red.

Figure 29:
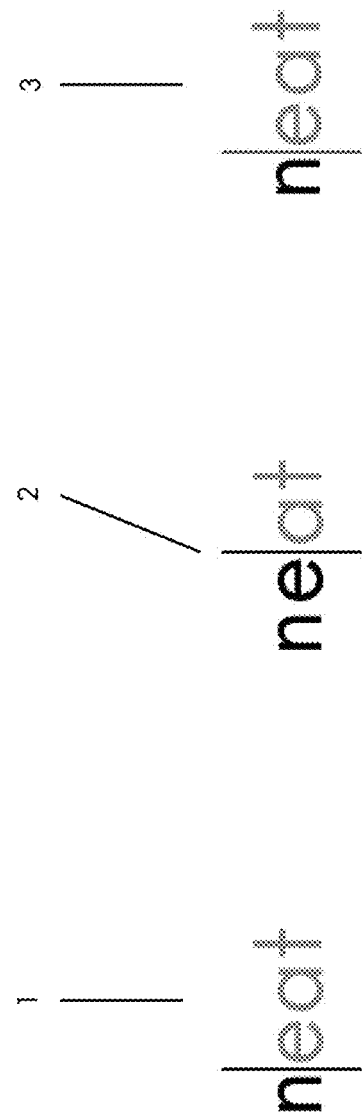
FIG. 29 is a conceptual diagram that illustrates an aspect of a dynamic cursor.

FIG. 29 shows the pre-keystroke and post-keystroke functionality of an embodiment of dynamic cursor 5 of FIG. 24 that indicates whether the student pressed the correct or incorrect key. In pre-keystroke form 1, the dynamic cursor displays as a vertical black line shape. In post-keystroke form 2, the student has pressed the correct key and therefore the dynamic cursor advances to the next symbol to be pressed and retains the same form and color. In post-keystroke form 3, the student has pressed the incorrect key and therefore the dynamic cursor is shaded red. Pre-keystroke form 1 will transition to post-keystroke form 2 or post-keystroke form 3 but never both because a student can only press a correct key or an incorrect key.

Figure 30:
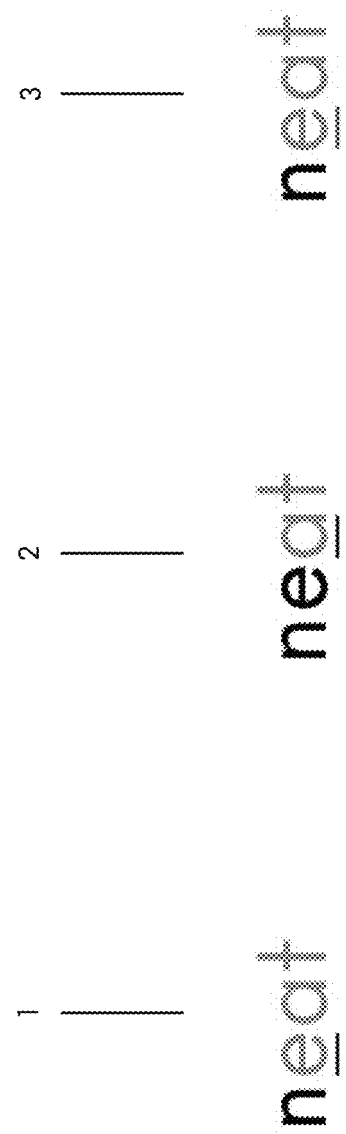
FIG. 30 is a conceptual diagram that illustrates an exemplary aspect of a dynamic cursor.

FIG. 30 shows the pre-keystroke and post-keystroke sequential functionality of an embodiment of dynamic cursor 6 of FIG. 24 that indicates whether the student pressed the correct or incorrect key. The sequential functionality of dynamic cursor 6 of FIG. 24 as illustrated in FIG. 30 is identical to the sequential functionality of dynamic cursor 5 of FIG. 24 as illustrated in FIG. 29. In pre-keystroke form 1, the dynamic cursor displays as a horizontal black line shape. In post-keystroke form 2, the student has pressed the correct key and therefore the dynamic cursor advances to the next symbol to be pressed and retains the same form and color. In post-keystroke form 3, the student has pressed the incorrect key and therefore the dynamic cursor is shaded red. Pre-keystroke form 1 will transition to post-keystroke form 2 or post-keystroke form 3 but never both because a student can only press a correct key or an incorrect key.

Figure 31:
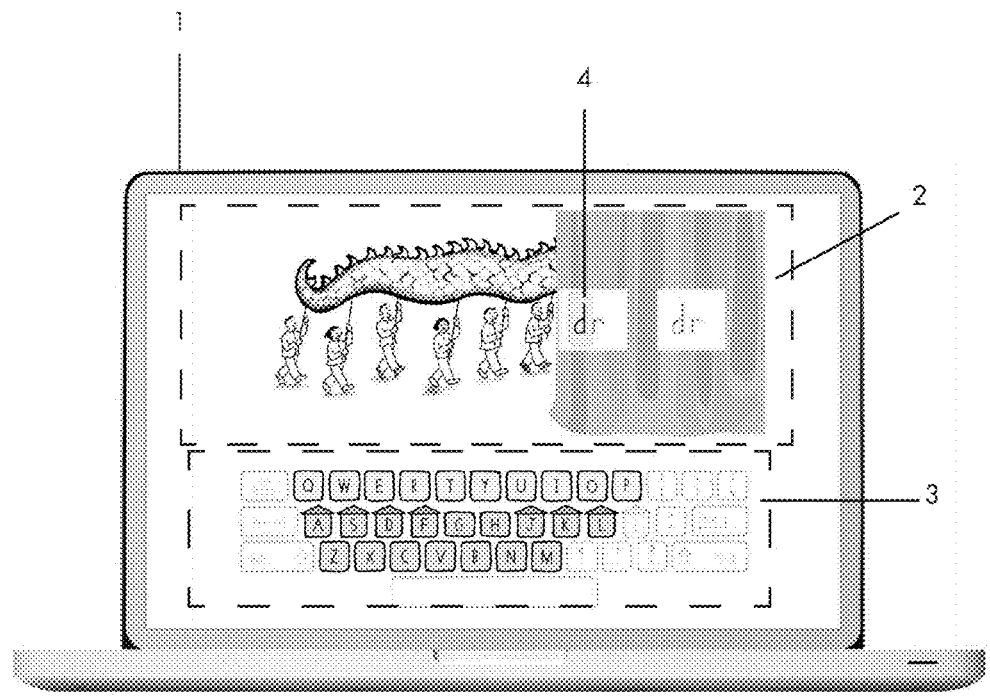
FIG. 31 is a plan view of a frame of an interactive activity displayed on a laptop.

FIG. 31 shows a perspective view of a system of the invention on a laptop 1. The laptop's display screen illustrates an interactive activity in an activity space 1 positioned vertically above a dynamic virtual keyboard 3. A dynamic cursor 4 prompts the student to press the D key. The interactive activity repeatedly prompts the student to type "dr", a commonly typed letter combination. Each time the student correctly types "dr", the green curtain opens progressively to ultimately show a dragon. Due to the angle FIG. 31, the laptop's physical keyboard is not visible.

Figure 32:
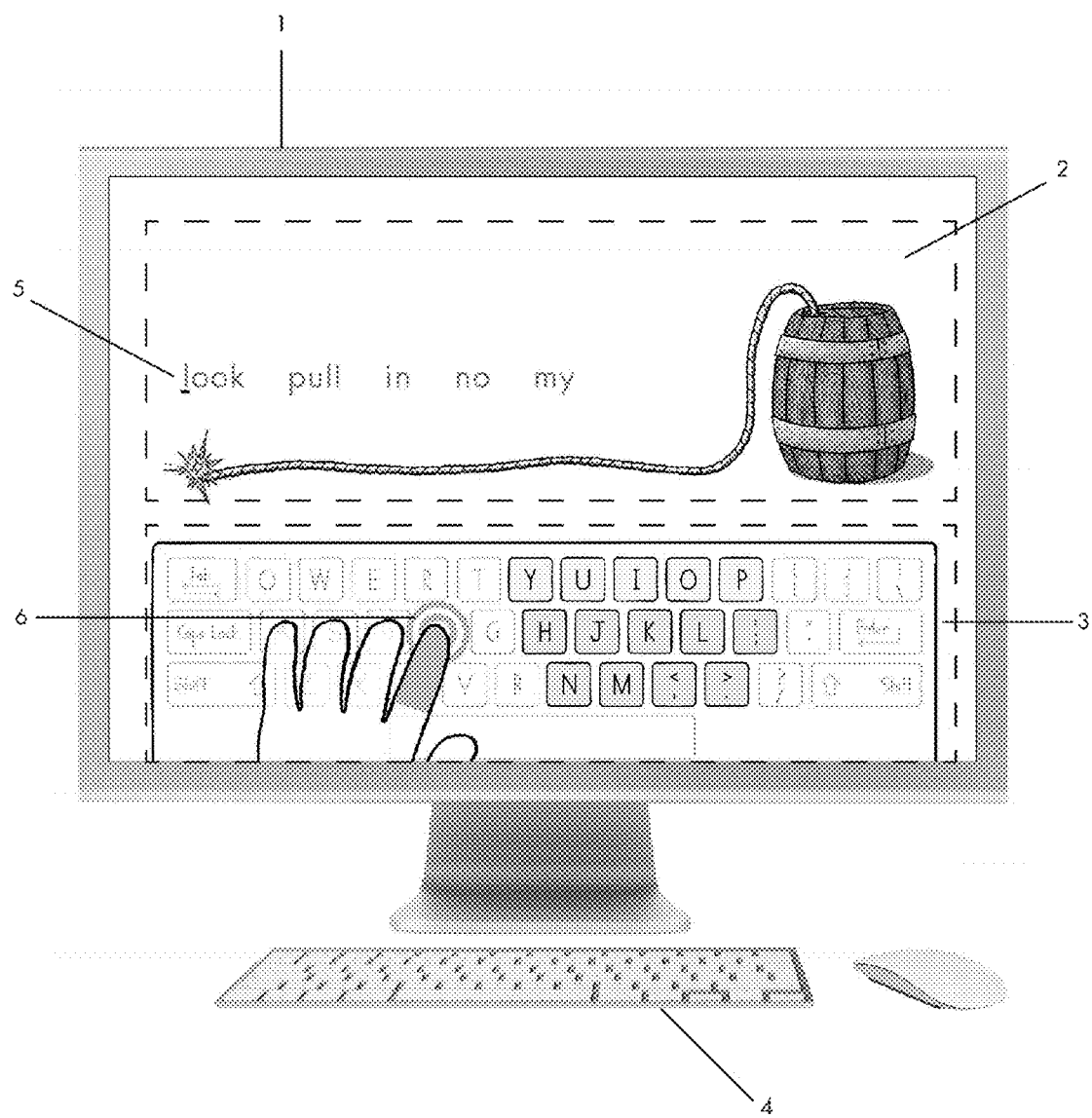
FIG. 32 is a plan view of a frame of an interactive activity displayed on a desktop computer.

FIG. 32 shows a perspective view of a system of the invention on a desktop computer, that includes a display screen 1 and physical keyboard 4. The display screen 1 shows an interactive activity in an activity space 2 positioned vertically above a dynamic virtual keyboard 3. A dynamic cursor 5 prompts the student to press the L key. The dynamic virtual keyboard 3 only displays the right portions of the Tope Row, Home Row, and Bottom Row in a visible state while toggling the left portions of these rows and the Number Row to a hidden state. The left hand image 6 that indicates the left pointer finger must press the F key requires the student to hold this key down with the left pointer finger will typing the words "look," "pull," "in", "no", and "my" with Home Row positioning-based finger movements of the right hand. Because the interactive activity requires the student to keep the left pointer finger holding the F key down, the student can only use his right hand to type words. This helps teach the student and assures the correct hand is being used.

Figure 33:
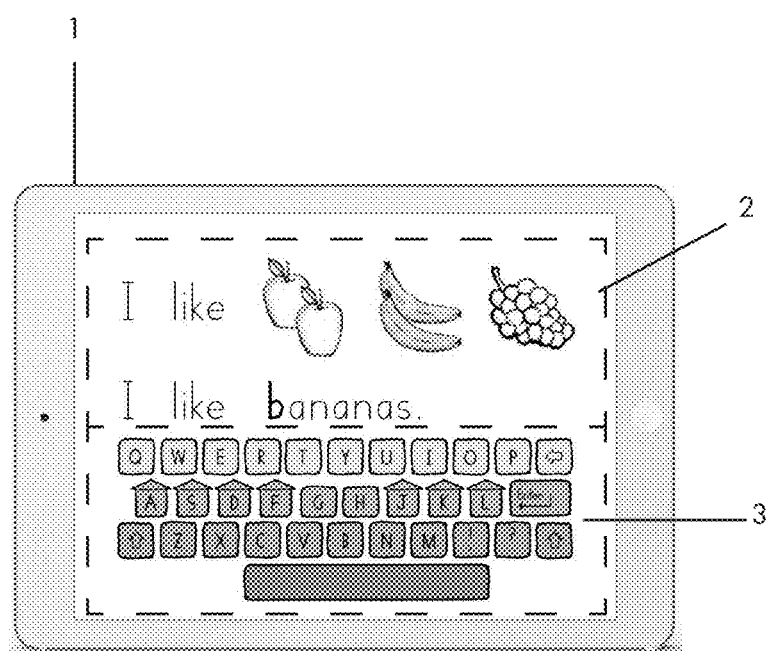
FIG. 33 is a plan view of a frame of an interactive activity displayed on a touch-sensitive screen device such as a tablet or iPad®.

FIG. 33 shows a plan view of a touch-sensitive display screen device 1 such as a tablet or iPad®. The display screen shows an interactive activity in an activity space 2 positioned above a dynamic virtual keyboard 3. The touch-sensitive display screen allows a student to use the dynamic virtual keyboard as a de facto physical keyboard by pressing virtual keys on the touch-sensitive display screen as the student would press physical keys on a physical keyboard. The touch-sensitive keyboard on the tablet is no longer visible and instead only the inventive system's virtual keyboard is visible and active.

FIGS. 34-53 show exemplary display screen images of still frames of exemplary interactive activities. Students are taught and learn pre-keyboarding and keyboarding skills through engaging with these interactive activities on computing devices with physical keyboards such as a laptop or desktop computer, and also computing devices with a touch-sensitive display screen.

FIGS. 34-35 depict an interactive activity designed to teach the student the spatial organization and relational position of keys on the keyboard.

Figure 37:
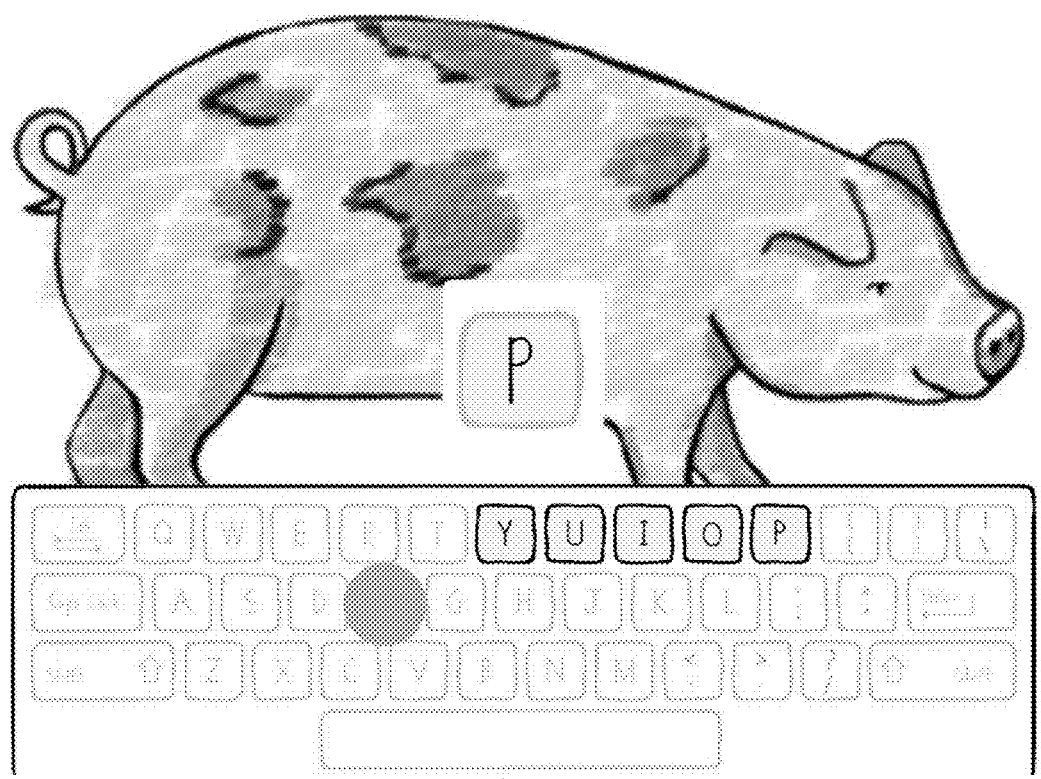
FIG. 37 shows a screen image of a frame of an interactive activity that is entitled "Zoom In."

FIGS. 36-37 depicts an interactive activity designed to teach the student to associate images with words and type those words with the fingers of one hand while the index finger of the other hand is pressing and holding a key, cued by a dynamic cursor.

Figure 38:
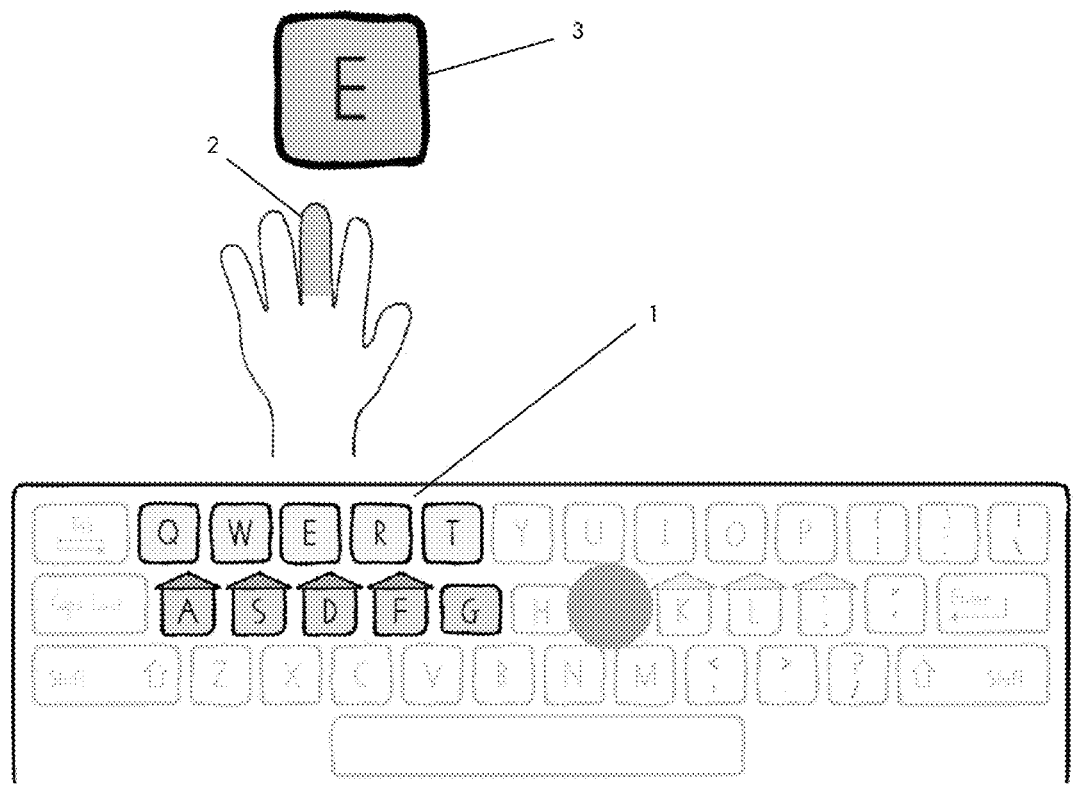
FIG. 38 shows a screen image of a frame of an interactive activity that is entitled "Painted Finger Clue."
Figure 39:
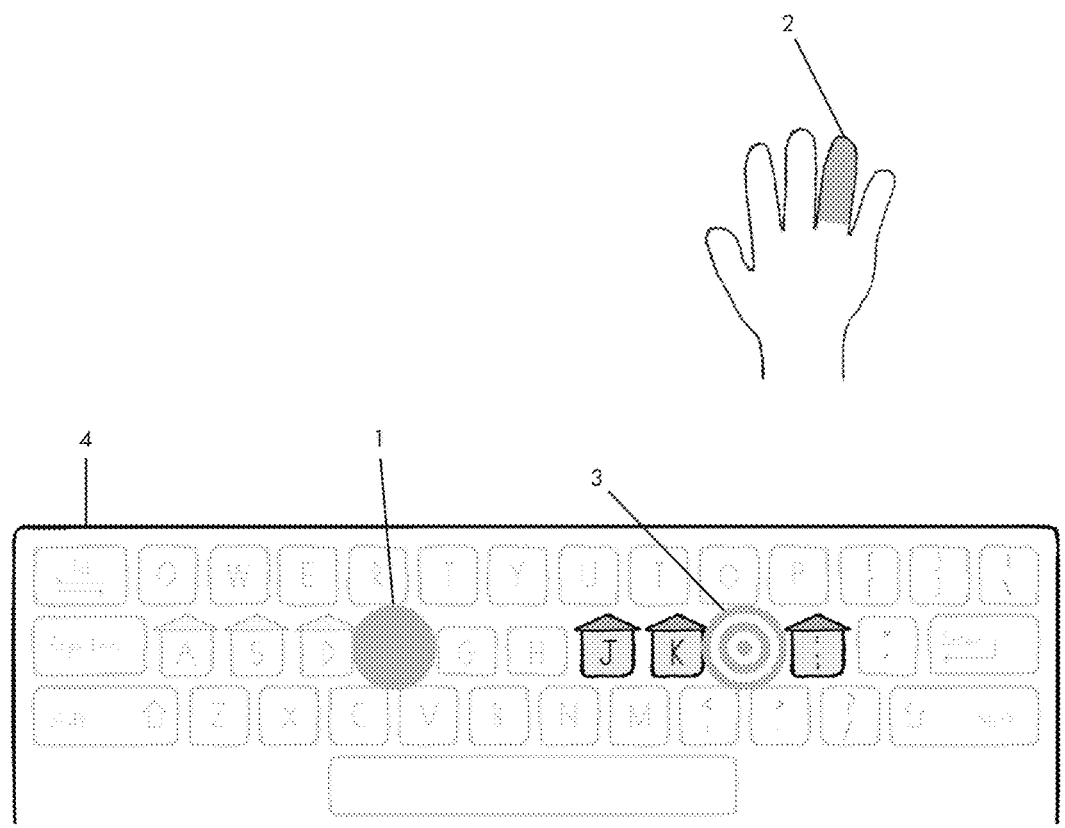
FIG. 39 shows a screen image of a frame of an interactive activity that is entitled "Target Practice."
Figure 40:
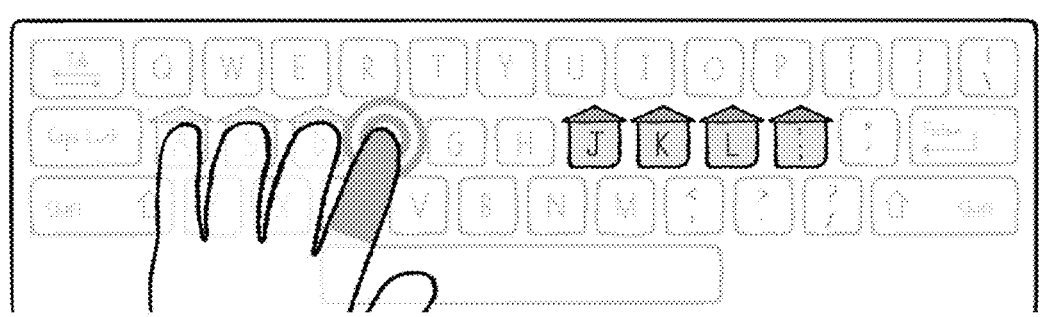
FIG. 40 shows a screen image of a frame of an interactive activity that is entitled "Target Practice."
Figure 41:
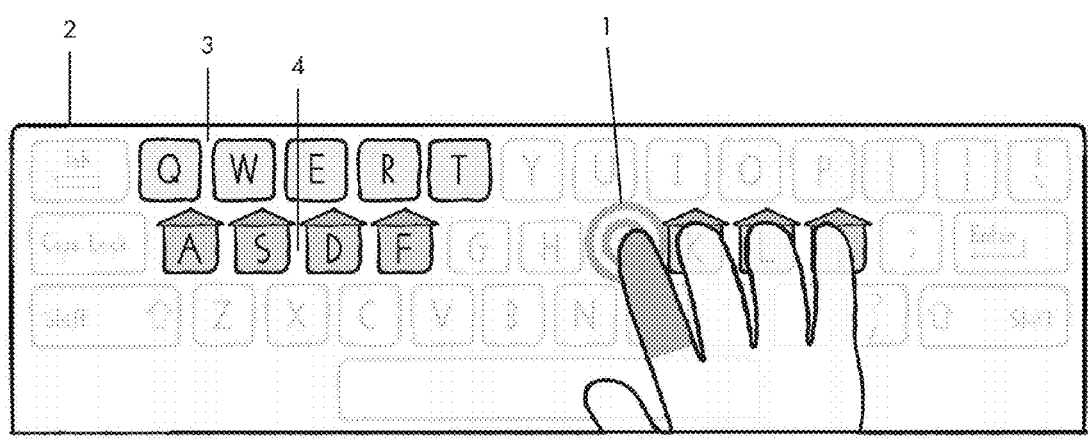
FIG. 41 shows a screen image of a frame of an interactive activity that is entitled "Target Practice."
Figure 42:
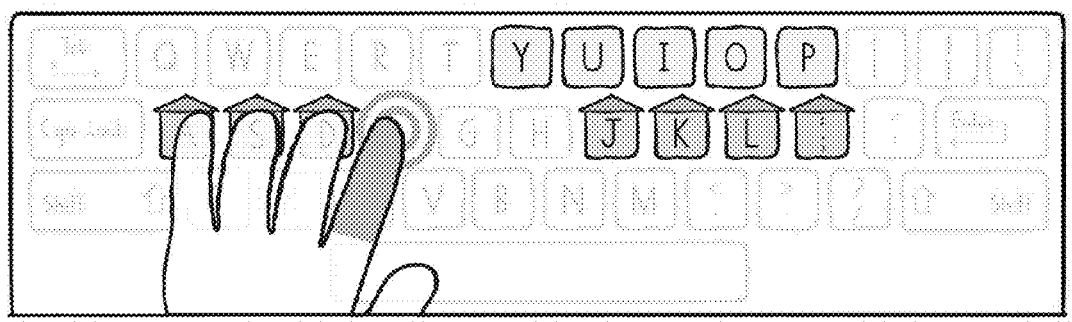
FIG. 42 shows a screen image of a frame of an interactive activity that is entitled "Target Practice."

FIGS. 38-39 depict an interactive activity designed to teach the student finger-key association by displaying a finger painted in the color of the target symbol's virtual row, thereby reinforcing symbol location, finger selection, and finger movement.

FIGS. 39-42 depict an interactive activity designed to teach the student unilateral hand and finger skills, typically alternating the left and right hands between dynamic and stationary states whereby, in a first sequence a finger of the left hand is stationary and pressing and holding one key down while the fingers of the right hand are dynamic and pressing and releasing keys, and in a second sequence a finger of the right hand is stationary and pressing and holding one key down while the fingers of the left hand are dynamic and pressing and releasing keys.

Figure 45:
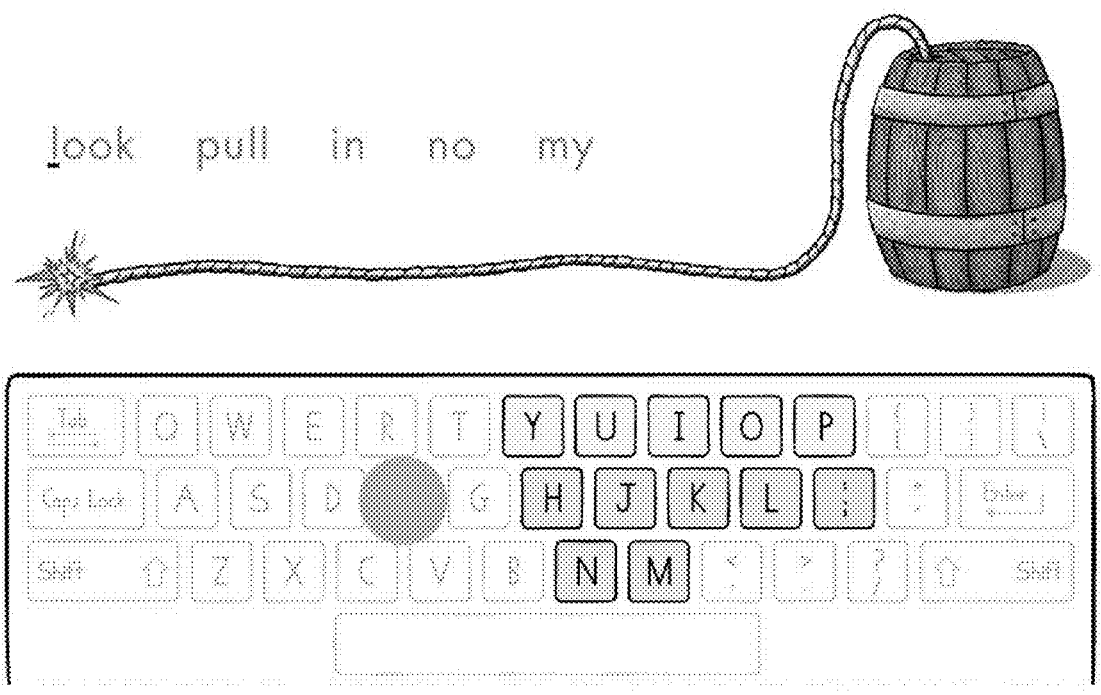
FIG. 45 shows a screen image of a frame of an interactive activity that is entitled "Dolch Dynamite."

FIGS. 43-45 depict interactive activities use imagery and the dynamic cursor to teach students the relational position of symbols and finger movements associated with keys that are visible in the active row sections of the dynamic virtual keyboard.

FIG. 46 depicts an interactive activity designed to teach the student to use an adaptable QWERTY layout with the Number Row toggled to the hidden state to type phrases.

Figure 47:
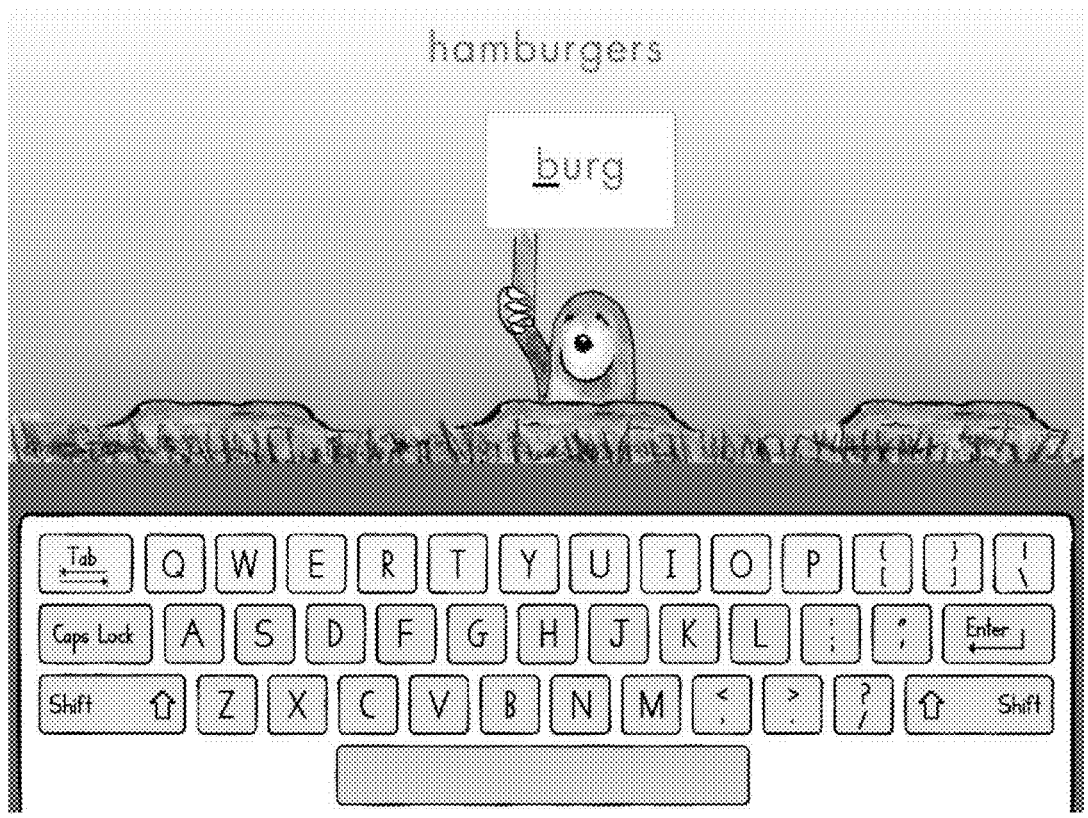
FIG. 47 shows a screen image of a frame of an interactive activity that is entitled "Syllable Pop Up."

FIG. 47 depicts an interactive activity designed to teach the student to use an adaptable QWERTY layout with the Number Row toggled to the hidden state to type syllables of words.

FIG. 48 depicts an interactive activity designed to teach the student to use a normal-standard QWERTY layout to type his name. The A, S, D, F, J, K, L, and semicolon/colon keys in the Home Row are each depicted to resemble a house.

Figure 49:
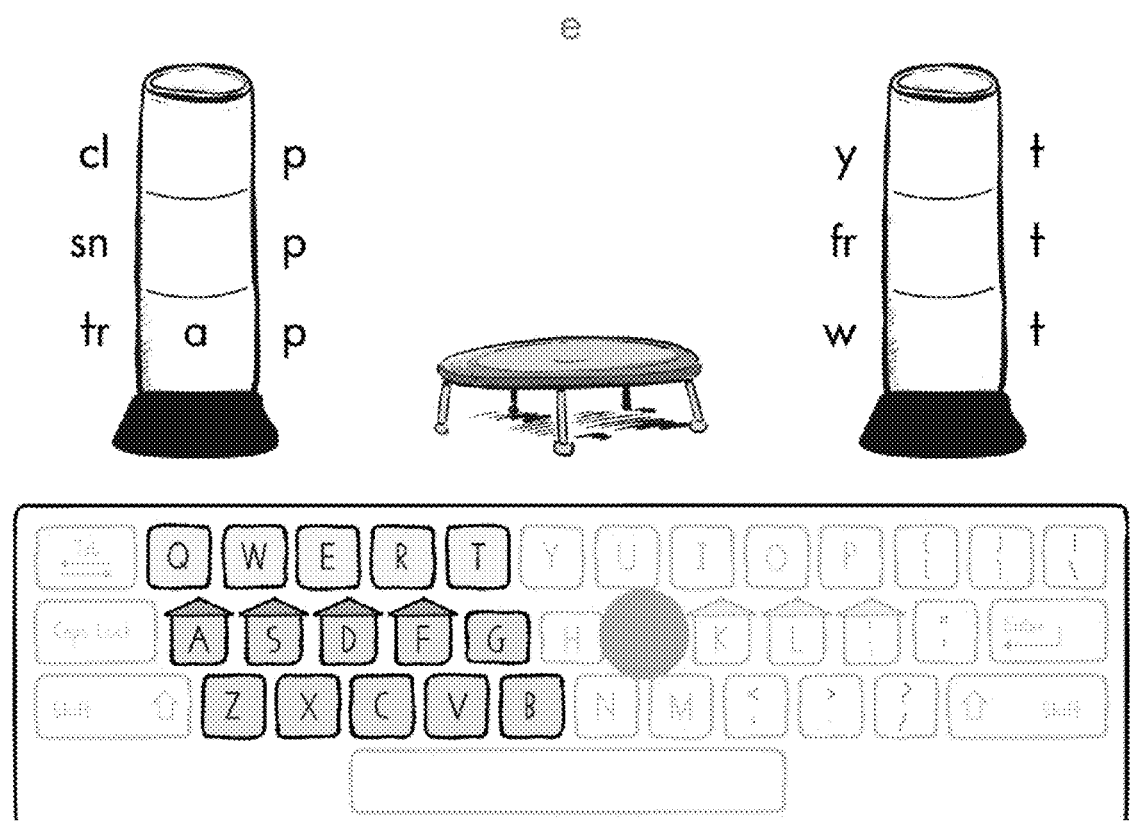
FIG. 49 shows a screen image of a frame of an interactive activity that is entitled "Bouncing Vowels."

FIG. 49 depicts an interactive activity designed to teach the student hand-key association and to type vowels while learning the relational position of symbols and associated finger movements of the left hand. The A, S, D, and F keys in the Home Row are each depicted to resemble a house.

Figure 50:
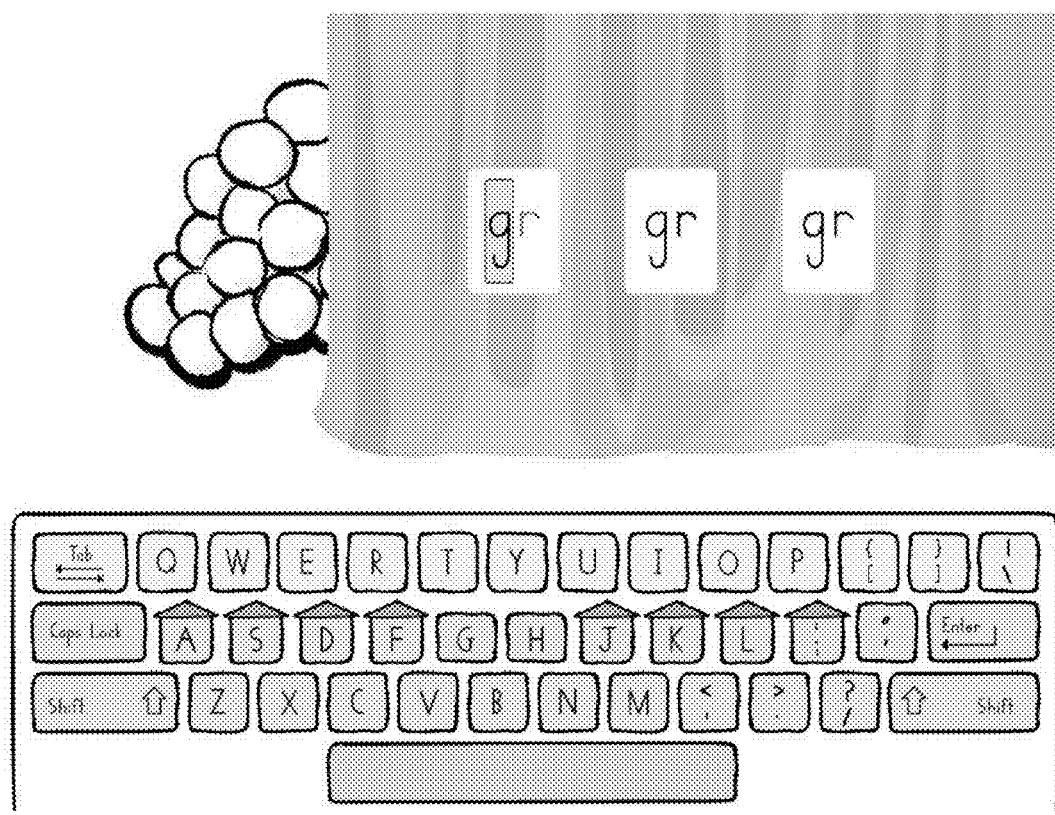
FIG. 50 shows a screen image of a frame of an interactive activity that is entitled "Curtain Call."

FIG. 50-52 depict interactive activities designed to teach the student to type commonly typed letter combinations, such as "gr" in FIG. 50, "tr" in FIG. 51, and "tr" and "sn" in FIG. 52. FIG. 53 depicts an interactive activity designed to teach the student to select an image, and subsequently re-type a sentence related to that image.

FIGS. 54-56 show examples of column-based KTMS or KTS disclosed by the prior art. In column-based approaches, the coding system that defines how students internalize the partitioned visual perceptual field of a QWERTY layout typically uses color to visually chunk the spatial organization of keys into a multi-column key grouping.

For example, FIG. 54 shows column 1 in red and column 2 in yellow and column 3 in green and column 4 in purple in its multi-column key grouping, creating unique hand-key association within its system, whereby the colors for columns 1-3.

FIG. 55 shows a column 1 in aqua and a column 2 in green and a column 3 in orange and a column 4 in green in its multi-column key grouping. The coding scheme of FIG. 55 does not create unique hand-key association. For example in FIG. 55, green is assigned to column 2 which is associated with the left hand in the Home Row position and also green is assigned to column 4 which is associated with the right Hand in the Home Row position. This coding scheme may generate left-right confusion in developmental learning of the relational position of symbol location and the spectrum of Home Row positioning-based finger movement because green is assigned to keys pressed by fingers of both the left and right hand. FIG. 56 shows column 1 in red and column 2 in yellow and column 3 in light green and column 4 in blue in its multi-column key grouping.

In FIGS. 54-56, the variable visual chunking used the column-based coding scheme manufactures complexity, both a unit aspect in the number of key groupings a student must memorize, and also at the relational position aspect as students learn the location of symbols on a QWERTY layout with respect to the relational position of the key groupings.

Visual Indicator Cuing

The invention disclosed herein relates to a system for teaching keyboarding and methods of teaching utility systems described herein. Systems may have a row-based visual cuing system, a dynamic virtual keyboard, and/or a dynamic cursor, or a combination thereof. The dynamic virtual keyboard may have Home Row keys depicted as a "home/house" structure. The row-based visual cuing system uses a visual indicator to uniquely, visually partition the plurality of keys on a QWERTY keyboard layout into a numerically smaller plurality of rows uniquely identifiable by the visual indicator. The visual indicator can be any marking to allow the user to visually discriminate the rows from other rows. One example of a visual indicator is the use of color. When the visual indicator of color is used to visually discriminate a row from other rows, each row has a different color than the other rows. As a non-limiting example, instead of color, the rows could be marked with different shading of the same color (e.g. light, medium, dark, very dark) or could be marked with background patterns (e.g. left slanted dashes, right slanted dashes, dots, straight lines, curved lines, etc.). For example, see FIGS. 1-10.

Once a keyboarder's left and right hand are on the Home Row hand positions in proper QWERTY keyboarding form, approximately about 90% of keystrokes in the essential keystroke spectrum require vertical finger movement. From the essential forty-six keystroke spectrum of Home Row positioning-based finger movements, nine keystrokes require no horizontal or vertical finger movement and only require that the keyboarder press the following keys using fingers already positioned over them: {A, S, D, F, J, K, L, semicolon/colon, and space bar}; three keystrokes require horizontal without vertical finger movements: {G, H, enter/return}; thirty-seven keystrokes from Home Row hand positioning involve vertical finger movement up or down from the Home Row: {Numeric Keys: 1, 2, 3, 4, 5, 6, 7, 8, 9, 0; Alphabetic Keys: Q, W, E, R, T, Y, U, I, O, P, Z, X, C, V, B, N, M; Punctuation Keys: period/greater than, comma/less than, forward slash/question mark, exclamation point: Action Keys: backspace, left shift, right shift, left tab}.

One example of a visual indicator is color. A horizontal color-coding scheme that uniquely applies a visual indicator like color to uniquely identify a row of keys on a QWERTY keyboard layout, such as a virtual keyboard, serves as a visual cue for Home Row positioning-based vertical finger movement. Here, color comparison between keys of uniquely colored rows determines the vertical directionality of finger movement from the Home Row hand position to press a target key on the target row. For example if the Top Row is uniquely identifiable by the color yellow and the Home Row is uniquely identifiable by the color green in the row-based color-coding scheme and the target key to press is the color yellow, since the Top Row is vertically positioned above the Home Row, by comparing the colors of yellow and green, a keyboarder can deduce one finger from one hand will need to move vertically up from the Home Row to the Top Row to press the target key. Alternatively, if the Bottom Row is uniquely identifiable by the color blue in the same row-based color-coding scheme and the target key to press is the color blue, since the Bottom Row is beneath the Home Row, a keyboarder can deduce one finger from one hand will have to move vertically down from the Home Row to the Bottom Row to press the target key. Alternatively, in the same row-based horizontal color-coding scheme, if the target key to press is the color green, since a color comparison determines that green which is the color of the target key is also the color of the Home Row and the keyboarder's fingers are already positioned on the Home Row, the keyboarder can deduce that no vertical finger movement is required to press the target key since the keyboarder's fingers are already on the Home Row that the target key is on.

For example, see FIGS. 1-10 which show the Top Row as yellow, the Home Row as green, and the Bottom Row as blue, whereby each color is a unique visual indicator for the color it marks. Other colors can be used other than yellow, green, and blue so long as those colors each uniquely mark a row. Additionally, the horizontal color-coding of rows simplifies the visual discrimination and visual figure-ground segregation of symbols in the row by rendering the entire row in one color so that the only visual difference between keys is the symbol.

Metaphorical Cuing

A row-based child-friendly metaphorical cuing system uses color to visually partition the plurality of keys on a QWERTY keyboard layout into a plurality of rows uniquely identifiable by color. The use of color in a row-based metaphorical cuing systems correlates a sequential order of positional colors that uniquely identify a keyboard's plurality of rows to metaphorical objects that correspond with those colors and share a relational positional relationship in the natural world that mirrors the sequential ordering of positional colors in the visual perceptual field. The metaphorical objects are often part of the student's prior experience. For example, since the Number Row, Top Row, Home Row, Bottom Row, and Space Bar Row are respectively vertically positioned within the QWERTY keyboard layout in descending order with the Number Row at the top and Space Bar Row at the bottom, the colors for each row should correspond to objects in a child's prior existence in color and relational vertical spatial position, whereby the object of the color for the Number Row shares its color and is considered to be relationally vertically above the object of the color for the Top Row that shares the color of the Top Row, and so on. For example, a row-based child-friendly metaphorical cuing system might use orange as the color for the Number Row; yellow for the color of the Top Row; green for the color of the Home Row; blue for the color of the Bottom Row; and purple for the color of the Space Bar Row. For example, see FIG. 3 which show this visual coding scheme. The symbolic objects that metaphorically correspond to this orange-yellow-green-blue-purple color coding scheme communicate the vertical relational positions of the respective rows by analogy to counterpart objects in the natural world: orange symbolizes the bright sun; yellow symbolizes a less bright, lower sun; green symbolizes the green grass of a meadow; blue symbolizes the ocean shore; and purple symbols the deep ocean. Similar to how in the QWERTY keyboard layout, the Number Row is above the Top Row is above the Home Row is above the Bottom Row is above the Space Bar Row, in the physical world, the bright sun is above a less bright sun is above a green grassy meadow is above the ocean shore which is above the deep ocean. Accordingly, the metaphorical cuing system refers to the a bright sun, a lower sun, green grass, the ocean shore, and the deep ocean to teach the vertical relationships between the orange Number Row, yellow Top Row, green Home Row, blue Bottom Row, and purple Space Bar Row. By way of further illustration, the orange-yellow-green-blue-purple color-coding scheme and the relational position of colors on the vertical axis is also found in the colors of the rainbow.

Symbol Key Association Matrix (SKAM)

Using the invention, the keyboarder learns and memorizes the Symbol-Key Association Matrix (SKAM) in a developmental sequence through game-based activities and reinforcing instruction. The game based activities maybe on line or supplied via a CD/DVD, memory stick or some other similar device. The SKAM is a two-dimensional data structure that represents the X-Y plane of the spatial organization of keys displaying symbols on the QWERTY keyboard layout. An exemplary conceptual rendering of the SKAM data structure is displayed in FIG. 23. The SKAM embodies the spatial organization and relational position of keys displaying symbols on the QWERTY keyboard layout. Accordingly, the SKAM has five rows and fourteen columns, and maybe represented like a two-dimensional array, as SKAM [5][14], whereby each value of the array conceptually maps to the symbol of keys and their relational position within the QWERTY keyboard layout. SKAM[1] is the Number Row; SKAM[2] is the Top Row; SKAM[3] is the Home Row; SKAM[4] is the Bottom Row; SKAM[5] is the Space Bar Row. The values of the symbols of left-to-right horizontally-aligned keys spatially located in the Number Row and respectively represented by SKAM[1][1-14] are {1/!, 2/@, 3/#, 4/$, 5/%, 6/A, 7/&, 8/*, 9/(, 0/), minus/underscore, equals/plus, backspace}. The values of the symbols of left-to-right horizontally-aligned keys spatially located in the Top Row and respectively represented by SKAM[2][1-14] are {tab, Q, W, E, R, T, Y, U, I, O, P, open bracket/open brace, close bracket/close brace, backslash/bar}. The values of the symbols of left-to-right horizontally-aligned keys spatially located in the Home Row and respectively represented by SKAM[3][1-13] are {caps lock, A, S, D, F, G, H, J, K, L, semicolon/colon, right quote mark/double quote mark, enter/return}. The values of the symbols of left-to-right horizontally-aligned keys spatially located in the Bottom Row and respectively represented by SKAM[4][1-12] are {left shift, Z, X, C, V, B, N, M, comma/less than, period/more than, forward slash/question mark, right shift}. The values of the symbol of the key spatially located in the Space Bar Row and respectively represented by SKAM[5][1] is {space bar}. KTMs and KTSs teach the gradual memorization and internalization of the SKAM into a keyboarder's muscle memory.

Unilateral Hand and Finger Skills

In another embodiment, there is a virtual keyboard, a physical keyboard, and an Activity Space (AS) with interactive software-implemented activities displayed on the screen of a computing device, whereby the physical keyboard is connected to the computing device, and the virtual keyboard is displayed on the screen in juxtaposition to the AS, and the SKAM of the virtual keyboard corresponds to the SKAM of the physical keyboard. For example, see FIGS. 31 and 32. Having done so, a software-implemented interactive activity displayed on the screen (1) requires the student to place both the left hand and right hand in the Home Row positions (2) causes the virtual keyboard to prompt the two-handed keyboarder to manipulate a first hand to a stationary state and press and hold down one physical key on the physical keyboard with one finger of that first hand for the duration of the activity without releasing the key (3) visually displays the pressing of this physical key on the visual rendering of the virtual key on the virtual keyboard (4) dynamically modifies the audiovisual content of the activity that is rendered in the AS to prompt the keyboarder to manipulate a second hand to a dynamic state and to press physical keys with finger movements of that other hand (5) temporarily suspending the interactivity of the activity if the keyboarder ceases to hold down the physical key with a finger of the first hand during the activity (6) requiring the keyboarder during the activity to manipulate the first hand to a stationary state and the second hand to a dynamic state or to manipulate the first hand to a dynamic state and the second hand to a stationary state, in an alternating fashion. In this way, the invention presented teaches the Home Row hand positions, relational position of symbol location in the SKAM, hand-key association, finger-key association, and the essential keystroke spectrum of Home Row positioning-based finger movements.

Dynamic Virtual Keyboard

Systems may have a software-implemented Dynamic Virtual Keyboard (DVK), a physical keyboard, and an AS with interactive software-implemented activities displayed on the screen of a computing device, whereby the physical keyboard is connected to the computing device, and the DVK is displayed on the screen in juxtaposition to the AS, and the SKAM of the DVK corresponds to the SKAM of the physical keyboard. For example, see FIG. 17 and FIGS. 31-33. The DVK structurally hexfurcates the normative QWERTY layout into row sections for the left and right hand. For example, see FIG. 11 which shows an exploded view of the hexfurcated modified QWERTY layout. Having partitioned the QWERTY layout in this manner as illustrated in FIG. 11, the present invention may dynamically and independently toggle the visibility of each row section in the DVK on the computer screen between a visible state in which the row section is shown on the DVK and a hidden state in which the row section is not shown. For example, FIG. 14A displays a permutation of the DVK in which the left portion of the Home Row is toggled to a visible state and all other row sections on the DVK are toggled to a hidden state. By way of further illustration, FIG. 14J shows a permutation f the DVK in which the right portion of the Home Row and the right portion of the Bottom Row are toggled to a visible state and all other row sections on the DVK are toggled to a hidden state. Although the figures show a specific hexfurcation of the DVK, other segregations of rows may be employed.

The DVK helps teach foundational pre-keyboarding and keyboarding skills By way of analogy, if embodiments of the DVK which visually render row-based view of the QWERTY keyboard layout are maps of the United States, embodiments of present invention function like a Global Positioning System (GPS) that instructs the keyboarder how to position their hands in the Home Row position, how to locate the relational position of symbols, how to build hand-key association, and how to move fingers, symbol by symbol, row subsection by row subsection, row by row, or in the U.S. map metaphor, state by state, region by region, and so on. By partitioning in rows and manipulating the fundamental organization of keys displaying symbols on the QWERTY keyboard layout, the DVK enables the systems and methods of the present invention to teach symbol location and finger movement vis-à-vis the SKAM gradually, developmentally, unit by unit, rather than as a monolithic entity.

The DVK is dynamic because its visual rendering of the partitioned QWERTY keyboard layout vis-a-vis SKAM[1-5] on the screen is dynamically modified during the course of interactive activities by toggling the visibility one or more color-coded row sections of the Number Row, Top Row, Home Row, Bottom Row, and Space Bar Row between a visible state or hidden state. For example, see FIGS. 14A-14O and 15A-15H which show an exemplary set of permutations of the DVK wherein the visual rendering of the DVK has been dynamically modified in this manner. This capability of the DVK that developmentally toggles the visibility of row sections in a particular teaching order applies principles of visual figure-ground segregation to simplify visual discrimination and conceptual grouping of the relational position of the plurality of keys displaying symbols in the SKAM.

In particular, the following rows are bifurcated into a left and right subsection to build hand-key association in QWERTY keyboarding form: Top Row, Home Row, Bottom Row. The following three row-based subsections are associated with Home Row positioning-based finger movements of the left hand: the Q, W, E, R, and T keys (SKAM[2][2-6]) comprise the left-hand section of the Top Row; the A, S, D, F, and G keys (SKAM[3][2-6]) comprise the left-hand section of the Home Row; the Z, X, C, V, and B keys (SKAM[4][2-6]) comprise the left-hand section of the Bottom Row. For example, see FIGS. 14A, 14C, 14E, 14G, 14I, and 14K. The following three row sections are associated with Home Row positioning-based finger movements of the right hand: the Y, U, I, O, and P keys (SKAM[2][7-11]) comprise the right-hand section of the Top Row; the H, J, K, L, and semicolon/colon keys (SKAM[3][7-11]) comprise the right-hand section of the Home Row; the N, M, and space bar keys (SKAM[4][7-8], SKAM[5][1]) comprise the right-hand section of the Bottom Row. See FIGS. 14B, 14D, 14F, 14H, 14J, and 14L. When a row-based subsection of the Top Row, Home Row, or Bottom Row is visually rendered on the screen, this row-based subsection is active. See FIGS. 14A-14O and FIGS. 15A-15H.

The DVK may display one or more of any of the set of six row-based subsections for the left and right hand at a given time in an activity. See FIG. 11 to for an illustration of an exploded view of these six row-based subsections 2-7.

By toggling the visual rendering attributes of individual row sections for the left and right hand between a visible state and an hidden state, the DVK's dynamic modification of the QWERTY layout as implemented through the present invention is able to teach a keyboarder the spatial organization and relational position of keys displaying symbols in small units that build up to the whole QWERTY layout. The DVK's hexfurcation of the QWERTY layout and dynamic toggling of its row sections in a developmental sequence enables visual chunking that obviates the need to teach the entire QWERTY keyboard layout all at once through a curriculum. In other words, the DVK's structural breakdown of the Top Row, Home Row, and Bottom Row enables a keyboarder to learn the SKAM unit by unit in a developmental sequence. Additionally, the DVK's structural breakdown also enables a keyboarder to learn the keystrokes from the keystroke spectrum of Home Row positioning-based finger movements that pertain only to the plurality of keys displayed by the active row at a particular time. In this way, the systems and methods developmentally teach the Home Row hand positions, relational position of symbol location in the SKAM, hand-key association, finger-key association, and the essential keystroke spectrum of Home Row positioning-based finger movements, unit by unit, by limiting learning objectives to only the symbols visible in the active rows and keystrokes required to press the keys displaying those symbols.

Row-Based Progression

Systems of the invention manipulate the visibility of row sections of the DVK to cycle through a specific progression of row sections implemented in a curriculum of activities. For example, see FIG. 22, which shows an exemplary progression. In such a curriculum and curriculum progression, when one or more row sections are visible in the DVK during one stage of the progression, only symbols and keystrokes for those row sections are tested by the interactive activities in the activity space. In the next stage of the progression, the row sections that are visible in the DVK changes, and accordingly, only symbols and keystrokes for those row sections are tested. This pattern is repeated throughout the progression in the curriculum.

Thirteen Step Row-Based Progression

In systems of the invention, the following sequential thirteen step row section-based progression is implemented in a pre-keyboarding or keyboarding curriculum that includes a plurality of activities. See FIG. 22 for a flow chart of the thirteen steps that show different sections of the QWERTY layout, visualized in the SKAM in FIG. 23. The thirteen steps of the progression are: (1) the left-handed row-based subsection of the Home Row displaying the A, S, D, F, and G keys (SKAM[3][2-6]); (2) the right handed row-based subsection of the Home Row displaying the H, J, K, L, and semicolon/colon keys (SKAM[3][7-11]); (3) the left handed row-based subsection of the Top Row displaying the Q, W, E, R, and T keys (SKAM[2][2-6]); (4) the right handed row-based subsection of the Top Row displaying the Y, U, I, O, and P keys (SKAM[2][7-11]); (5) the left-handed row-based subsection of the Bottom Row displaying the Z, X, C, V, and B keys (SKAM[4][2-6]); (6) the right-handed row-based subsection of the Bottom Row displaying the N and M keys and the space bar key of the Space Bar Row (SKAM[4][7-8], SKAM[5][1])); (7) the left-handed row-based subsections of the Home Row and Top Row (SKAM [2,3][2-6]); (8) the right-handed row-based subsections of the Home Row and Top Row (SKAM[2,3][7-11]); (9) the left-handed row-based subsections of the Home Row and Bottom Row (SKAM[3,4][2-6]); (10) the right-handed row-based subsections of the Home Row and Bottom Row (SKAM[3][7-11], SKAM[4][7-8], SKAM[5][1]); (11) the left-handed row-based subsections of the Top Row and Home Row and Bottom Row (SKAM[2-4][2-6]); (12) the right-handed row-based subsections of the Top Row and Home Row and Bottom Row (SKAM[2-3][7-11], SKAM [4][7-8], SKAM[5][1]); (13) the left-handed and right-handed row-based subsections of the Top Row and Home Row and Bottom Row (SKAM[2-4][2-6], SKAM[2-3][7-11], SKAM[4][7-8], SKAM[5][1]). During each of the thirteen steps, activities in the Activity Space teach and test only the Home Row hand positions, symbol locations, and Home Row positioning-based finger movements for the keys and symbols in that steps active row-based subsection and its relevant visible section of the SKAM.

Dynamic Virtual Keyboard and Dynamic Cursor

There is provided a DVK, a physical keyboard, a dynamic cursor, and an AS with interactive software-implemented activities displayed on the screen of a computing device. The dynamic cursor is displayed in the AS, the DVK is displayed on the screen in juxtaposition to the AS, and the SKAM of the DVK corresponds to the SKAM of the physical keyboard. The dynamic cursor performs a three-stage real-time check of each keystroke for accurate keyboarding: (1) before a key is pressed (2) when the correct key is being pressed (3) when the incorrect key is pressed. These three stages correspond with the "Cue to Type," "Typed Correctly," and "Typed Incorrectly" categories shown in the chart in FIG. 16. Reinforcing pre-keyboarding and keyboarding instruction using the DVK, the dynamic cursor provides visual cues like color to aid the keyboarder to keyboard accurately, and press the correct key displaying the target symbol. If the incorrect key is pressed during an interactive activity, the dynamic cursor does not permit the keyboarder to advance to the next symbol. For example, an activity in the AS displays a target symbol and subsequently prompts the keyboarder to press a target key on the physical keyboard displaying the target symbol, whereby the target symbol is located on a key in an active row in the DVK.

The dynamic cursor aids the keyboarder to locate the key displaying this symbol in the SKAM of the DVK and physical keyboard with the correct hand and correct finger by visually rendering in the AS in the visual indicator of the row of the target key in the DVK. The visual indicator of the dynamic cursor may be the same as the visual indicator of the row of the target key in the DVK. The keyboarder's performance of a visual indicator-comparison between the visual indicator of the Home Row and the visual indicator of the row of the target key or dynamic cursor determines the vertical directionality of Home Row positioning-based finger movements to key the target key.

By way of illustration, if the Home Row is green, the Top Row is yellow, and the dynamic cursor is yellow, since the Top Row is positioned above the Home Row, the keyboarder's color comparison and subsequent determination that yellow is not green by extension determines that the next finger movement to strike the target key will be vertically up from the Home Row. See, for example, FIG. 44, which shows the dynamic cursor in yellow in the activity space and the Home Row in green on the dynamic virtual keyboard. Alternatively, if the Home Row is green, the Bottom Row is blue, and the dynamic cursor is blue, since the Bottom Row is positioned below the Home Row, the keyboarder's determination that blue is not green by extension determines the next finger movement to key the target key will be vertically down from the Home Row. Alternatively, if the Home Row and the dynamic cursor are green, the keyboarder's determination that the Home Row and dynamic cursor are the same color by extension determines the next finger movement to key the target key will not involve vertical finger movement.

See FIGS. 1-10 which show varying embodiments of the QWERTY layout on the DVK where the student's color comparison analysis determines the vertical directionality of finger movement. See also FIG. 21 which isolates a vertical slice of a QWERTY layout to demonstrate that a column-based approach that paints a column of keys in one color can not cue movement up or down from the middle key because there is no change in color, and accordingly, a student is occluded from performing a color comparison to determine the directionality of finger movement. In contrast, as FIG. 21 shows in the yellow-green-blow column of keys that form part of a row-based color coding scheme as illustrated in FIGS. 1-10, such a color comparison to determine the vertical directionality of finger movement is available to the student.

The dynamic cursor's form and display of visual indicators that aid symbol location and finger movement on the QWERTY keyboard layout of a physical keyboard may cyclically iterate through six different versions in a developmental sequence. For example, see the chart in FIG. 16.

In a first version, the dynamic cursor's form in dynamic cursors 1, 7, and 8 is the shape of a colored virtual key in the DVK, which in addition to using color to aid symbol location and finger movement, reinforces symbol-key association and finger-key association. The dynamic cursor's form (1, 7, 13) in the first version is outlined in the target key's row color but unshaded before the target key is pressed (1); if the target key is correctly pressed, the dynamic cursor (7) is shaded in the target key's row color, and the dynamic cursor advances horizontally in the AS to the next symbols to be keyed; if a key other than the target key is pressed, the dynamic cursor is shaded in the color red (13) and the dynamic cursor does not advance to the next symbol to be keyed.

In a second version as shown in FIG. 16, the dynamic cursor's form (2, 8, 14) is the shape of a colored letter box. The dynamic cursor in the second version is lightly shaded in the target key's row color before the target key is pressed (2); if the target key is correctly pressed, the dynamic cursor is darkly shaded in the target key's row color, and the dynamic cursor advances horizontally in the AS to the next symbol to be keyed (8); if a key other than the target key is pressed, the dynamic cursor is shaded in the color red and the dynamic cursor does not advance to the next symbol to be keyed (14).

In a third version, the dynamic cursor's form (3, 9, 14) is the shape of a vertical colored line. The dynamic cursor in the third version is colored in the target key's row color before the target key is pressed (3); if the target key is correctly pressed, the dynamic cursor advances horizontally in the AS to the next symbol to be keyed and displays the row color of that symbol's key (9); if a key other than the target key is pressed, the dynamic cursor is colored red and the dynamic cursor does not advance to the next symbol to be keyed (14).

In a fourth version, the dynamic cursor's form (4, 10, 16) is the shape of a horizontal colored line. The dynamic cursor in the fourth version is colored in the target key's row color before the target key is pressed (4); if the target key is correctly pressed, the dynamic cursor advances horizontally in the AS to the next symbol to be keyed and displays the row color of that symbol's key (10); if a key other than the target key is pressed, the dynamic cursor is colored red and the dynamic cursor does not advance to the next symbol to be keyed (16).

In a fifth version, the dynamic cursor form (5, 11, 17) is the shape of a vertical black line. The dynamic cursor in the fifth version is colored black before the target key is pressed (5); if the target key is correctly pressed, the dynamic cursor remains black and advances horizontally in the AS to the next symbol to be keyed (11); if a key other than the target key is pressed, the dynamic cursor is colored red and the dynamic cursor does not advance to the next symbol to be keyed. (17)

In a sixth version, the dynamic cursor's form (6, 12, 18) is the shape of a horizontal black line. The dynamic cursor in the sixth version is colored black before the target key is pressed (6); if the target key is correctly pressed, the dynamic cursor remains black and advances horizontally in the AS to the next symbol to be keyed (12); if a key other than the target key is pressed, the dynamic cursor is colored red and the dynamic cursor does not advance to the next symbol to be keyed (18).

Adaptable QWERTY Layout

The virtual keyboard or DVK can display an adaptable QWERTY layout in which the general structure and spatial organization of the keys displaying symbols is generally unmodified, but specific keys displaying specific symbols may be omitted from a particular row or the shape and size of the key may be modified. A curriculum that teaches pre-keyboarding and keyboarding may developmentally adapt a QWERTY layout in this developmental manner in order to simplify learning objectives by minimizing the keys displaying symbols a particular student may need to learn at a particular grade-level or age. For example, in one variation of an adaptable QWERTY layout, FIG. 1 excludes the entirety of the Number Row and several punctuation keys, including the omission of the semicolon/colon key in the Home Row. In another variation of an adaptable QWERTY layout, FIG. 4 modifies the shape of the enter key to be smaller than its normal size and omits the text "Enter" from the symbol that displays on the key. In another variation of an adaptable QWERTY layout, FIG. 5 omits the enter key all together, replacing it with the apostrophe/double quotation key.

Color Comparison, Symbol Comparison, and Finger Selection

The row-based visual coding scheme in which each of the QWERTY keyboard layout's rows is uniquely identifiable by a color or other visual indicator, uses color or other visual indicator to simplify the teaching of hand selection and finger selection logic implicit in Home Row positioning-based finger movements in the essential keystroke spectrum to the two-handed keyboarder.

With regard to determining the vertical directionality of Home Row positioning-based finger movements, once the keyboarder's fingers of the left and right hand are in the Home Row position, and once the keyboarder has observed the color of the Home Row and the color of the row of the target key on a row-based QWERTY layout, the keyboarder may perform a color comparison between the two colors to determine whether a keyboarder must move a finger up or down from the Home Row if the colors are different. See FIG. 21 for a conceptual illustration that shows how color-comparison analysis capable of determining the vertical directionality of finger movement is available on a visual row-based coding scheme and not on a visual column-based coding scheme.

With regard to determining hand selection and finger selection in keyboarding, the keyboarder may engage in a horizontal sorting process by performing a symbol comparison in each row to match the symbol displayed on the target key with the relational position of that symbol in the SKAM of the DVK and the physical keyboard. As part of this horizontal sorting process of symbol comparison within one row, the keyboarder, with the left and right hand already in the Home Row position, can now naturally select the finger that is horizontally the most proximate to the target key displaying the target symbol. It is the combination of color comparison between the Home Row' color and color of the target key's row which determines the vertical directionality of Home Row positioning-based finger movement, and the symbol comparison between the target symbol and set of symbols in each row which determines hand selection and finger selection, that enable a keyboarder to build the foundational skills of: hand-key association, finger-key association, symbol-key association, and memorization of the relational positions of keys displaying symbols in the SKAM. It is to be understood that other visual indicators of color or other than color could be employed.

A system includes a computing device with a physical keyboard, an interactive activity, and a virtual keyboard. FIG. 31 shows an exemplary illustration of a laptop computer with a physical keyboard, a virtual keyboard 3 and an interactive activity displayed on the laptop's display screen in activity space 2. FIGS. 1-10 display variations of the virtual keyboard. In this system, the interactive activity prompts a student to press a particular key displaying a particular symbol on the physical keyboard. The spatial organization of keys displaying symbols on the virtual keyboard matches that of the physical keyboard, and in certain embodiments will comprise variations of the SKAM that retain the general organization and structure of the QWERTY layout. To assist the student to learn the relational position of that symbol on the physical keyboard as well as the proper hand selection and finger movement to press that key, the visual coding scheme of the virtual keyboard helps to the student to associate the relational position of a virtual key on the virtual keyboard with the relational position of the corresponding physical key on the physical keyboard. As students complete multiple interactive activities in a curriculum, they learn foundational keyboarding skills A symbol includes the set of glyphs displayed on a QWERTY layout, including the glyphs that comprise the Number Keys, Alphabetic Keys, Punctuation Keys, Action Keys, and the Space Bar.

A system may include a computing device with a physical keyboard, an interactive activity, a virtual keyboard, and a teaching order. The teaching order in which symbol location, hand-key association, finger-key association, and finger movements are taught follows a cyclical row-based sequence in the curriculum progression of interactive activities. The system partitions the rows of the QWERTY layout into row sections, and subsequently teaches that plurality of row sections in a particular order over the course of multiple interactive activities in a curriculum. When the system teaches one or more row sections at a particular time during one interactive activity, only the symbols from those row sections are tested in the interactive activity that appears in the activity space. For example, see FIG. 22 depicting a thirteen step row-progression. Here, in the first step 1 of the thirteen step progression, the interactivity activity tests and teaches the symbol locations and finger movements for only the A, S, D, F, and G keys. When the curriculum progression advances from first step 1 to second step 2, the interactive activity tests and teaches the symbol locations and finger movements for only the H, J, K, and L keys. The array of symbols such a curriculum progression teaches is contingent on the variation of the adaptable QWERTY layout that is rendered in the virtual keyboard, as only the keys visible on the virtual keyboard are taught.

Once a student has been provided a computing device with a physical keyboard and display screen that shows a virtual keyboard and an activity space with an interactive activity, the interactive activity may show a target symbol which prompts the student to locate and press that target symbol on the physical keyboard. In this process, the student learns to associate the visual indicators for the virtual key displaying that target symbol on the virtual keyboard with the relational position of the physical key displaying that target symbol on the physical keyboard. By way of illustration, FIG. 31 shows a frame from an interactive activity in which the student is prompted with the lowercase letter of D as a target symbol, at the beginning of the letter combination "dr." The visual indicator for lowercase D is green because the Home Row of the virtual keyboard is green and the D key is in the Home Row. The method teaches the student to associate the visual indicators for the relational position of the D key on the virtual keyboard with the corresponding physical key on the physical keyboard. Once the student presses the D key, the target symbol changes to the R key, and again the D key, and then the R key, until the student has typed the letter combination "dr" twice. The method's reinforcing instruction aids a student's learning of the relational position of and finger movements required to press the D key and R key.

Once a student has been provided a computing device with a physical keyboard and display screen that shows a virtual keyboard and an activity space with an interactive activity, an interactive activity may show a target symbol which prompts the student to locate and press that target symbol on the physical keyboard, and also a painted finger. For example, in FIG. 38, target symbol 3 and painted finger 2 use visual indicators consistent with the coding scheme of dynamic virtual keyboard 1 to help a student determine which hand and finger to use to locate and press the corresponding physical key displaying the target symbol on the physical keyboard. In this figure, the visual indicator is the color yellow. In FIG. 38, the dynamic virtual keyboard has toggled the left portions of the Top Row and Home Row in to the visible state while all other row sections are toggled to the hidden state. The target symbol is the letter E, which the interactive activity displays on a yellow key in the activity space to correspond with the yellow virtual key for the letter E in the dynamic virtual keyboard. In addition, the interactive activity displays a painted finger 2 which helps build hand-key and finger-key association, in this scenario, cuing the student to use the middle finger of the left hand to press the E key.

The system may include a computing device with a touch-sensitive display screen, an interactive activity, and a virtual keyboard. FIG. 33 shows an exemplary illustration of a computing device 1 such as a tablet or iPad®, a virtual keyboard 3 and an interactive activity displayed on the laptop's display screen in activity space 2. FIGS. 1-10 display exemplary variations of the virtual keyboard. In this system, the virtual keyboard operates as the input device that the student uses, equivalent to a physical keyboard on a laptop or desktop computer. In this system, the visible adaptability of the QWERTY layout on the tablet's or iPad®'s virtual keyboard is extricated from the fixed, non-modifiable nature of a physical keyboard's QWERTY layout, thereby enabling the system to display on the screen only the sections of the virtual keyboard that the system teaches in a particular interactive activity or curriculum progression. Moreover, the system may modify and adapt the QWERTY layout itself in a developmentally-appropriate manner to teach a student only the symbols and keys that are grade- or age-appropriate, rather than teaching that student the entire QWERTY layout without consideration of the developmental motoric and cognitive capabilities of that student. In the system, the interactive activity prompts a student to press a particular key displaying a particular target symbol on the virtual keyboard. In FIG. 33, the array of target symbols includes any character in the sentence, "I like bananas."

When using an iPad® or tablet, an external keyboard that is a physical keyboard that may be connected to computing devices with touch-sensitive display screens, which in turn sets the external keyboard as the input device for the student rather than the virtual keyboard. For example, while FIG. 33 shows an exemplary illustration of a computing device 1 such as a tablet or iPad®, a virtual keyboard 3 and an interactive activity displayed on the laptop's display screen in activity space 2, the virtual keyboard 3 would not be the input device but rather a component of the system that helps teach students foundational keyboarding skills. The inclusion of the external keyboard in this system essentially disables the touch-sensitive aspect of the computing device's display screen such that the iPad® or tablet operate similar to the screen of a desktop computer or laptop, and the external keyboard functions as a physical keyboard.

A system includes a computing device with a physical keyboard, an interactive activity, and a dynamic virtual keyboard. The interactive activity is displayed in an activity space on the display screen of the computing device which is positioned above the dynamic virtual keyboard. The dynamic virtual keyboard's partitioning of the QWERTY layout into row sections enables an interactive activity to independently toggle the visibility of those row sections in a particular teaching order so that the system only visibly shows row sections on the dynamic virtual keyboard that are being taught at a particular moment, while it hides the row sections that are not being taught. A row section is either visible or hidden. For example, FIGS. 14A-O and FIGS. 15A-H iterate through multiple permutations of different states of the dynamic virtual keyboard whereby different sets of row sections have been toggled to the visible state while other sets of row sections have been toggled to the hidden state. In exemplary variations of this system, instances of the various permutations of the virtual dynamic keyboard shown in FIGS. 14A-O and FIGS. 15A-H are shown in various permutations in FIGS. 31-45, displaying prominently only the row sections being actively taught by the interactive activity in the particular frame shown. The dynamic virtual keyboard toggles the visibility of row sections in a specific teaching order, simplifies the inherent complexity of the visual perceptual field of a QWERTY layout through the application of principles of figure-ground segregation. A student need not learn the entire QWERTY layout from the beginning, but rather only the symbols and their relational position in the row sections that the system toggles to a visible state while the others are toggled to a hidden state.

In systems and methods utilizing a touch-sensitive display screen, the computing device's touch-sensitive screen enables the dynamic virtual keyboard to function as such an input device, whereby the student presses virtual keys instead of physical keys. For example, FIG. 33 shows an activity space 2 above a virtual dynamic keyboard 3 on the touch-sensitive screen of such a computing device. The dynamic virtual keyboard's use of visual indicators to partition the QWERTY layout into row sections enables an interactive activity to independently toggle the visibility of those row sections in a particular teaching order so that the system only visibly shows row sections on the dynamic virtual keyboard that are being taught at a particular moment, while it hides the row sections that are not being taught. One example of a visual indicator is color. For example, FIGS. 1-10 use yellow as a visual indicator for the Top Row, green as a visual indicator for the Home Row, and blue as a visual indicator for the Bottom Row. A row section is either visible or hidden. For example, FIGS. 14A-O and FIGS. 15A-H iterate through multiple permutations of different states of the dynamic virtual keyboard whereby different sets of row sections have been toggled to the visible state while other sets of row sections have been toggled to the hidden state. This capability of the dynamic virtual keyboard also enables the system to teach students only the row section of the adaptable QWERTY layout that is visible in a developmentally appropriate manner, rather than teaching the entirety of the QWERTY layout to students all the time without consideration of their age, grade level, or motoric and cognitive capabilities.

Systems and methods described herein may include an adaptable QWERTY layout that allows for the toggling of the visibility of row sections such that not all row sections of the dynamic virtual keyboard are visible, allows for the omission of particular keys displaying symbols on specific rows from the visual rendering, or the modification of key shape from a square to another form. For example, FIGS. 14A-14O show an different variations of the adaptable QWERTY layout through the varied toggling of row sections between a visible state and a hidden state. FIG. 1 shows an exemplary adaptable QWERTY layout in which the Number Row and multiple Punctuation Keys have been omitted from the visible rendering of the dynamic virtual keyboard. FIG. 2 shows an exemplary adaptable QWERTY layout in which the key shapes of the A, S, D, F, J, K, and L keys in the Home Row have been visually modified to resemble a house. FIG. 5 shows an exemplary adaptable QWERTY layout in which the enter key has been omitted from the Home Row.

Systems and methods described herein may comprise a dynamic cursor. A dynamic cursor means the cursor's form and visual clue changes depending on the activity and/or level or less in the curriculum. For example, the visual clue of the dynamic cursor matches the visual indicator of the virtual key of the target symbol as defined by the coding scheme of the virtual keyboard. Student learns to associate the visual clue and visual indicator with the relational position of that target symbol's corresponding physical key on the physical keyboard, and by extension develop the hand-key and finger-key association habits that comport with proper QWERTY keyboarding form. Exemplary dynamic cursor variations of visual clues in key shape are shown in FIG. 16. These visual clues will match the set of visual indicators that comprise the coding scheme of a virtual keyboard, exemplary illustrations of which are shown in FIGS. 1-10, each row is marked with a unique color. For example, FIG. 53 shows that the visual indicator 1 of the virtual key for the letter P is yellow because the Top Row is yellow in the coding scheme of the virtual keyboard. Also, FIG. 53 shows the visual clue 2 of the dynamic cursor is yellow, matching visual indicator 1. Together, visual indicator 1 and visual clue 2 help the student determine the relational position of and finger movements to press the corresponding physical key displaying the letter P on the physical keyboard. Additionally, while the shape of the dynamic cursor that display visual clue 2, is in the letter box form, the dynamic cursor may render the visual clue in anyone of its six forms illustrated in the flow chart in FIG. 16. If the student presses the correct physical key for the target symbol, the interactive activity advances the dynamic cursor to the next target symbol and sets the visual clue to the visual indicator for that target symbol's virtual key within the coding scheme of the virtual keyboard. Alternatively, if the student presses the incorrect physical key, then the dynamic cursor sets its visual clue to red and does not advance to the next target symbol. This functionality of the dynamic cursor that indicates correct or incorrect keyboarding by the student is illustrated in FIGS. 25-30.

The dynamic cursor may be employed in systems and methods involving a computing device with a touch-sensitive display screen.

In adaptable QWERTY layouts in methods and systems of the invention, the key shape of seven to eight virtual keys of the Home Row of the virtual keyboard are designed to resemble a house. For example, FIG. 2 shows the key shapes of the A, S, D, F, J, K, and L keys located in the Home Row to each resemble a house. Additionally, for example, FIG. 3 shows the key shapes of the A, S, D, F, J, K, L, and semicolon/colon keys to each resemble a house. These particular keys in the Home Row anchor the Home Row hand positions for the left and right hand, and their visual modification to each resemble a house simplifies visual discrimination of these keys while also enabling metaphorical cuing by referring to the house-shaped keys as the Home Row keys or keys in the Home Row. For example, in other embodiments the house shape of the Home Row keys may resemble any other house or dwelling structure, such as, but not limited to, a pagoda roof in Japanese or a thatched but roof as in rural or village community dwellings founding in areas of the Developing World.

Using systems of the invention having a dynamic virtual keyboard, methods teach students unilateral hand and finger skills by requiring the student to press and hold one physical key in a pressed state using one finger of one hand, and while the student holds that physical key down, the interactive activity prompts the student to keyboard with the other hand. In this regard, the hand of the finger pressing and holding a physical key down is in a stationary state, while the other hand that is keyboarding with one or more fingers is in a dynamic state. Teaching unilateral hand and finger skills where the student keyboards with the fingers of either the left or right hand but not both, precedes the stage of bilateral integration of Home Row positioning-based finger movements whereby the student keyboards with the left and right hand. For example, FIG. 39 shows a frame in which the student uses the pointer finger of the left hand to hold down the green circle 1, while the student keyboards with one or more fingers of the right hand. In the particular frame shown in FIG. 39, the student is prompted to press the target symbol 3 positioned on the K key of the Home Row of the virtual keyboard 4, additionally cued by the painted finger 2 which informs the student that the correct finger to select to press the K key is the middle finger of the right hand. The student subsequently learns to associate the relational position of the K key on the virtual keyboard with the corresponding physical key. In another example, FIG. 41 display a target symbol 1 over the J key in the Home Row of the virtual keyboard 2, and cues the student to press and hold this key down with the pointer finger of the right hand. While the student holds down the target symbol, the interactive activity will prompt the student to keyboard with one or more fingers of the left hand to press the corresponding physical keys of the virtual keys displayed in the two visible row sections, being the left portions of the Top Row 3 and Home Row 4. During this sequence, the student's right hand remains in a stationary state and the left hand is in a dynamic state. Accordingly in this exemplary frame of the interactive activity, the student may be prompted to press the corresponding physical keys for any of the following symbols contained in the visible sections of the Top Row and Home Row: Q, W, E, R, T, A, S, D, and F. By engaging the student in this manner, the method also teaches the relational positions and finger movements associated with only symbols in visible row sections, developmentally, and bit by bit, rather than all at once through one non-adaptable, non-modifiable QWERTY layout.

Each virtual key of the dynamic virtual keyboard or virtual keyboard has a shape attribute that can change. For example, the shape attribute is capable of manipulation between a child-friendly state and a square state and any stage or shape in between. For example, see the key shape in FIG. 1 for a visual rendering of an exemplary child-friendly key and the key shape in FIG. 7 for a visual rendering of an exemplary square shape key.

The dynamic virtual keyboard or virtual keyboard has a plurality of virtual keys with a spatial organization. Each virtual key further comprises a size attribute. The DVK or virtual keyboard has a coding scheme that is comprised of a plurality of visual indicators that visually partitions the spatial organization into one virtual column having a plurality of virtual rows. Each visual indicator uniquely identifies one virtual row, and every virtual key in each virtual row is additionally marked by a unique symbol. The plurality of virtual rows comprise a Top Row and a Home Row and a Bottom Row and a Space Bar Row. An adaptable QWERTY layout may be manipulated from one state to another state. For example, states may comprise: (1) a first QWERTY layout wherein the Top Row does not visually display punctuation keys, wherein the Home Row does not visually display punctuation keys, wherein the Bottom Row does not display virtual keys display the comma/less than symbol and period/greater than symbol, wherein the size attribute of the virtual keys displaying the tab symbol and backspace symbol in the Top Row is small, and wherein the size attribute of the virtual key displaying the enter symbol in the Home Row is small; (2) a second QWERTY layout comprising the first QWERTY layout, wherein each of the virtual keys in the Home Row that display A, S, D, F, J, K, and L are depicted as a house structure; (3) a third QWERTY layout comprising the first QWERTY layout, wherein the shape attribute of the virtual key in the Home Row displaying the enter symbol is small, and wherein said plurality of virtual keys in the Home Row comprises a virtual key that displays the semicolon/colon symbol; (4) a fourth QWERTY layout comprising the third QWERTY layout, wherein said plurality of virtual keys in the Home Row further comprises a virtual key that displays the apostrophe/double quotation symbol and does not comprise a virtual key displaying the enter symbol.

The various aspects and embodiments of the inventions herein having been thus described and summarized, the inventions thereof will now be described in detail with reference to various drawings. These preferred embodiments are illustrative and exemplary. These inventions are disclosed in sufficient detail to enable those skilled in the art to practice the invention. However, embodiments may be implemented in many different forms and should not be construed as limiting to the embodiments set forth herein. The following detailed description of the drawing figures is, therefore, not to be taken in a limiting sense.

We claim:

1. A computer-implemented system for teaching a user keyboarding, said system comprising:
   a keyboard, wherein the keyboard includes a plurality of rows of keys selectable by a user and wherein the keyboard provides an indication of the user-selected keys to the computing device;
   a computing device having a display screen, the computing device and connected to the keyboard, wherein said display screen has an interactive activity space, and wherein said computing device is configured to:
      display a visual user prompt in the interactive activity space;
      display a virtual keyboard displayed on the display screen, the virtual keyboard including a configurable coding scheme and a plurality of virtual keys having spatial organization, wherein said coding scheme is comprised of a plurality of unique visual indicators that visually partitions said spatial organization into a plurality of virtual rows, wherein each visual indicator uniquely identifies one virtual row, and wherein every virtual key in each virtual row is additionally marked by a unique symbol;
      display a target symbol in said interactive activity space that is related to the visual indicators included on the virtual keyboard and the visual user prompt, the target symbol and visual user prompt cuing the user to press a key on the keyboard contain the same symbol as the displayed target symbol;
      receive an indication of a user input including information regarding which key the user has pressed and alter the visual user prompt in the display screen after comparing if the target symbol matches with the pressed key; and
      receive indications of additional keys pressed by the user in response to the altered interactive activity space, wherein the computer system's alteration of the interactive activity space is presented to prompt the user to select keys based on a plurality of visual indicators and to associate the location of the symbol on the virtual keyboard with the location of said symbol's key on the keyboard.

2. The system of claim 1, wherein the computing device is further configured to:
   provide a row-based curriculum progression having a plurality of row section arrangements, wherein each row section represents a left or right portion of a virtual row with a visibility attribute, wherein each row section arrangement sets the visibility attribute of every left and right portion of each virtual row to either a visible state that displays the row section on the virtual keyboard or to a hidden states that does not display the row section on the virtual keyboard;
   sequence the display of a plurality of visual user prompts that comprise the interactive activity in the interactive activity space into a chronological visual user prompt progression that is correlated with the row-based curriculum progression, wherein each visual user prompt displays at least one target symbol;
   iterate through the chronological visual user prompt progression, wherein the computer system displays each visual user prompt and receives cued user input including information that compares if each key pressed by the user on the keyboard accurately corresponds with each target symbol displayed in each visual user prompt;
   modify the display of the virtual keyboard to correspond with each visual user prompt in the visual user prompt progression, wherein if a specific visual user prompt cues the user to press after locating symbols on the keys in a particular row section, then the computer system sets the visibility attribute of that row section to the visible state and wherein if a specific visual user prompt is not cuing the user to press after locating symbols on the keys in a particular row section then the computer system sets the visibility attribute of that row section to a hidden state, and wherein the virtual keyboard displays every row section that is set to the visible state in the display screen and does not display every row section that is manipulated to the hidden state in the display screen.

3. The system of claim 2, wherein the computing device is further configured to provide that said plurality of row sections comprises six row sections, wherein a first row section is a left portion of a Top Row, wherein a second row section is a right portion of a Top Row, wherein a third row section is a left portion of a Home Row, wherein a fourth row section is a right portion of a Home Row, wherein a fifth row section is a left portion of a Bottom Row, wherein a sixth row section is a right portion of a Bottom Row, and provide that said row-based curriculum progression cyclically iterates through the following thirteen stages:
   a. in a first stage, only the visibility attribute of the third row section of the virtual keyboard is set to the visible state;
   b. in a second stage, only visibility attribute of the the fourth row section is set to the visible state;
   c. in a third stage, only the visibility attribute of the first row section is set to the visible state;
   d. in a fourth stage, only the visibility attribute of the second row section is set to the visible state;
   e. in a fifth stage, only the visibility attribute of the fifth row section is set to the visible state;
   f. in a sixth stage, only the visibility attribute of the sixth row section is set to the visible state;
   g. in a seventh stage, only the visibility attributes of the first and third row sections are set to the visible state;
   h. in an eight stage, only the visibility attributes of the second and fourth row sections are set to the visible state;
   i. in a ninth stage, only the visibility attributes of the third and fifth row sections are set to the visible state;
   j. in a tenth stage, only the visibility attributes of the fourth and sixth row sections are set to the visible state;
   k. in an eleventh stage, only the visibility attributes of the first and third and fifth row sections are being taught set to the visible state;
   l. in a twelfth stage, only the visibility attributes of the second and fourth and sixth row sections are set to the visible state;
   m. in a thirteenth stage, the visibility attributes of all six row sections are set to the visible state.

4. The computer-implemented system of claim 1, wherein said computing device is further configured to:
   display a Home Row on the virtual keyboard, wherein said Home Row is comprised of a plurality of virtual keys in one virtual row of the virtual keyboard, wherein the Home Row virtual keys display a Home Row symbols A, S, D, F, J, K, and L, wherein each Home Row virtual key displays exactly one symbol and is visually designed to resemble a house;
assign the value of the target symbol as a Home Row symbol
configure the visual user prompt in the interactive activity space to cue the user to identify the visual indicator of the target symbol and then locate and press the corresponding physical key displaying that same target symbol on the physical keyboard;
receive an indication of a user input including information regarding which physical key the user has pressed; the computer system, in response to the received user input, alters the visual user prompt after comparing if the target symbol matches the pressed physical key.

5. The system of claim 1, wherein the keyboard is a physical keyboard.

6. The system of claim 1, wherein the display screen is a touch sensitive display screen, and wherein the keyboard is the virtual keyboard.

7. The computer-implemented system of claim 1, wherein the virtual keyboard is a dynamic virtual keyboard, and wherein every virtual key in each virtual row is additionally marked by a unique symbol, wherein each virtual row has a left portion and a right portion, wherein said left portion and right portion each have a visibility attribute that can be independently toggled between a visible state in which the portion is visible on the dynamic virtual keyboard and a hidden state in which the portion is hidden on the dynamic virtual keyboard, and wherein the visibility attribute of at least one left or right portion of at least one virtual row is in the visible state.

8. The system of claim 7, said system further comprising the configuration of said plurality of unique symbols displayed on the plurality of virtual keys to display to have a spatial organization on the dynamic virtual keyboard that matches the spatial organization of corresponding symbols on the keys of a keyboard with a QWERTY layout.

9. The computer-implemented system of claim 1, wherein the computing device is further configured to:
display a dynamic cursor in the interactive activity space that has a shape attribute and a visual clue state, wherein the dynamic cursor is related to the visual user prompt and displays a visual clue, wherein said visual clue may be manipulated from one state to any one of three distinct states selected from the group consisting of:
a first visual clue, wherein said first visual clue is the visual indicator of the virtual key displaying the target symbol before the user presses the physical key displaying said target symbol;
a second visual clue, wherein said second visual clue indicates that the user pressed a physical key that does not display said target symbol;
a third visual clue, wherein said third visual clue indicates that user pressed the physical key displaying said target symbol;
display a target symbol in the interactive activity space that is related to the first visual cue and the visual user prompt and the visual indicator of the virtual row of the virtual key displaying the target symbol, the target symbol and the first visual cue and visual indicator cuing the user to locate the virtual row of the virtual keys and then press the corresponding key on the keyboard containing the same symbol as the displayed target symbol;
receive an indication of a user input including information regarding which key the user has pressed, calculate the horizontal position of the dynamic cursor and alter the state of the visual clue of the dynamic cursor from the first visual clue to either the second visual clue or third visual clue in the display screen after comparing if the target symbol matches with the symbol displayed on the pressed key;
move the dynamic cursor to the updated calculated horizontal position on the display screen and display the updated visual clue state of the dynamic cursor;
prompt the user to receive the updated calculated horizontal position and visual clue state of the dynamic cursor on the display screen as visual information that indicates the presence or absence of a match between the target symbol and the pressed key.

10. A method for teaching a user keyboarding, said method comprising the steps of:
providing a computing device including a display screen;
providing a keyboard connected to the computing device, the keyboard including a plurality of rows of keys selectable by a user and providing an indication of the user-selected keys to the computing device;
providing, by the computing device, a virtual keyboard displayed on the display screen, the virtual keyboard including a configurable coding scheme and a plurality of virtual keys having spatial organization, wherein said coding scheme is comprised of a plurality of unique visual indicators that visually partitions said spatial organization into a plurality of virtual rows, wherein each visual indicator uniquely identifies one virtual row, and wherein every virtual key in each virtual row is additionally marked by a unique symbol;
providing an interactive activity space on the display screen in an area separate from the virtual keyboard;
providing an interactive activity comprised of a series of visual user prompts in the interactive activity space;
displaying a visual user prompt in the interactive activity space;
displaying a target symbol in the interactive activity space that is related to the visual indicators included on the virtual keyboard and the visual user prompt, the target symbol and visual user prompt cuing the user to press a key on the keyboard containing the same symbol as the displayed target symbol;
receiving an indication of a user input including information regarding which key the user has pressed; the computer system, in response to the received user input, alters the visual user prompt in the display screen after comparing if the target symbol matches with the pressed key;
receiving indications of additional keys pressed by the user in response to the altered interactive display space, wherein the computer system's alteration of the interactive activity space is presented to prompt the user to select keys based on a plurality of visual indicators and to associate the location of the symbol on the virtual keyboard with the location of said symbol's key on the keyboard.

11. The method of claim 10, further comprising the steps of:
displaying a hand image of a left hand or right hand in the interactive activity space that is related to the visual indicators included on the virtual keyboard and the visual user prompt and the target symbol, wherein one pressing finger of the hand image is marked with the unique visual indicator of the virtual row of said symbol, the target symbol and visual user prompt and hand image cuing the user to select the user's finger on the hand that matches the pressing finger displayed in the hand image and then use that selected finger to press a key on the keyboard containing the same symbol as the displayed target symbol.

12. The method of claim 10, wherein the keyboard is a physical keyboard.

13. The method of claim 10, wherein the display screen is a touch sensitive display screen, and wherein the keyboard is the virtual keyboard.

14. The method of claim 10 wherein the plurality of unique visual indicators that each identify a different virtual row on the virtual keyboard is a plurality of unique colors, and wherein every virtual key in each virtual row is the same color.

15. The method for teaching a user keyboarding of claim 10, wherein the virtual keyboard is a dynamic virtual keyboard, and wherein every virtual key in each virtual row is additionally marked by a unique symbol, wherein each virtual row has a left portion and a right portion, wherein said left portion and right portion each have a visibility attribute that can be independently toggled between a visible state in which the portion is visible on the dynamic virtual keyboard and a hidden state in which the portion is hidden on the dynamic virtual keyboard, and wherein the visibility attribute of at least one left or right portion of at least one virtual row is in the visible state.

16. The method of claim 10, said method further comprising the steps of:
    providing a dynamic cursor that has a shape attribute and a visual clue state, wherein the dynamic cursor displays a visual clue in said interactive activity space, wherein said visual clue is manipulated from one state to any one of three distinct states selected from the group consisting of:
        a first visual clue, wherein said first visual clue is the visual indicator of the virtual key displaying the target symbol before the user presses the key displaying said target symbol;
        a second visual clue, wherein said second visual clue indicates that the user pressed a key that does not display said target symbol;
        a third visual clue, wherein said third visual clue indicates that user pressed the key displaying said target symbol;
    configuring the dynamic cursor to display the first visual clue;
    displaying a target symbol in the interactive activity space that is related to the first visual cue and the visual user prompt and the visual indicator of the virtual row of the virtual key displaying the target symbol, the target symbol and the first visual cue and visual indicator cuing the user to locate the virtual row of the virtual keys and then press the corresponding key on the keyboard containing the same symbol as the displayed target symbol;
    receiving an indication of a user input including information regarding which key the user has pressed; the computer system, in response to the received user input, calculates the horizontal position of the dynamic cursor and alters the state of the visual clue of the dynamic cursor from the first visual clue to either the second visual clue or third visual clue in the display screen after comparing if the target symbol matches with the symbol displayed on the pressed key;
    moving the dynamic cursor to the updated calculated horizontal position on the display screen and displaying the updated visual clue state of the dynamic cursor;
    prompting the user to receive the updated calculated horizontal position and visual clue state of the dynamic cursor on the display screen as visual information that indicates the presence or absence of a match between the target symbol and the pressed key.

17. The method of claim 16, said method further comprising the steps of:
    displaying a hand image of a left hand or right hand in said interactive activity space, wherein one pressing finger of said hand image is marked with the visual indicator of the virtual row of said symbol;
    cuing the user to relate the visual indicator of the one pressing finger of said hand image to the virtual row of said symbol and then locate the key on which said symbol is displayed;
    cuing the user to press the key displaying the symbol using the user's hand and finger that correspond with the one pressing finger displayed in the hand image;
    receiving an indication of a user input including information regarding which key the user has pressed and altering the visual user prompt and visual indicator of the hand image in the display screen after comparing if the target symbol matches with the pressed key;
    receiving indications of additional keys pressed by the user in response to the altered interactive display space, wherein the computer system's alteration of the visual indicator of the hand image is presented to prompt the user to accurately select and press keys with a specific hand and specific pressing finger based on the plurality of visual indicators displayed on the hand image presented in the display screen.

18. A computer-implemented system for teaching a user keyboarding, said system comprising:
    a computing device having a touch-sensitive display screen, wherein said touch-sensitive display screen has an interactive activity space, and wherein said computing device is configured to:
    display a visual user prompt in the interactive activity space;
    provide a dynamic virtual keyboard displayed on the display screen, the dynamic virtual keyboard including a configurable coding scheme comprised of a plurality of unique visual indicators that visually partitions said spatial organization into a plurality of virtual rows and a plurality of virtual keys having spatial organization, wherein each visual indicator uniquely identifies one virtual row,
    display a target symbol in said interactive activity space that is related to the visual indicators included on the dynamic virtual keyboard and the visual user prompt, the target symbol and visual user prompt cuing the user to press a visible virtual key;
    receive an indication of a user input including information regarding which visible virtual key the user has pressed and alter the visual user prompt in the display screen after comparing if the target symbol matches with the pressed visible virtual key;
    receive indications of additional visible virtual keys pressed by the user in response to the altered interactive activity space, wherein the computer system's alteration of the interactive activity space is presented to prompt the user to select visible virtual keys based on a plurality of visual indicators and to associate the location of symbols on the virtual keyboard with the location of said symbol's visible virtual key on the dynamic virtual keyboard.

19. The computer-implemented system of claim 18, wherein the computing device is further configured to:
provide a dynamic cursor that displays a visual clue in said interactive activity space, wherein said visual clue may be manipulated from one state to any one of three distinct states selected from the group consisting of:
a first visual clue, wherein said first visual clue is the visual indicator of the virtual key displaying the target symbol before the user presses the physical key displaying said target symbol;
a second visual clue, wherein said second visual clue indicates that the user pressed a physical key that does not display said target symbol;
a third visual clue, wherein said third visual clue indicates that user pressed the physical key displaying said target symbol;
display a visual user prompt in the interactive activity space;
display a dynamic cursor related to the visual user prompt in the interactive activity space, wherein the dynamic cursor is configured to display the first visual clue;
display a target symbol in the interactive activity space that is related to a unique visual indicator included on the virtual keyboard and the visual user prompt and the visual clue of the dynamic cursor, the target symbol and visual user prompt and visual clue cuing the user to locate the virtual row of the virtual keys with said unique visual indicator and then press the virtual key in that located virtual row on the virtual keyboard containing the same symbol as the displayed target symbol;
receive an indication of a user input including information regarding which virtual key the user has pressed, calcualte the horizontal position of the dynamic cursor and alter the state of the visual clue of the dynamic cursor from the first visual clue to either the second visual clue or third visual clue in the display screen after comparing if the target symbol matches with the symbol displayed on the pressed virtual key;
move the dynamic cursor to the updated calculated horizontal position on the display screen and displaying the updated visual clue state of the dynamic cursor;
prompt the user to receive the updated calculated horizontal position and visual clue state of the dynamic cursor on the display screen as visual information that indicates the presence or absence of a match between the target symbol and the pressed virtual key.

20. A method for teaching a student user keyboarding, said method comprising the steps of:
providing a touch-sensitive computing device including a display screen;
providing, by the computing device, a virtual keyboard displayed on the display screen, the virtual keyboard including a configurable coding scheme and a plurality of virtual keys having spatial organization, wherein said coding scheme is comprised of a plurality of unique visual indicators that visually partitions said spatial organization into a plurality of virtual rows, wherein each visual indicator uniquely identifies one virtual row, and wherein every virtual key in each virtual row is additionally marked by a unique symbol;
providing an interactive activity space on the display screen in an area separate from the virtual keyboard;
providing an interactive activity comprised of a series of visual user prompts in the interactive activity space;
displaying a visual user prompt in the interactive activity space;
displaying a target symbol in the interactive activity space that is related to a unique visual indicator included on the virtual keyboard and the visual user prompt, the target symbol and visual user prompt cuing the user to locate the virtual row of the virtual keys with said unique visual indicator and then press the virtual key in that located virtual row on the virtual keyboard containing the same symbol as the displayed target symbol;
receiving an indication of a user input including information regarding which virtual key the user has pressed, and altering the visual user prompt in the display screen after comparing if the target symbol matches with the symbol displayed on the pressed virtual key;
receiving indications of additional virtual keys pressed by the user in response to the altered interactive display space, wherein the computer system's alteration of the interactive activity space is presented to prompt the user to select virtual keys based on a plurality of visual indicators and to associate the location of the symbol on the virtual keyboard with the unique visual indicator assigned to the virtual key on which that symbol is displayed.

21. The method of claim 20, said method further comprising the steps of:
providing a dynamic cursor that displays a visual clue in said interactive activity space, wherein said visual clue may be manipulated from one state to any one of three distinct states selected from the group consisting of:
a first visual clue, wherein said first visual clue is the visual indicator of the virtual key displaying the target symbol before the user presses the virtual key displaying said target symbol;
a second visual clue, wherein said second visual clue indicates that the user pressed a virtual key that does not display said target symbol;
a third visual clue, wherein said third visual clue indicates that user pressed the virtual key displaying said target symbol;
configuring the dynamic cursor to display the first visual clue;
displaying a target symbol in-the interactive activity space that is related to the first visual cue and the visual user prompt and the visual indicator of the virtual row of the virtual key displaying the target symbol, the target symbol and the first visual cue and visual indicator cuing the user to locate the virtual row of the virtual keys and then press the corresponding virtual key containing the same symbol as the displayed target symbol;
receiving an indication of a user input including information regarding which virtual key the user has pressed; the computer system, in response to the received user input, calculates the horizontal position of the dynamic cursor and alters the state of the visual clue of the dynamic cursor from the first visual clue to either the second visual clue or third visual clue in the display screen after comparing if the target symbol matches with the symbol displayed on the pressed physical key;
moving the dynamic cursor to the updated calculated horizontal position on the display screen and displaying the updated visual clue state of the dynamic cursor;
prompting the user to receive the updated calculated horizontal position and visual clue state of the dynamic cursor on the display screen as visual information that indicates the presence or absence of a match between the target symbol and the pressed physical key.

22. A method for teaching a user keyboarding, said method comprising the steps of:
providing a computing device including a display screen;
providing a physical keyboard connected to the computing device, the physical keyboard including a plurality of rows of keys selectable by a user and providing an indication of the user-selected keys to the computing device;
providing, by the computing device, a virtual keyboard displayed on the display screen, the virtual keyboard including a configurable coding scheme and a plurality of virtual keys having spatial organization, and wherein every virtual key is marked by a unique symbol and has a depression attribute that can be toggled between a pressed state and unpressed state;
displaying a visual user prompt in the interactive activity space that includes the overlay of a target symbol on the virtual keyboard sized to cover at least one specific virtual key;
prompting the user to identify the specific virtual key on the virtual keyboard and then use a one finger of a first hand to press the corresponding physical key on the physical keyboard;
receiving an indication of a user input including information regarding which physical key the user has pressed, wherein the computer system, in response to the received user input, toggles the value of the depression attribute of the virtual key from the unpressed state to the pressed state after comparing if the unique symbol of the virtual key beneath the target symbol matches with the pressed physical key
disabling the ability of user input through the physical keyboard to modify the display of the virtual keyboard or visual user prompts in the activity space until the user has toggled the depression attribute of the specific virtual key to the pressed state by pressing the corresponding physical key;
determining that the specific virtual key's depression attribute has changed to the pressed state;
requiring the user to then hold down the physical key with said one finger of said first hand for the duration of the series of visual prompts in the interactive activity by monitoring changes to the value of the specific virtual key's depression attribute, and wherein if the user releases said physical key then the computer system halts the interactive activity halts and toggles the value of the depression attribute of the specific virtual key toggles to the unpressed state until the user re-presses the physical key to re-toggle said depression attribute to the pressed state;
displaying additional visual user prompts that require the user to use one or more fingers of a second hand to press physical keys that correspond with virtual keys on the virtual keyboard while said one finger of the first hand holds down said physical key.

23. The method of claim 22, wherein the coding scheme is comprised of a plurality of unique visual indicators that visually partitions said spatial organization into a plurality of virtual rows.

24. A method for teaching a student user keyboarding, said method comprising the steps of:
providing a computing device having a touch-sensitive display screen, wherein said display screen has an activity space;
providing, by the computing device, a virtual keyboard displayed on the display screen, the virtual keyboard including a configurable coding scheme and a plurality of virtual keys having spatial organization, and wherein every virtual key is marked by a unique symbol and has a depression attribute that can be toggled between a pressed state and unpressed state;
providing an interactive activity on the display screen in an area separate from the virtual keyboard;
displaying a visual user prompt in the interactive activity space that includes the overlay of a target symbol on the virtual keyboard to cover at least one specific virtual key;
prompting the user to identify the specific virtual key on the virtual keyboard and then use a one finger of a first hand to press the target symbol
receiving an indication of a user input including information regarding if the user has pressed the target symbol positioned on the specific virtual key, wherein the computer system, in response to the received user input, toggles the value of the depression attribute of the specific virtual key from the unpressed state to the pressed state after determining if the user pressed the the target symbol;
disabling the ability of user input through the virtual keyboard to modify the display of the virtual keyboard or visual user prompts in the display screen until the user has toggled the depression attribute of the specific virtual key to the pressed state by pressing the target symbol;
determining that the specific virtual key's depression attribute has changed to the pressed state;
requiring the user to then hold down said target symbol with said one finger of said first hand for the duration of the series of visual user prompts in said interactive activity, and wherein if the user removes said one finger from a position that presses the target symbol then the computer system halts the interactive activity and toggles the value of the depression attribute of the specific virtual key associated with the target symbold from the pressed state to the unpressed state until the user re-presses said target symbol to re-toggle said value of the specific virtual key's depression attribute to the pressed state;
displaying additional visual user prompts that require the user to use one or more fingers of a second hand to press virtual keys that cue the computer system to alter the visual user prompts in the activity space while said one finger of the first hand holds down said target symbol.

25. The method of claim 24, wherein the coding scheme is comprised of a plurality of unique visual indicators that visually partitions said spatial organization into a plurality of virtual rows.

* * * * *